(12) United States Patent
McKeirnan, Jr. et al.

(10) Patent No.: US 12,228,156 B2
(45) Date of Patent: Feb. 18, 2025

(54) QUICK CONNECT VEHICLE ATTACHMENT

(71) Applicant: Stratos Meccanica LLC, Westlake Village, CA (US)

(72) Inventors: Robert D. McKeirnan, Jr., Westlake Village, CA (US); Arthur Bagumyan, La Crescenta, CA (US); Brandon Keenan, South Pasadena, CA (US)

(73) Assignee: Stratos Meccanica LLC, Westlake Village, CA (US)

( * ) Notice: Subject to any disclaimer, the term of this patent is extended or adjusted under 35 U.S.C. 154(b) by 510 days.

(21) Appl. No.: 16/914,233

(22) Filed: Jun. 26, 2020

(65) Prior Publication Data
US 2020/0408238 A1 Dec. 31, 2020

Related U.S. Application Data

(60) Provisional application No. 63/001,186, filed on Mar. 27, 2020, provisional application No. 62/867,181, filed on Jun. 26, 2019.

(51) Int. Cl.
| | |
|---|---|
| *F16B 21/04* | (2006.01) |
| *B60R 11/04* | (2006.01) |
| *B60R 13/10* | (2006.01) |
| *F16B 21/12* | (2006.01) |
| *F16B 39/10* | (2006.01) |
| *F16B 45/00* | (2006.01) |
| *G09F 7/18* | (2006.01) |

(Continued)

(52) U.S. Cl.
CPC ............. *F16B 21/04* (2013.01); *B60R 11/04* (2013.01); *B60R 13/105* (2013.01); *F16B 21/12* (2013.01); *F16B 39/108* (2013.01); *F16B 45/00* (2013.01); *G09F 7/18* (2013.01); *G09F 21/048* (2013.01); *B60R 2011/004* (2013.01); *B60R 2011/0052* (2013.01); *B60R 2011/0078* (2013.01); *G09F 2007/1865* (2013.01); *G09F 2007/1895* (2013.01); *Y10T 403/7005* (2015.01); *Y10T 403/7007* (2015.01)

(58) Field of Classification Search
CPC ... B60D 1/52; Y10T 403/7007; B60R 13/105; F16B 21/04; G09F 2007/1895
See application file for complete search history.

(56) References Cited

U.S. PATENT DOCUMENTS

| | | |
|---|---|---|
| 5,518,350 A | 5/1996 | Kyprios |
| 5,915,482 A * | 6/1999 | Carruthers ............. A01B 1/227 |
| | | 403/348 |
| 6,226,068 B1 | 5/2001 | Arcykiewicz |
| (Continued) | | |

FOREIGN PATENT DOCUMENTS

| | | |
|---|---|---|
| CN | 208544063 | 2/2019 |
| DE | 8911080 | 12/1989 |
| (Continued) | | |

*Primary Examiner* — Michael P Ferguson
(74) *Attorney, Agent, or Firm* — Lowry Blixseth APC; Scott M. Lowry

(57) ABSTRACT

The quick connect vehicle attachment as disclosed herein generally includes a bayonet lug having a series of threads that engage a tow hook boss on one end and a locking pin protruding out opposite sides of an interface shoulder on another end for select slide-in reception into a bayonet housing and along a cam slot for locking engagement therewith in a pair of slotted receptacles under a spring-biased preload.

22 Claims, 44 Drawing Sheets

(51) Int. Cl.
*G09F 21/04* (2006.01)
*B60R 11/00* (2006.01)

(56) References Cited

U.S. PATENT DOCUMENTS

| | | | |
|---|---|---|---|
| 6,382,654 | B1 | 5/2002 | Mahncke |
| 7,752,785 | B2 * | 7/2010 | Beer ................. B60R 13/105 |
| | | | 24/DIG. 57 |
| 8,197,155 | B2 * | 6/2012 | Noh .................. H01R 13/625 |
| | | | 403/348 |
| 9,242,610 | B2 | 1/2016 | DeGrazia |
| D813,131 | S * | 3/2018 | Chiang .............. B60R 13/105 |
| | | | D12/193 |
| 10,081,315 | B2 | 9/2018 | Liu |
| 2007/0028490 | A1 | 2/2007 | Beer |
| 2012/0128443 | A1 | 5/2012 | Fabre |
| 2012/0227257 | A1 * | 9/2012 | Kalavitz .............. F16B 21/04 |
| | | | 29/525.01 |
| 2014/0346307 | A1 | 11/2014 | Tran |
| 2020/0101908 | A1 * | 4/2020 | Camisasca ........... B60R 13/105 |

FOREIGN PATENT DOCUMENTS

| | | |
|---|---|---|
| DE | 9217382 | 7/1993 |
| KR | 20170107697 | 9/2017 |

* cited by examiner

FIG. 49

QUICK CONNECT VEHICLE ATTACHMENT

BACKGROUND OF THE INVENTION

The present invention generally relates to a quick connect vehicle attachment. More specifically, the present invention relates to a quick connect vehicle attachment that permits relatively fast and easy interchange of license plates, tow hooks, cameras, and other auxiliary equipment with a tow hook boss of the vehicle sub-frame without damaging a front fascia of the vehicle.

Starting in about 1905, California was the first state in the United States to require that residents register a motor vehicle. Initially, residents were allowed to submit their own registration information and display their own license plates. Although, starting in about 1914, California began issuing its own license plates. Thereafter in about 1956, the American Association of Motor Vehicle Administrators, the Automobile Manufacturers Association and the National Safety Council designed a standard license plate shape and size (i.e., 6 inches in height by 12 inches in width with a standard set of mounting apertures) for use in the United States, Canada, and Mexico. Today, license plates are issued by the California Department of Motor Vehicles and the laws require that most vehicles, including all passenger vehicles, include a front and rear license plate. In fact, thirty one (31) states in the United States have now adopted similar laws requiring that vehicle owners attach license plates to both the front of the vehicle and to the rear of the vehicle.

Most passenger vehicles sold in the United States include a location to mount a rear license plate. In most cases, the trunk or rear bumper may include a mounting bracket or necessary standard mounting apertures to receive a rear-mounted license plate. But, most automotive manufacturers still do not design the front of the passenger vehicle to receive a front-mounted license plate. As a result, one problem mounting a license plate (or a bracket designed to receive a license plate) to the front of a passenger vehicle is that it typically involves defacing the front bumper. For instance, an exemplary vehicle 10 is illustrated in FIG. 1 and is shown having a license plate mounting bracket 12 attached to a front fascia 14 by a series of screws. One must necessarily thread the screws into the front fascia 14 for the bracket to remain attached. As a consequence, this defaces/damages the valance of the front fascia 14 by leaving behind a series of screw holes 16, as illustrated in FIG. 2, when the license plate mounting bracket 12 is removed. The screw holes 16 can tear, distort, and cause fretting of the paint as a result of vibration from the license plate mounting bracket 12 and FOD build up between the paint and the bracket 12. This is particularly problematic because the majority of high-end vehicles (e.g., Audi, BMW, Mercedes, Porsche, etc.) do not have a dedicated front license plate mounting location. The screw holes 16 consequently reduce the vehicle resale value and are difficult to repair. In this respect, vehicle owners can spend thousands of dollars filling the screw holes 16 and repainting the front fascia 14 in an attempt to restore the passenger vehicle 10 to a near original factory condition.

Despite the fact that the majority of states require front and rear license plates, automobile manufacturers and dealerships have historically been able to sell new and used vehicles without attaching a front license plate by requiring that purchasers sign a license plate waiver. Typically, the waiver required that the purchaser acknowledge, in writing and prior to taking delivery of the vehicle 10, refusal to install a front-mounted license plate (e.g., directly to the bumper or by way of the license plate mounting bracket 12); and acknowledge that California law requires that a license plate be displayed from and securely fastened to the front of the vehicle 10. In other words, by signing the waiver, the purchaser assumed responsibility for attaching a license plate to the front of the vehicle for purposes of complying with the California vehicle code.

Although, starting Jan. 1, 2019, California began requiring that dealers attach license plates (even temporary plates) to both the front and rear of the vehicle before allowing a purchaser to take possession. In other words, purchasers no longer have the option to execute a waiver and drive a car off a dealer lot without affixing a license plate to both the rear and front of the vehicle 10. To compound the problem, despite the fact that many states have required front-mounted license plates for years, many vehicle manufacturers still do not produce vehicles having a front license plate friendly design. In fact, most European manufacturers, e.g., Audi, BMW, Mercedes, etc., have designed their front fascia to receive the relatively elongated European-style license plate, but not the North American style standardized in the 1950s. Thus, without a mounting platform sized to receive a North American standard license plate, there have been limited options to attach a license plate to the front of the vehicle 10 without undesirably damaging the front fascia 14.

In an effort to address the need in the art to attach a license plate to the front of the vehicle 10 without causing damage to the front fascia 14, several third party companies (e.g., GTP, CravenSpeed, DC Sports, Trunknets, Inc., ijDMTOY, Renniline, Pedal Haus, etc.) have designed aftermarket products that facilitate attachment of a license plate and/or bracket to the front of the vehicle 10 to comply with state license plate laws. For instance, many passenger vehicles, such as the BMW vehicle 10 illustrated in FIGS. 1-4 and 8-9, include an access port 18 in the front fascia 14 (FIG. 3) that provides access to an internally located tow hook boss 20 (FIG. 5) concealed by a cover 22 (FIG. 4). The cover 22 is designed to follow the curvature of the front fascia 14 for aesthetic purposes, but can be removed to access the internally located tow hook boss 20. When open, the tow hook boss 20 may selectively receive a threaded end 24 of a tow hook 26 (FIG. 6). As illustrated in FIG. 7, once threaded, the tow hook extends out from the front fascia 14. The primary functionality of the tow hook boss 20 is to provide a point of attachment for the tow hook 26 to tow the vehicle 10.

The aforementioned aftermarket products may be designed to use the tow hook boss 20 for purposes of attaching a license plate bracket 28, 28' as generally illustrated, e.g., in FIGS. 8 and 9. Although, these aftermarket products are designed for threaded engagement with the tow hook boss 20 in a similar manner as one would engage the threaded end 24 of the tow hook 26 into the tow hitch boss 20—a process not designed for attaching and/or removing the tow hook 26 fairly quickly. For example, one must have the tools necessary to apply enough torque to ensure that the license plate bracket 28 engages the tow hook boss 20 to prevent loosening while driving. Consequently, it can be difficult to hand disconnect the license plate bracket 28, 28' without similar tools to first loosen the license plate bracket 28, 28' from the tow hook boss 20. Moreover, it can be difficult to properly align the orientation of the license plate bracket 28, 28' (e.g., as illustrated in FIGS. 8 and 9) once installed because most aftermarket products do not include a convenient way to adjust the bracket 28, 28' after threaded installation. Alignment is feasible, e.g., by loosening and re-tightening the bolt that secures the license plate bracket 28, 28' to an underlying rod that connects to the tow hook boss 20. But, it is necessary to do this each time the license plate bracket 28, 28' is reattached after removal. In other words, there is no way to quickly connect the license plate bracket 28, 28' in the same orientation each time. Consistent attachment and/or removal of the license plate bracket 28, 28' is thus onerous and generally disfavored. To this end, no third party aftermarket product is known to include a quick connect mechanism that permits easy hand installation and/or removal of the license plate bracket 28, 28' (e.g., to display a license plate on the front of the vehicle 10) while also facilitating hand adjustability post-mounting and quick attachment and/or removal of other equipment (e.g., the tow hook 26, camera, etc.).

There exists, therefore, a significant need for a quick connect vehicle attachment that can couple items such as a license plate, tow hook, camera, etc. to the front of a vehicle without problems related to attaching OEM or other aftermarket license plate brackets thereto that damage the vehicle front fascia. The present invention fulfills these needs and provides further related advantages.

SUMMARY OF THE INVENTION

The quick connect vehicle attachment as disclosed herein may utilize a vehicle tow hook attachment access port to mount license plates, tow hooks, cameras, etc. and which can be relatively quickly disconnected and fitted with a tow hook attachment when needed. When a user wants to maintain the vehicle aesthetics for show purposes, the tow hook access cover can quickly be reattached due to the quick connect/disconnect design of the bayonet lug and/or bayonet housing combination as disclosed herein. For example, the quick connect vehicle attachment as disclosed herein may include a bayonet lug having a series of threads that engage the tow hook boss on one end and a locking pin protruding out opposite sides of an interface shoulder on another end, for select slide-in reception into a cam slot in a bayonet housing. As such, the bayonet housing is able to engage the bayonet lug for locking engagement therewith by way of a pair of slotted receptacles sized to retain the locking pin therein under a spring-biased preload.

In another embodiment, the quick connect vehicle attachment may include a bayonet lug having at least one locking pin outwardly extending therefrom at a first end and a series of threads for engagement with a commensurately threaded tow hook boss of a vehicle at a second end opposite the first end. The quick connect vehicle attachment may further include a bayonet housing having a central bore of a size and shape for select reception of the first end of the bayonet housing and may further include at least one cam slot therein externally accessible from a lip thereof for select slide-in reception of the at least one locking pin of the bayonet lug. Accordingly, a lock may retain the bayonet housing relative to the bayonet lug when the at least one locking pin of the bayonet lug is slidably engaged with the at least one cam slot of the bayonet housing.

More specifically, the at least one cam slot may include an externally accessible locking pin channel extending away from the lip and turning orthogonally into an open channel permitting rotational movement of the bayonet housing relative to the bayonet lug until termination at a locking shoulder that then turns orthogonally back toward the lip and terminates into a slotted receptacle short of the lip. This slotted receptacle selectively receives and is able to retain the at least one locking pin therein when the bayonet housing is engaged with the bayonet lug. Here, the lock may include a spring located within the central bore of the bayonet housing and compressible therein by the first end of the bayonet lug when the at least one locking pin slidably engages the locking pin channel. Accordingly, the spring exerts a pre-load force generally resistant to said insertion and otherwise presents a forward force to engage the at least one locking pin within the slotted receptacle when the bayonet housing is rotated relative to the bayonet lug such that the locking pin aligns with the slotted receptacle. Additionally, a fastener may reside within the central bore and retain the spring substantially concentric within the bayonet housing.

In another aspect of these embodiments, the at least one locking pin may extend outwardly from an interface shoulder that has a width relatively larger than the tow hook boss, so that the interface shoulder can land thereon when the bayonet lug is fully threadingly engaged therewith. Additionally, the bayonet lug and the bayonet housing may each have an outer diameter relatively smaller than a port providing access to the tow hook boss located behind a front fascia of the vehicle. As such, the bayonet lug and the bayonet housing are able to extend therein. Moreover, the bayonet lug may be of a relatively short length to position the first end behind the front fascia when the second threaded end is fully engaged with the tow hook boss, thereby permitting attachment of a cover to close the port and hide the bayonet lug therein, even when the bayonet lug is installed therein.

In another aspect of these embodiments, the quick connect vehicle attachment may also include a tilt plate having a pair of outwardly projecting and generally parallel flanges each having at least one slot formed therein. The tilt plate may couple to the bayonet housing by an alignment block that selectively couples to the pair of outwardly projecting and generally parallel flanges. As such, the at least one slot may include a pair of arcuate slots permitting pivoting movement of the alignment block relative thereto. A fastener may extend through the alignment block for threaded engagement with the bayonet housing. Here, the fastener may carry a lock washer thereon such that the lock washer is sandwiched between the alignment block and the bayonet housing to generally resist relative rotational movement therebetween. The washer may have a conical shape or the lock washer may include a plurality of serrations to increase frictional resistance. To this end, the tilt plate may couple to a license plate bracket having a set of bracket apertures arranged in an array and having embossments configured for flush mounting thereto, wherein movement of the alignment block relative to the tile plate by way of the arcuate apertures may set the relative angular orientation of the license plate bracket for optimum aesthetics and wind resistance.

Furthermore, the bayonet housing may include a pair of wrenching flats and the bayonet lug may include a socket drive access opening to facilitate tightening and/or release thereof. Additionally, the bayonet lug may include a cross drilled aperture within the interface shoulder such that opposite sides of the at least one locking pin extend out therefrom for engagement with a respective pair of cam slots in the bayonet housing.

Alternatively, the lock may include a magnet retained within an interior of the bayonet housing and near a bottom of the central bore. As such, the magnet may be magnetically attractable to the bayonet lug for retainment therein. Although, in another alternative embodiment, the lock may include a ball detent formed from an exterior surface of the first end of the bayonet lug and a receptacle formed from an interior surface of the central bore of the bayonet housing. Here, the ball detent may extend into the receptacle when the bayonet lug is engaged with the bayonet housing. The ball detent and/or the magnet may be used alone or in combination with one another.

In another aspect of the embodiments disclosed herein, a bayonet lug for use in connection with a quick disconnect vehicle attachment may include an interface shoulder formed from a first end thereof and include a pair of locking pins generally extending outwardly therefrom. The pair of locking pins may be formed from a single pin that extends from opposite sides of the interface shoulder by way of a cross-drilled aperture formed therein. Moreover, a series of threads formed from a second end thereof may be designed to engage with a commensurately threaded tow hook boss of a vehicle. The bayonet lug may further include a piloting shoulder intermediate the interface shoulder at the first end and the series of threads at the second end, wherein the aggregate length of the interface shoulder, the piloting shoulder, and the series of threads positions the bayonet lug behind a front fascia of the vehicle when fully threaded to the tow hook boss.

In one aspect of these embodiments, the piloting shoulder may include a diameter relatively smaller than the interface shoulder, thereby forming a step therebetween landable on the tow hook boss when the bayonet lug is fully threaded thereon. Moreover, the pair of locking pins may be selectively engageable with a commensurate pair of slots formed into a bayonet housing such that the bayonet housing may attach to or otherwise be removed from the bayonet lug without detaching the bayonet lug from the tow hook boss.

The bayonet lug may also include a generally circumferential outwardly projecting flange separating the relatively forwardly positioned interface shoulder from the relatively rearwardly positioned piloting shoulder. Here, the outwardly projecting flange may be landable on the tow hook boss, especially in embodiments wherein the interface shoulder and the piloting shoulder have the same size diameter. Here, a lock washer may be selectively slidable on to the piloting shoulder and configured to be sandwiched between the generally circumferentially outwardly projecting flange and the tow hook boss to generally resist relative rotational movement of the bayonet lug relative thereto after threaded engagement. As such, the lock washer may include a plurality of serrations to increase frictional resistance.

In another aspect of the embodiments disclosed herein, a bayonet housing for use in connection with a quick disconnect vehicle attachment may include a central bore formed from a first end of the bayonet housing and include a size and shape for select slide-in engagement with a bayonet lug. A pair of cam slots formed from the central bore may be externally accessible from a lip thereof, wherein the pair of cam slots includes a size and shape for select slide-in reception of a commensurate pair of locking pins outwardly extending from the bayonet lug. A lock carried by the bayonet housing may then retain the bayonet housing to the bayonet lug.

In one embodiment, the lock may include a magnet positioned within the central bore immediately below a termination point of the pair of cam slots to draw the bayonet lug into engagement therewith. Here, the pair of cam slots may include a pair of straight cam slots that generally prevent rotational movement of the bayonet housing relative to the bayonet lug after engagement with the pair of locking pins. Alternatively, the externally accessible pair of cam slots may extend inwardly away from the lip, turn orthogonally into an open channel extending to a locking shoulder that then turns orthogonally away from the lip into a slotted receptacle terminating adjacent the magnet. Although, in another alternative embodiment, the pair of cam slots may include a U-shape having a first end externally accessible and extending inwardly from the lip and a second end terminating in a slotted receptacle below the lip. In each embodiment, the pair of cam slots may be open or otherwise closed by way of being formed from an interior of the central bore.

In an alternative embodiment, the bayonet housing may include an outwardly projecting shoulder formed from a second end thereof, and include a set of mounting apertures formed therein having a size and shape to selectively receive a fastener for securing the shoulder to a set of mounting apertures formed from a bracket suitable for mounting a license plate thereto. In embodiments wherein the bayonet housing is of a cylindrical shape, the bayonet housing may have a relatively consistent external diameter that encloses the pair of cam slots therein.

Alternatively, the bayonet housing may include a threaded opening at a second end thereof opposite the first end, wherein the threaded opening may be selectively engageable with a fastener extending through an accessory mount. In one embodiment, the accessory mount may include a trunnion carrying a tow eye. Here, the fastener coupling the trunnion to the bayonet housing may carry a washer in a position sandwiched between the trunnion and an external surface of the second end of the bayonet housing to generally resist relative rotational movement therebetween. Furthermore, a pin may selectively slidably engage an aperture within the trunnion and be of a length to extend into a rotational stop formed within the tow eye to prevent pivoting about the trunnion. In another embodiment, the accessory mount may include a camera block. Here, the fastener coupling the camera block to the bayonet housing may carry a serrated lock washer in a position sandwiched between the camera block and an external surface of the second end of the bayonet housing to generally resist relative rotation relative thereto.

In another embodiment, the quick connect vehicle attachment may include a bayonet lug having one of a locking pin outwardly extending therefrom or a central bore at a first end, and a series of threads for engagement with a commensurately threaded tow hook boss of a vehicle at a second end opposite the first end and a bayonet housing may have the other of the locking pin or the central bore. As such, the central bore may include a cam slot therein externally accessible from a lip thereof and include a size and shape for select reception of the locking pin therein. A lock may then retain the bayonet lug relative to the bayonet housing when the locking pin is slidably engaged with the cam slot.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 49 is a chart illustrating a sample set of configurations for using one or more of the locking pins, the cam slots, the ball detents and/or the receptacles, the springs, and/or the magnets as disclosed herein, alone or in combination with one another.

DETAILED DESCRIPTION OF THE PREFERRED EMBODIMENTS

Figure 1:
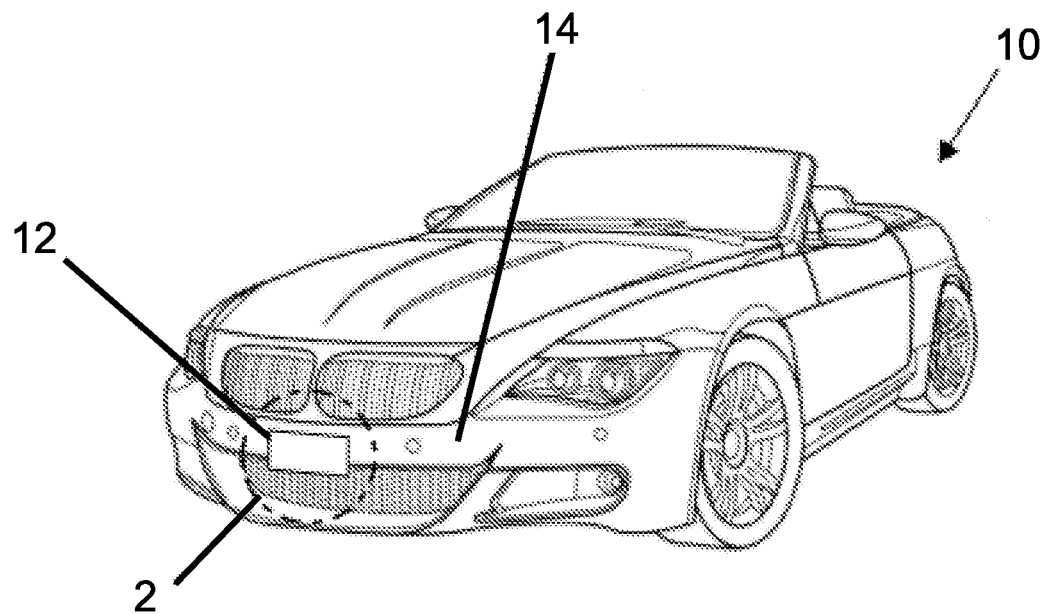
FIG. 1 is a perspective view of a passenger vehicle having a license plate mounting bracket screwed on to a front fascia valance thereof.
Figure 2:
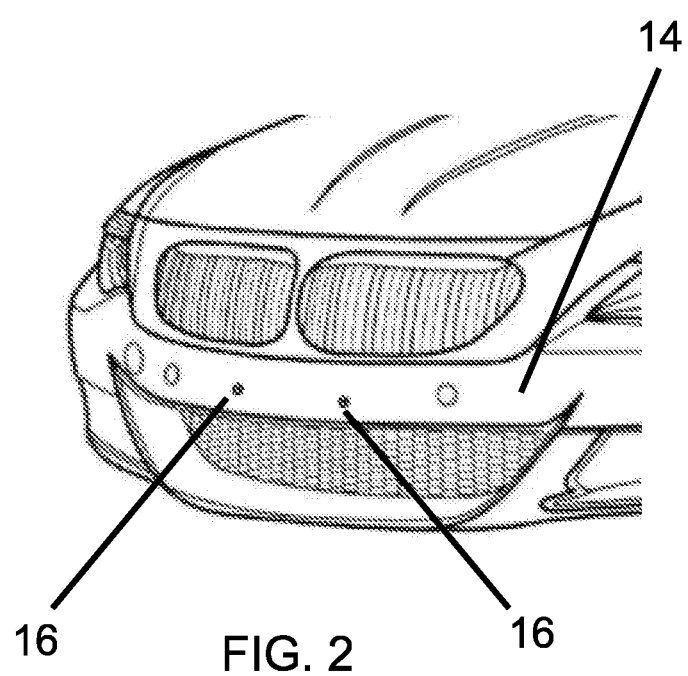
FIG. 2 is an enlarged perspective view taken about the circle 2 in FIG. 1, further illustrating the front fascia of the front bumper having a plurality of screw holes therein after removal of the license plate mounting bracket.
Figure 3:
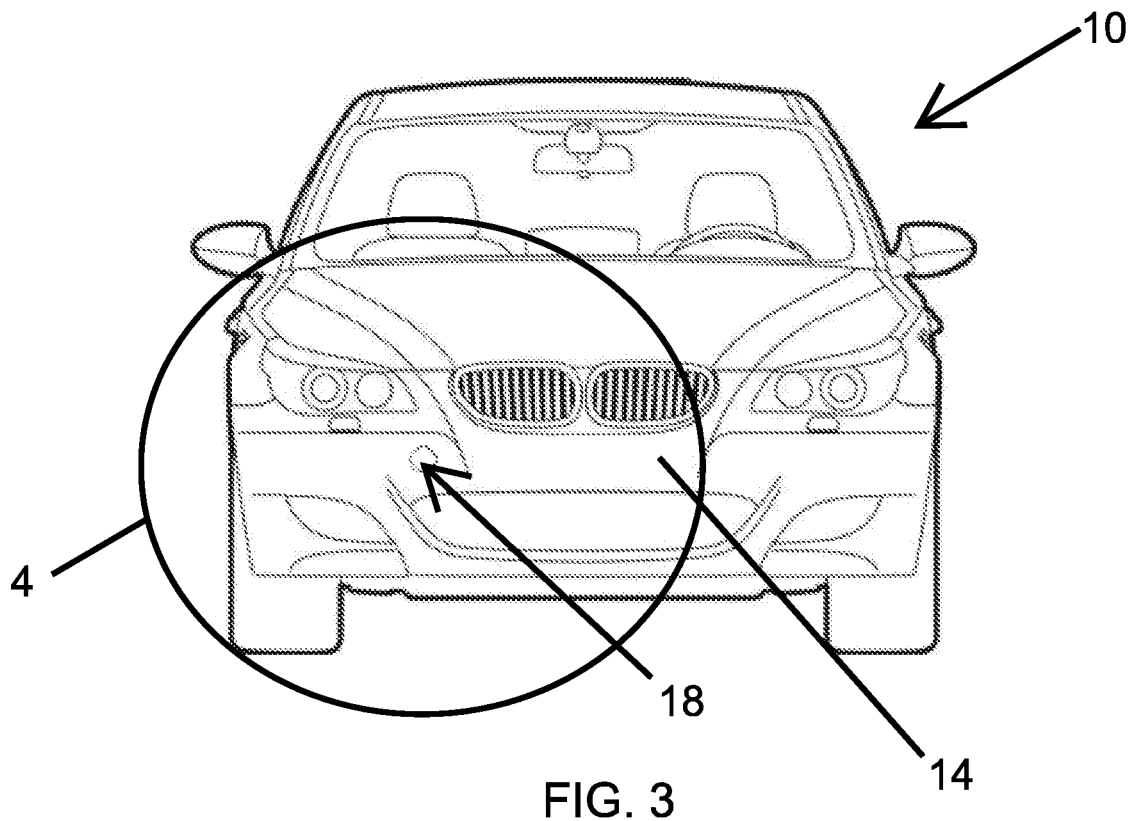
FIG. 3 is a perspective view illustrating the passenger vehicle without a license plate thereon.
Figure 4:
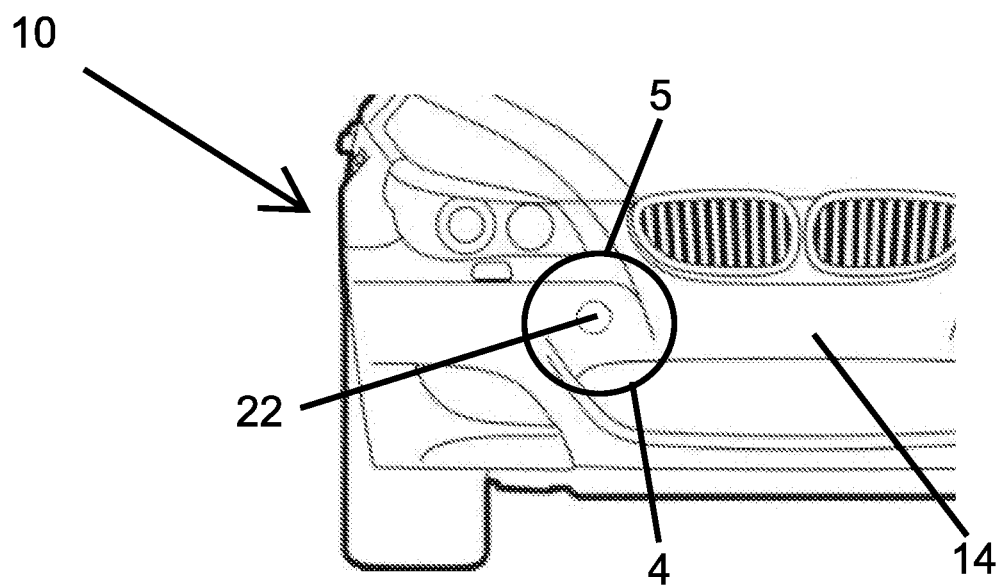
FIG. 4 is an enlarged perspective view taken about the circle 4 in FIG. 3, further illustrating a cover integrated into the front fascia of the passenger vehicle and hiding a tow hook boss coupled to the vehicle sub-frame.
Figure 5:
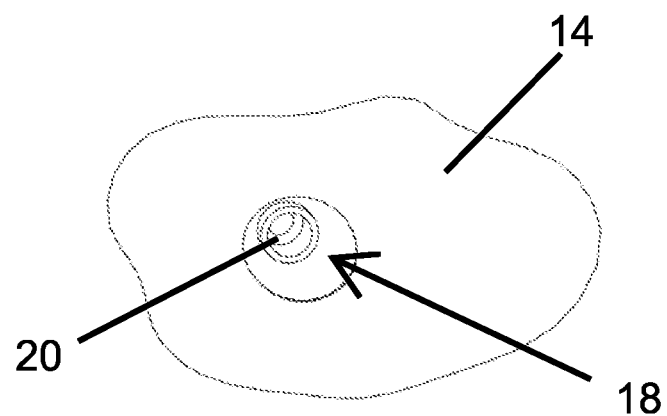
FIG. 5 is an enlarged perspective view taken about the circle 5 in FIG. 4, more specifically illustrating removal of the cover and exposing the tow hook boss underneath.

As shown in the exemplary drawings for purposes of illustration, the present disclosure for a quick connect vehicle attachment is illustrated with respect to reference numeral 30 in FIGS. 16, 18-19, 22-23, 27, 34-35, and 39-48. As disclosed in detail herein, the quick connect vehicle attachment 30 facilitates quick and easy interchange of hardware that may include a quick connect license plate 32, 32', 32" (FIGS. 15-27, 34-35, 39-41, and 43), a quick connect tow hook 34 (FIGS. 28-30), a quick connect camera attachment 36 (FIGS. 31-32, and 44), and/or other equipment designed to interface with the quick connect vehicle attachment 30, all without impacting the aesthetic appearance of the front fascia 14 of the vehicle 10. In general, in one embodiment illustrated in FIG. 16, the quick connect vehicle attachment 30 may include a bayonet lug 38 designed for quick attachment and/or release to a bayonet housing 40 by way of a spring 42 and a pair of cam slots 44 (one illustrated in FIG. 16) configured for select reception and retention of a locking pin 46 that protrudes out from a generally diametrically enlarged interface shoulder 48 of the bayonet lug 38.

Figure 10:
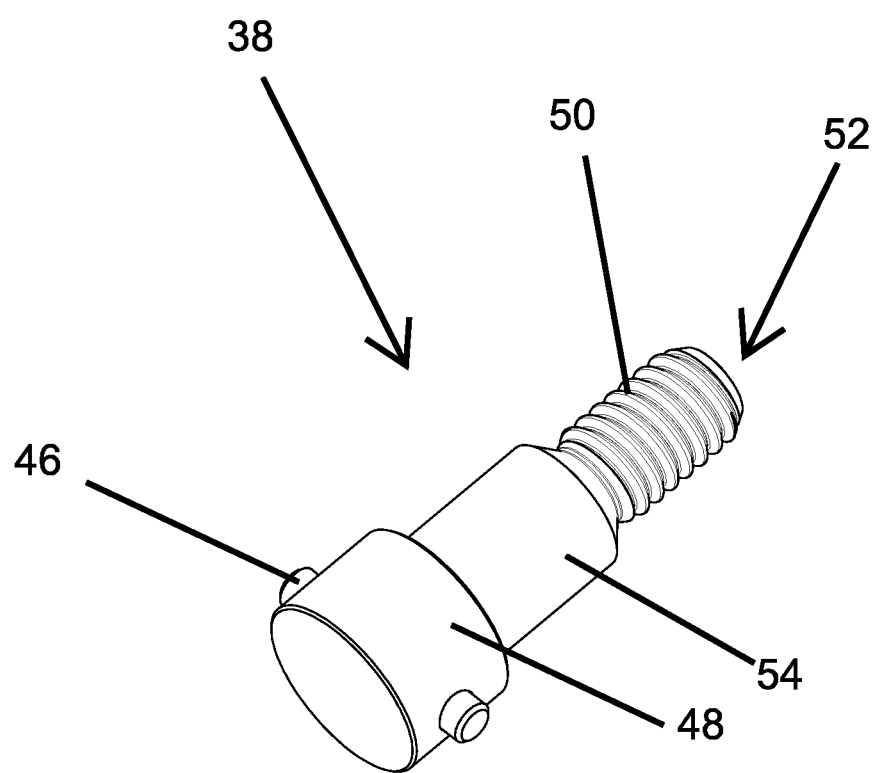
FIG. 10 is a perspective view of one embodiment of a bayonet lug as disclosed herein.
Figure 11:
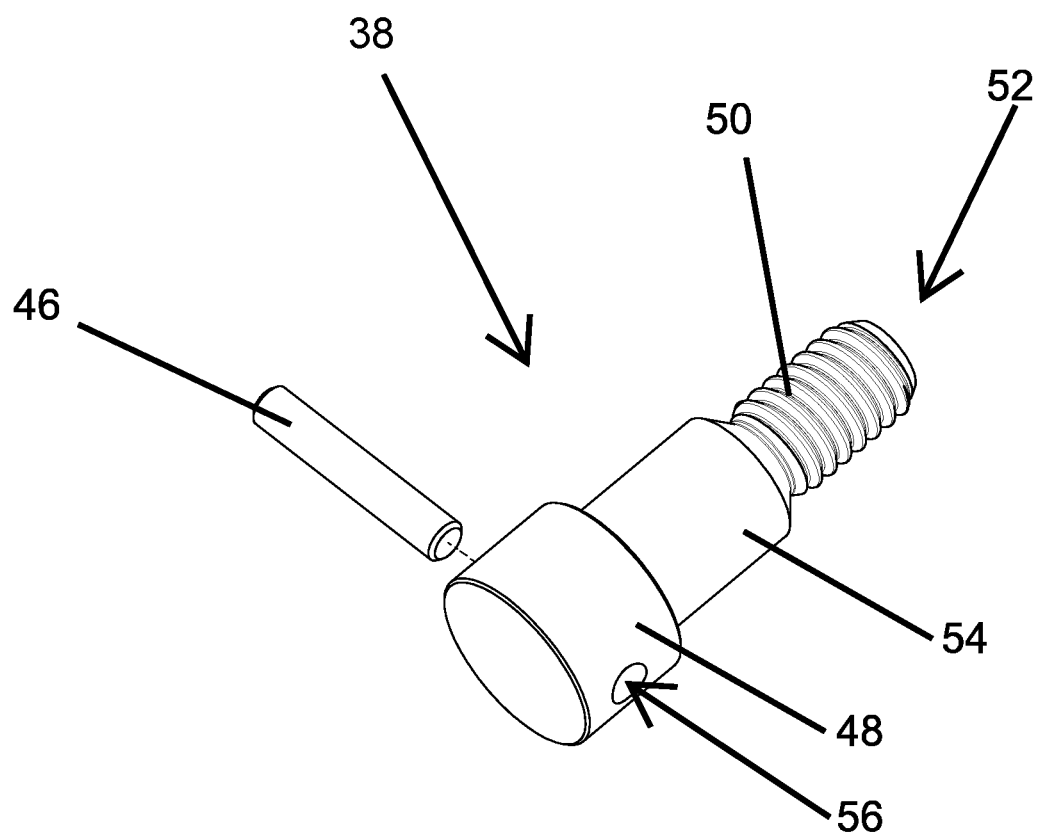
FIG. 11 is an exploded perspective view of the bayonet lug of FIG. 10, illustrating a locking pin in exploded relation relative to an interface shoulder of the bayonet lug.

In this respect, FIGS. 10 and 11 are perspective views of one embodiment of the bayonet lug 38. Here, the bayonet lug 38 includes a series of threads 50 at an engagement end 52, a piloting shoulder 54, and the interface shoulder 48 includes a cross drilled aperture 56 (FIG. 11) having a size and shape for reception of the locking pin 46. The locking pin 46 pilots into the cross drill aperture 56 and secures in place as generally illustrated in FIG. 10 relative to the exploded perspective view of FIG. 11. Once inserted, opposite ends of the locking pin 46 protrude out from the interface shoulder 48 for engagement within the cam slots 44, as discussed in more detail herein. The series of threads 50 are of a size, shape, and thread count that match a set of internal threads within the tow hook boss 20. Of course, the series of threads 50 may vary from one embodiment to another to match the corresponding threads of the tow hook boss 20, depending on the make and model of the vehicle 10.

Figure 6:
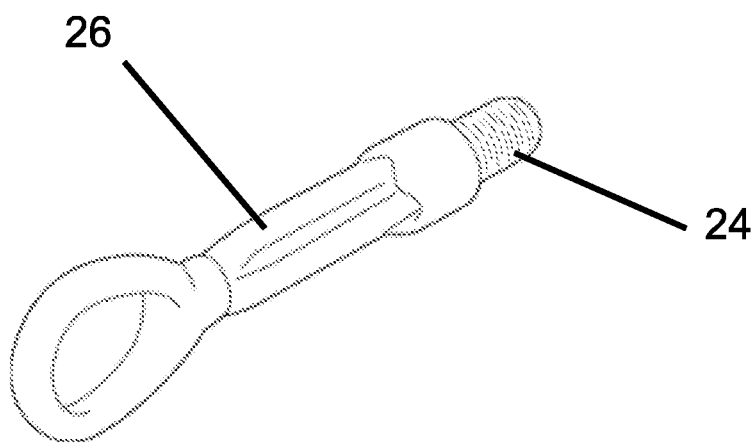
FIG. 6 is a perspective view of a conventional tow hook.
Figure 7:
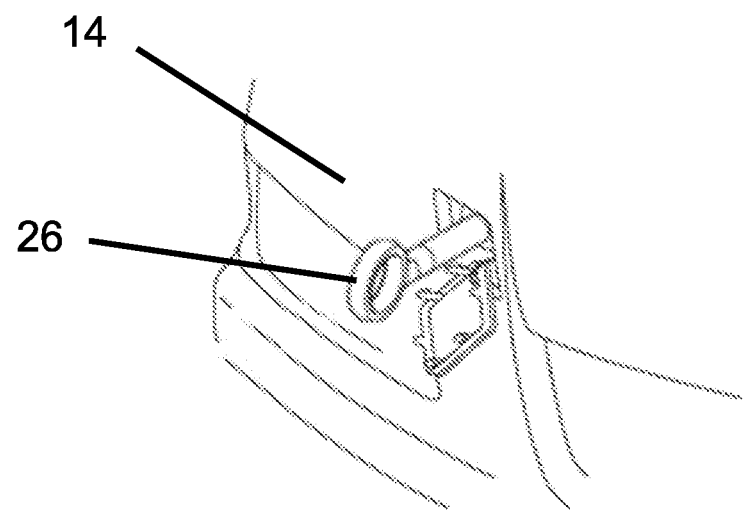
FIG. 7 is a perspective view of the conventional tow hook engaged with the tow hook boss and protruding out from the front fascia of the passenger vehicle.
Figure 8:
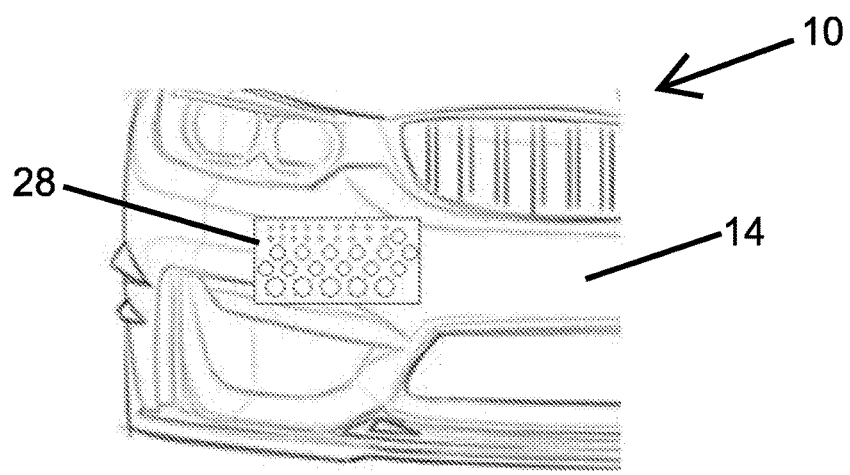
FIG. 8 is a perspective view illustrating one embodiment of a license plate bracket coupled to the tow hook boss and protruding out from the front fascia of the vehicle.
Figure 9:
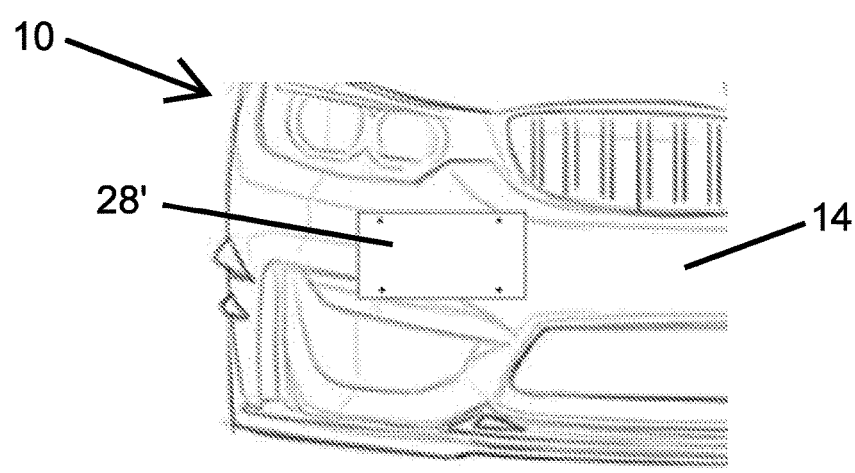
FIG. 9 is a perspective view illustrating another embodiment of a license plate bracket coupled to the tow hook boss and protruding out from the front fascia of the vehicle.
Figure 12:
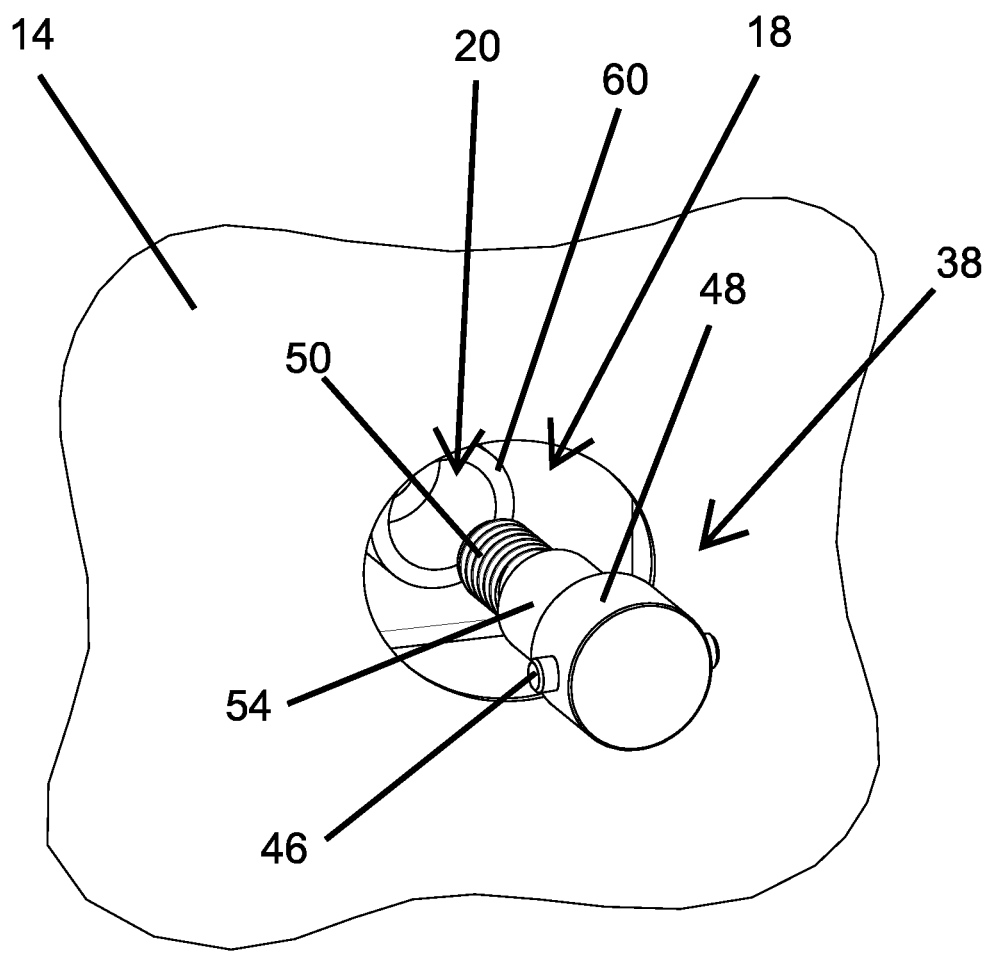
FIG. 12 is a partial cut-away exploded perspective view generally illustrating the bayonet lug in exploded relation relative to the tow hook boss positioned behind the front fascia.
Figure 13:
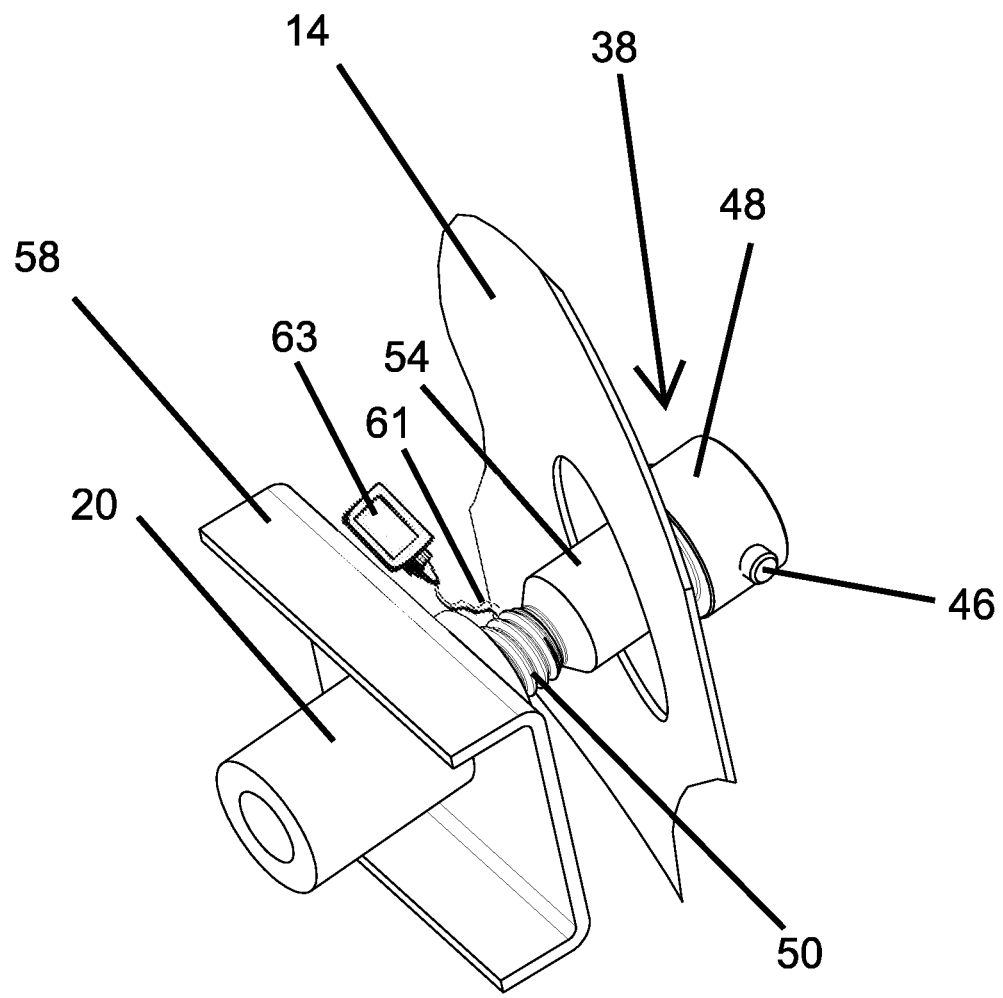
FIG. 13 is a partial cut-away exploded perspective view similar to FIG. 12, illustrating the bayonet lug extending through an access port in the front fascia and in partial threaded engagement with the tow hook boss therein for coupling to the vehicle sub-frame.
Figure 14:
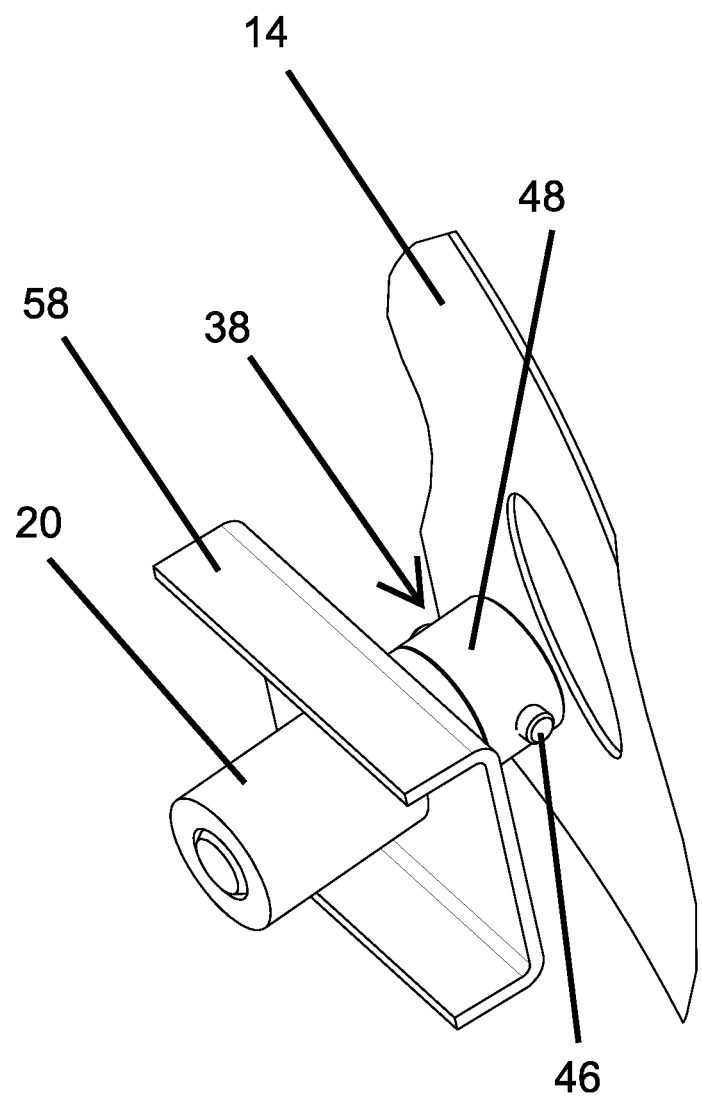
FIG. 14 is a partial cutaway exploded perspective view similar to FIGS. 12 and 13, further illustrating threaded engagement of the bayonet lug with the tow hook boss.

To install the bayonet lug 38, FIG. 12 illustrates a partial cutaway perspective view generally axially aligning the bayonet lug 38 within the open access port 18 in the front fascia 14 of the vehicle 10. The largest diameter of the bayonet lug 38 is relatively smaller than the access port 18 to permit slide in reception as generally illustrated in FIGS. 12 and 13. As such, when aligned, the series of threads 50 thereon may threadingly engage a set of female threads within the tow hook boss 20 as would a conventional tow hook, such as the tow hook 26 illustrated in FIG. 6. In one embodiment, the bayonet lug 38 may partially thread onto the tow hook boss 20 such that the interface shoulder 48 of the bayonet lug 38 is positioned in front of a landing surface 60 of the tow hook boss 20. Here, the piloting shoulder 54 may be of a relatively reduced diameter to accommodate partial or full insertion into an interior of the tow hook boss 20. In an alternative embodiment, the interface shoulder 48 may land against the landing surface 60 of the tow hook boss 20 when the engagement end 52 is fully threaded within the tow hook boss 20, such as illustrated in FIG. 14. Such landing engagement may help retain the bayonet lug 38 in locking engagement with the tow hook boss 20 by way of, e.g., frictional engagement of the interfacing surface area of the landing shoulder 48 and the landing surface 60, along with an optional threadlocker 61 (e.g., a glue such as Loctite® manufactured and sold by Henkel Corporation of One Henkel Way, Rocky Hill, CT 06067) or the like applied to the threads 50 (e.g., by an applicator 63) of the bayonet lug 38.

Once installed, as best illustrated in FIG. 14, the interface shoulder 48 outwardly protruding from the tow hook boss 20, but is positioned to an interior side of the front fascia 14 such that the cover 22 may attach to close the access port 18 even when the bayonet lug 38 has been installed. Doing so effectively encloses the bayonet lug 38 therein and behind the interior of the front fascia 14, yet the bayonet lug 38 remains effectively attached to a sub-frame 58 of the vehicle 10 by way of threaded engagement with the tow hook boss 20. Accordingly, it is possible to install the bayonet lug 38 to the tow hook boss 20 for concealment therein and without altering the front fascia 14. Simply removing the cover 22 provides access to and exposes the bayonet lug 38 for use with the bayonet housing 40 as disclosed herein. Accordingly, the bayonet lug 38 provides a way for quickly securing the bayonet housing 40 to the vehicle sub-frame 58 by way of the quick connect vehicle attachment 30 as disclosed herein.

Figure 15A:
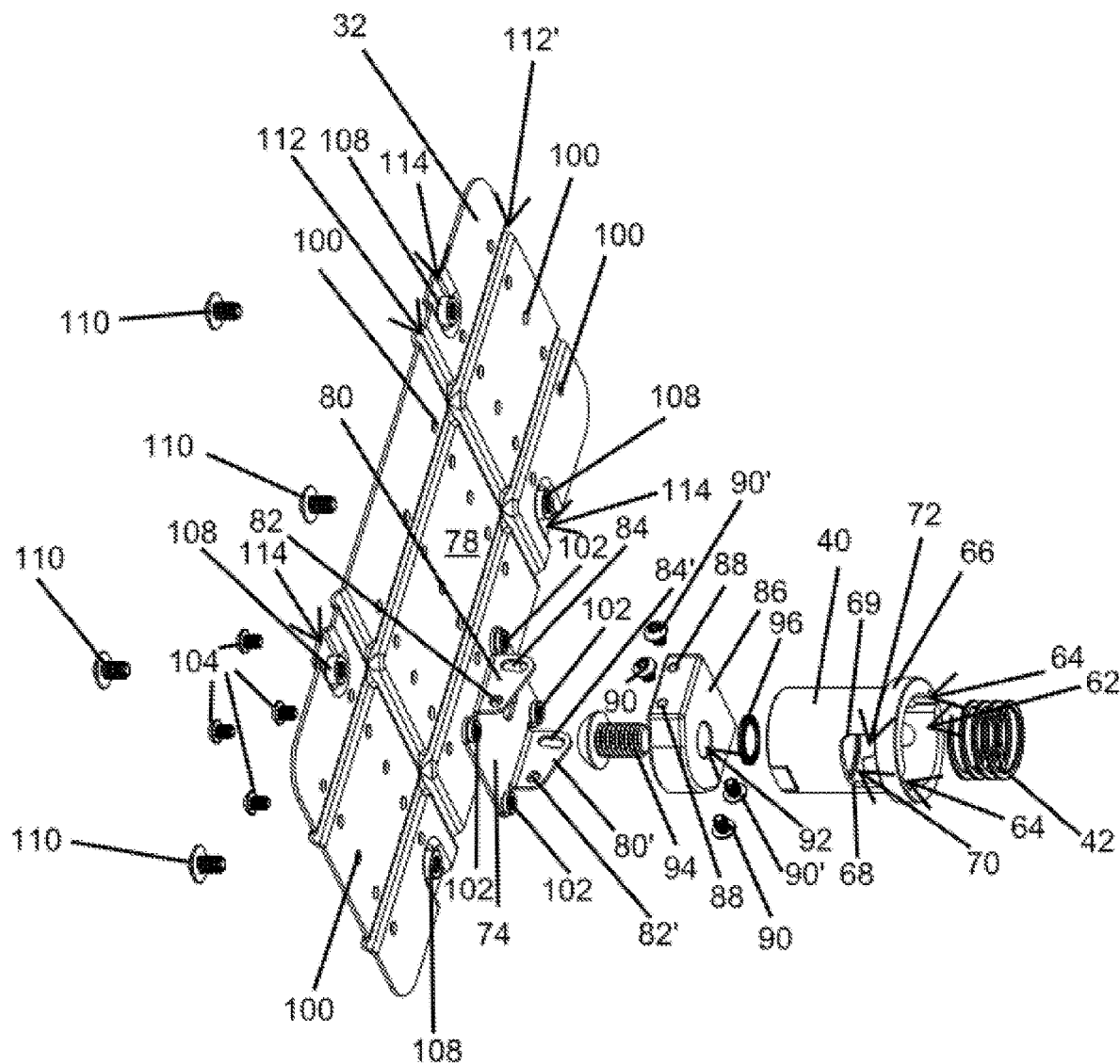
FIG. 15A is an exploded perspective view illustrating one embodiment of a bayonet housing that couples to a quick connect license plate bracket by way of a tilt plate and a alignment block.

More specifically as illustrated in FIG. 15A, and as briefly discussed above, the bayonet housing 40 is shown as a generally cylindrical shape and includes a central bore 62 having an internal diameter to house and center the spring 42 therein. The bayonet housing 40 includes a pair of locking pin channels 64 externally accessible from a bayonet lip 66 that have a size and shape for select slide-in reception of the opposite ends of the outwardly protruding locking pin 46 mounted within the interface shoulder 48 of the bayonet lug 38. The bayonet lip 66 may provide localized hoop strength at the end of the bayonet housing 40. Accordingly, the bayonet housing 40 quickly and easily connect to the bayonet lug 38 by inserting opposite ends of the locking pin 46 into the respective locking pin channels 64 for movement along the length of and into the body of the bayonet housing 40. Such movement compresses the spring 42 underneath to generate a pre-load that requires constant pressure to keep the locking pin 46 within the locking pin channels 64 of the cam slots 44. Eventually, the locking pin 46 contacts a slotted cam shoulder 68 that turns orthogonally to permit rotational movement of the bayonet housing 40 relative to the bayonet lug 38 within the cam slots 44. Here, the bayonet housing 40 may rotate relative to the bayonet lug 38 in an open channel 70 until the locking pin 46 contacts a locking shoulder 69 that turns orthogonally back toward the bayonet lip 66, and terminates in a slotted receptacle 72. Accordingly, releasing the bayonet housing 40 when in this position allows the spring 42 to forcefully push the interface shoulder 48 out and away from the bayonet housing 40, thereby causing the locking pins 46 to engage the slotted receptacles 72 with a predetermined spring-tension pre-load. Here, the bayonet housing 40 remains engaged with the bayonet lug 38 in a relatively static position effectively attached to the vehicle 10.

Figure 28:
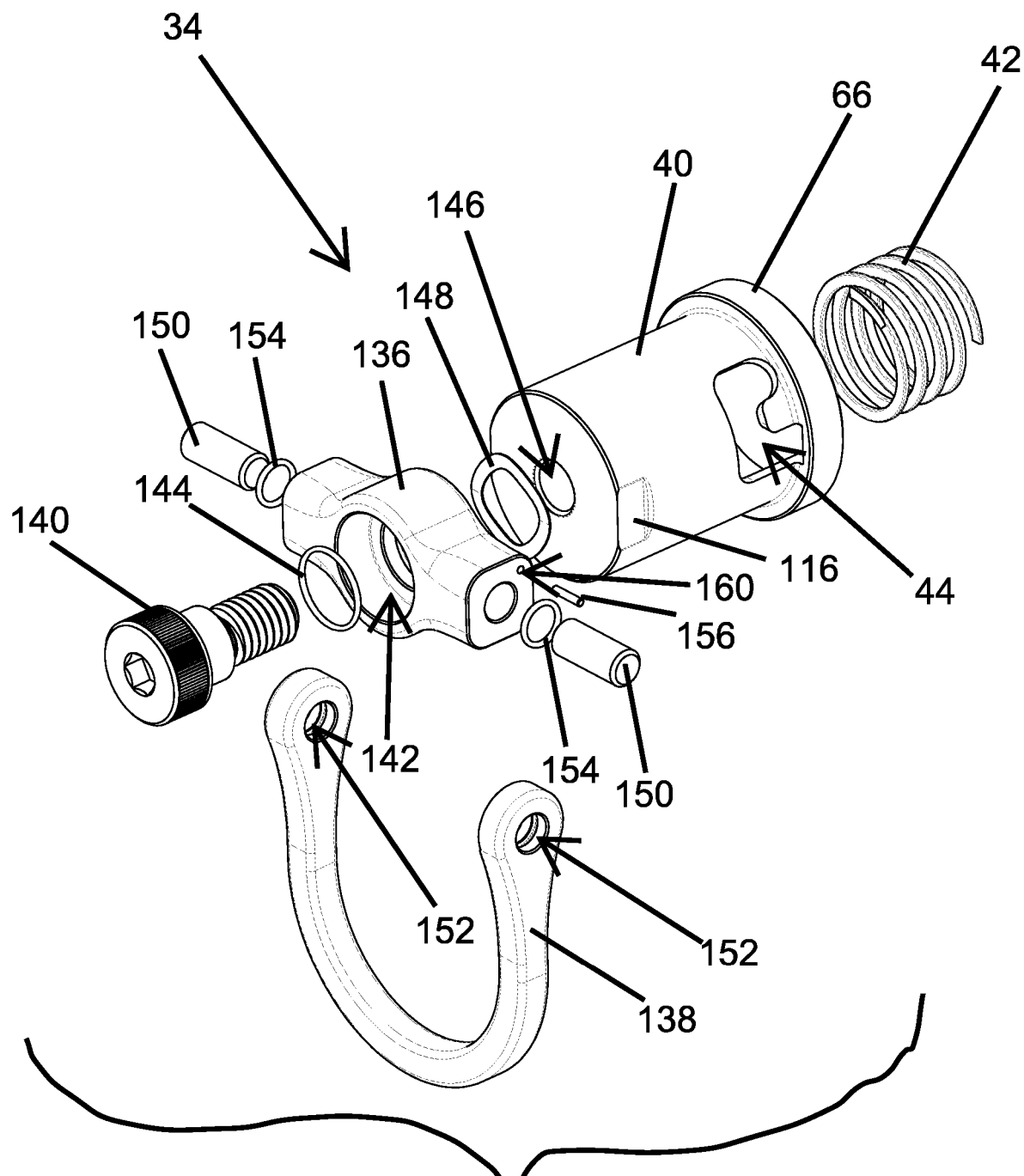
FIG. 28 is an exploded perspective view of a quick connect tow hook attachment as disclosed herein.
Figure 29:
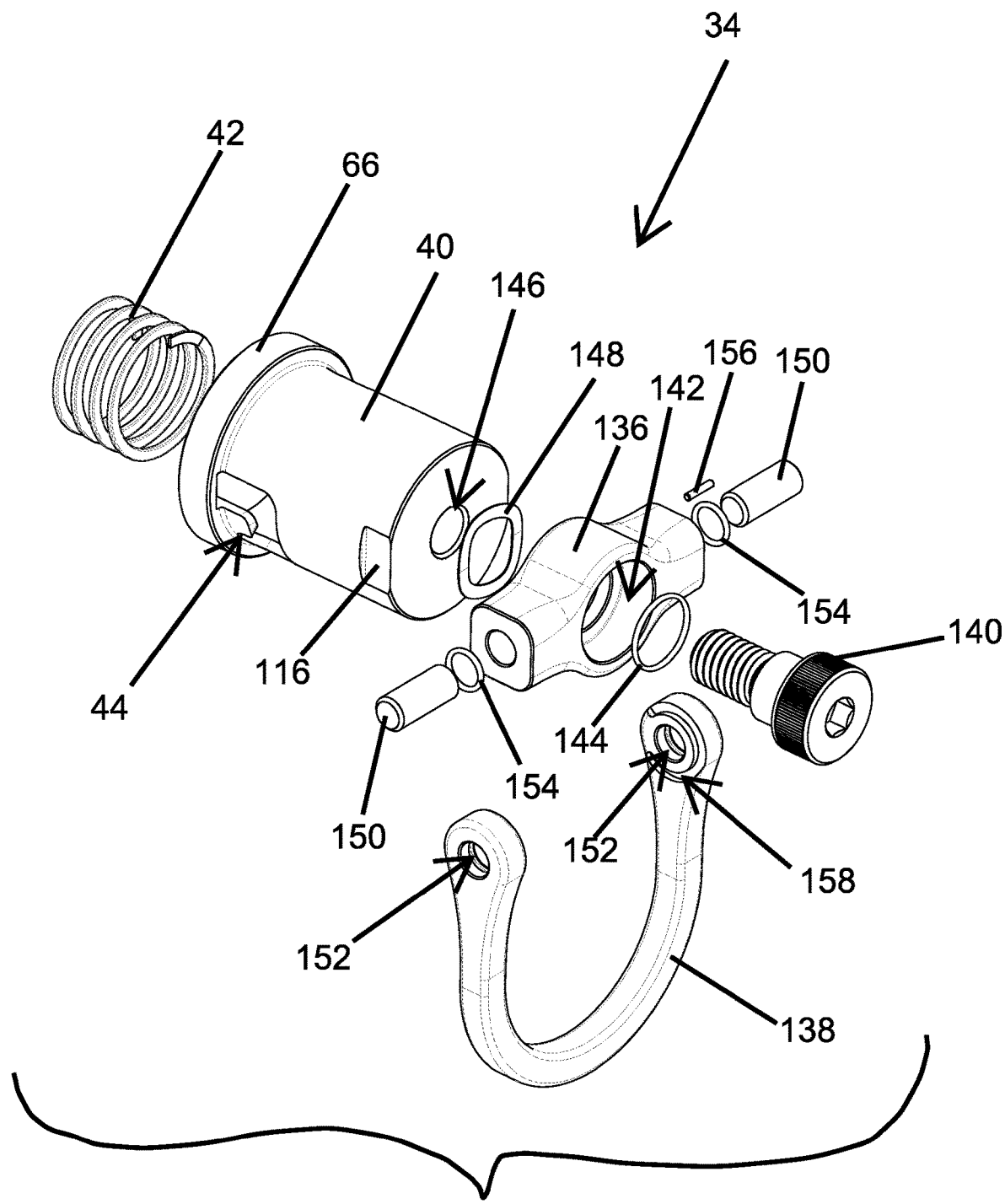
FIG. 29 is an alternative exploded perspective view of the quick connect tow hook attachment of FIG. 28.
Figure 30:
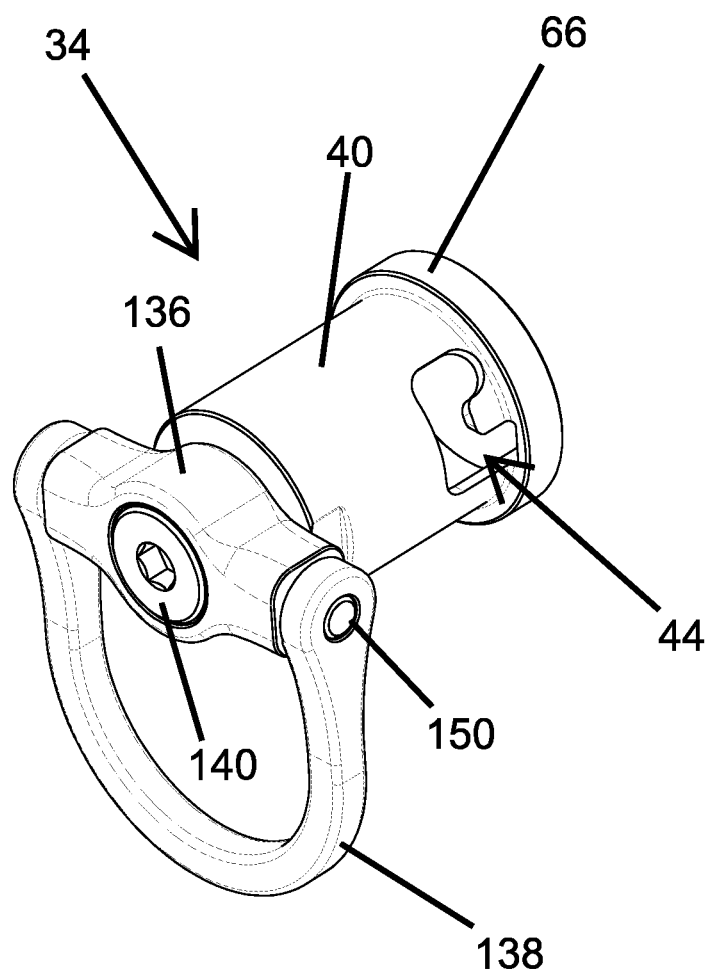
FIG. 30 is a perspective view illustrating the quick connect tow hook attachment of FIGS. 28-29 fully assembled.

The bayonet lip 66 provides rigidity to the body of bayonet housing 40 to support loading from the locking pins 46 within the slotted receptacles 72 due to the spring 42 exerting a pre-load and/or when a vehicle towing load is applied via the quick connect tow hook mounting attachment 34 (FIGS. 28-30). Moreover, the spring 42 should be rated to provide a locking load sufficient to maintain positive engagement of the locking pin 46 within the slotted receptacles 72 to prevent inadvertent disengagement due to vehicle aerodynamic wind forces because the quick connect vehicle attachment 30 is designed to permit quick disconnection by depressing the spring 42, rotating the bayonet housing 40 relative to the bayonet lug 38, and allowing the spring 42 to push the interface shoulder 48 out from engagement therewith.

Figure 33:
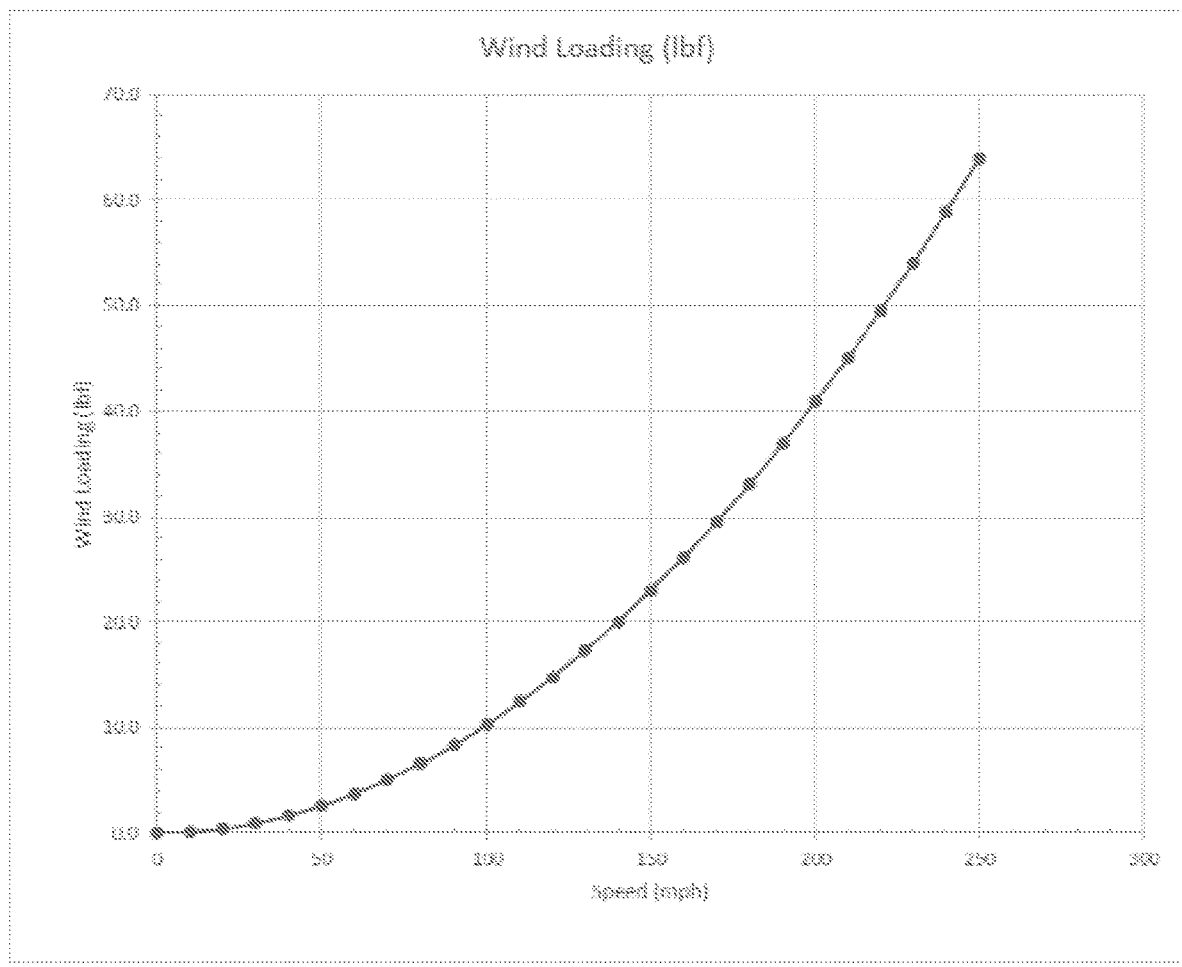
FIG. 33 is a chart illustrating one embodiment of wind load on the quick connect license plate bracket as a function of vehicle speed.

In this respect, FIG. 33 is a chart illustrating one embodiment of the theoretical effect of wind loading on the attachment 30 as a function of vehicle speed. As an example design point for a vehicle driving at a speed of 120 mph, the wind loading force may be 15 pounds force ("lbf") based on the coefficient of drag value (Cd) used to generate the chart illustrated in FIG. 33. Thus, the spring 42 would need to be rated to exert a pre-load of at least 15 lbf to provide a positive pre-load to maintain engagement of the locking pin 46 within the slotted receptacles 72. Although, the spring 42 may be rated much higher (e.g., incorporating a 2× factor of safety) to ensure the spring rate stays well above any potential compressive forces as a result of wind loading during driving. Such design helps ensure that the spring 42 maintains the locking pin 46 within the slotted receptacles 72 while driving.

Of course, the curve profile illustrated in FIG. 33 is merely one example, and will vary depending on the aerodynamic profile of the front fascia 14 of the vehicle 10, the components attached to the quick connect vehicle attachment 30, etc. For example, the quick connect license plate 32, 32', 32" may have a higher drag coefficient as a result of having a higher front-facing surface area than, e.g., the drag coefficient that may be experienced with respect to the quick connect tow hook attachment 34 or the quick connect camera attachment 36. As a result, the curve illustrated in FIG. 33 may be higher with respect to the quick connect license plate 32, 32', 32" relative to either of the quick connect tow hook attachment 34 or the quick connect camera attachment 36 (i.e., the quick connect license plate 32, 32', 32" experiences a higher wind load thereon).

Additionally, the spring 42 may substantially secure within a base of the bayonet housing 40 to prevent removal therefrom, including preventing the spring 42 from accidentally falling out from within the bayonet housing 40 when disconnected from the bayonet lug 38.

As briefly mentioned above, removal of the bayonet housing 40 from engagement with the bayonet lug 38 simply requires placing forward pressure against the bayonet housing 40 to depress the spring 42 by a predetermined distance wherein the locking pin 46 disengages the slotted receptacles 72, and typically into contact with the locking shoulder 69. From here, the locking pin 46 may rotate back within the open channel 70 between the cam shoulder 68 and the locking shoulder 69, as discussed above. In a similar manner as engaging the bayonet housing 40 with the bayonet lug 38, opposite rotation causes the locking pin 46 to rotate into contact with the cam shoulder 68 such that the locking pin 46 is now in substantial alignment with the locking pin channels 64. Here, releasing the forward pressure against the bayonet housing 40 permits the spring 42 to expand and push or eject the locking pin 46 out from within the cam slots 44 by way of the externally accessible locking pin channels 64. Once the bayonet lug 38 is expelled out from within the bayonet housing 40, the cover 22 may be snapped in place over the access port 18 to conceal the bayonet lug 38 that remains in threaded engagement with the tow hook boss 20 (FIG. 14), as discussed above. This, in turn, permits quick and easy attachment of the bayonet housing 40 (and anything coupled to an opposite end thereof) to the bayonet lug 38 hidden behind the front fascia 14. Importantly, such attachment facilitates coupling equipment to the front of the vehicle 10 without damaging the front fascia 14.

More specifically in this respect, FIGS. 15-19 illustrate one embodiment wherein the bayonet housing 40 couples to a tilt plate 74 capable of mounting to the quick connect license plate bracket 32, such as for purposes of outwardly presenting a license plate from the front fascia 14 by way of the quick connect vehicle attachment 30 as disclosed herein. As discussed in more detail below, the tilt plate 74 may permit selectively aligning the quick connect license plate bracket 32 (and license plate (not shown) coupled thereto) along the curvature of the front fascia 14, as desired. More specifically, FIG. 15A is an exploded perspective view illustrating the tilt plate 74 coupled to a rear surface 78 of the quick connect license plate bracket 32. Here, the tilt plate 74 is illustrated having a pair of outwardly projecting and generally horizontally positioned upper and lower tilt flanges 80, 80' each having a respective pivot aperture 82, 82' and a respective tilt slot 84, 84'. The tilt plate 74 couples to the bayonet housing 40 by way of an alignment block 86 that includes a set of threaded mounting apertures 88 that generally align with the respective tilt apertures 82, 82' and the tilt slots 84, 84'. A respective set of fasteners 90, 90' (e.g., screws or bolts) insert through each of the tilt apertures 82, 82' and the tilt slots 84, 84' for threaded engagement with the mounting apertures 88, to secure each of the tilt flanges 80, 80' to the alignment block 86.

The alignment block 86 is designed to facilitate offset locking of the tilt plate 74 relative to the front fascia 14 by way of the pair of tilt slots 84, 84'. Specifically in this respect, each of the tilt slots 84, 84' are shown to include a generally arcuate opening that permits sliding movement of the inserted fasteners 90' therein, effectively using the fasteners 90 within the apertures 82 as the pivot point. Accordingly, the quick connect license plate bracket 32 may pivot forward and/or backward relative to the quick connect vehicle attachment 30 (and also the front fascia 14) using the fasteners 90 within the apertures 82 as the pivot point with the fasteners 90' free to move within the arcuate tilt slots 84, 84' until being locked down in a desired position/orientation. Once the desired positioning of the quick connect license plate bracket 32 has been attained (e.g., parallel to the curvature of the front fascia 14 as generally illustrated in FIG. 19), simply tightening the fasteners 90' within the tilt slots 84, 84' may retain the quick connect license plate bracket 32 in the desired position.

Figure 19:
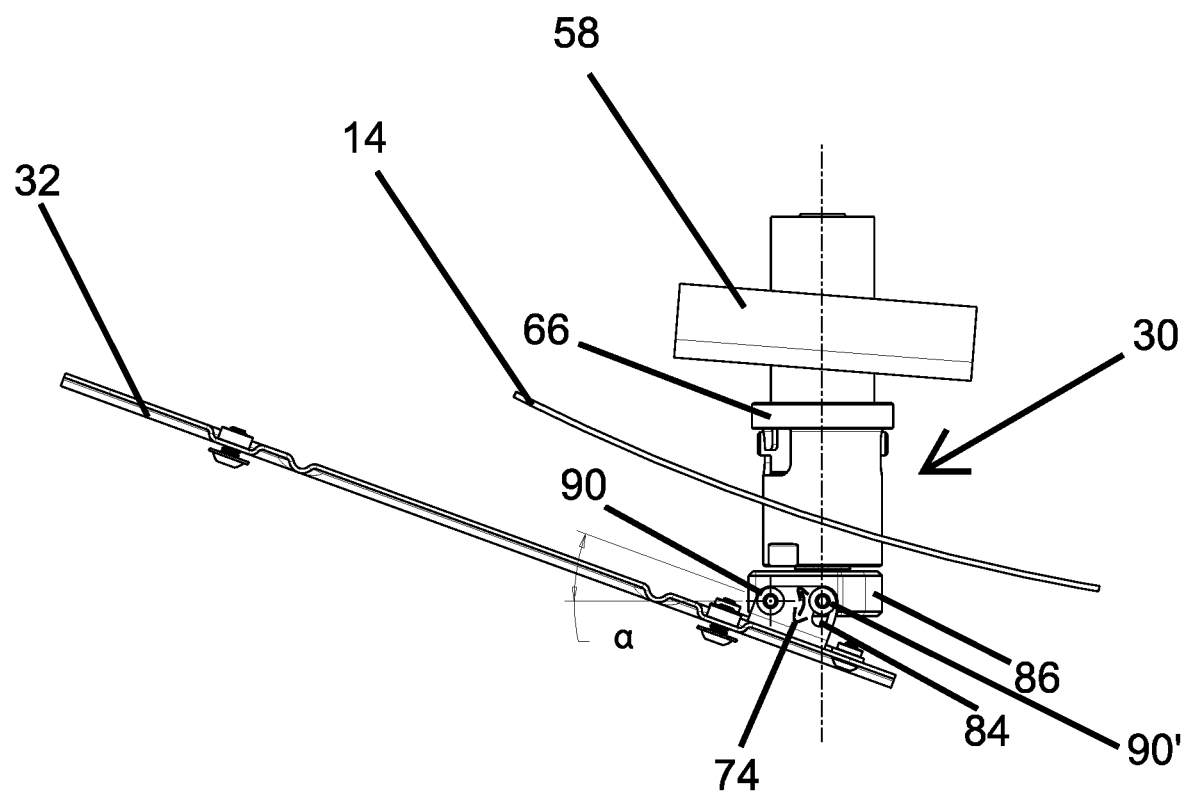
FIG. 19 is a top view of FIG. 18, further illustrating the offset relation and angular adjustability of the quick connect license plate bracket relative to the front fascia.

As generally illustrated in the top view of FIG. 19, the tilt plate 74 may permit movement of the quick connect license plate bracket 32 by an angular distance defined by an angle α. Accordingly, the offset or angular orientation of the quick connect license plate bracket 32 may be determined by way of the adjustable location of the fasteners 90' within the tilt slots 84, 84' along the angle α.

As further illustrated in FIG. 15A, the alignment block 86 also includes a bore 92 having a diameter to selectively receive a screw fastener 94 therethrough for threaded engagement with a set of internal threads within the bayonet housing 40. The bore 92 and the screw fastener 94 concentrically position the alignment block 86 relative to the bayonet housing 40 and its width helps project the quick connect license plate bracket 32 out from the front fascia 14 after the bayonet housing 40 couples with the bayonet lug 38, e.g., as illustrated in FIG. 19. To facilitate alignment, the diameter of the fastener 94 may also be smaller than an internal diameter of the spring 42 such that the fastener 94 may concentrically reside therein and help facilitate concentric alignment of the spring 42 therein.

Moreover, the fastener 94 may also slidably receive a lock washer 96 thereon for retainment between the alignment block 86 and the housing 40. The lock washer 96 may minimize loosening from wear, temperature changes, and vibration that may occur between the bayonet housing 40 and alignment block 86 during use. The lock washer 96 may incorporate a conical shape (as a spring feature) and include a series of surface level serrations on its top and bottom surfaces to provide extra gripping power.

In one embodiment, the alignment block 86 may be ambidextrous, namely wherein the alignment block 86 may permit installation of the quick connect vehicle attachment 30 on either side of the vehicle 10 (i.e., the driver's side or the passenger's side), to selectively position the quick connect attachments 32, 34, 36 relative to the front fascia 14 and parking sensors (to the extent the passenger vehicle 10 has any). Additionally, the alignment block 86 may have a set of horizontal mounting apertures 98 (FIG. 16) for accessory attachments (e.g., GoPro manufactured and sold by GoPro, Inc. of 3000 Clearview Way, San Mateo, California 94402).

Figure 16:
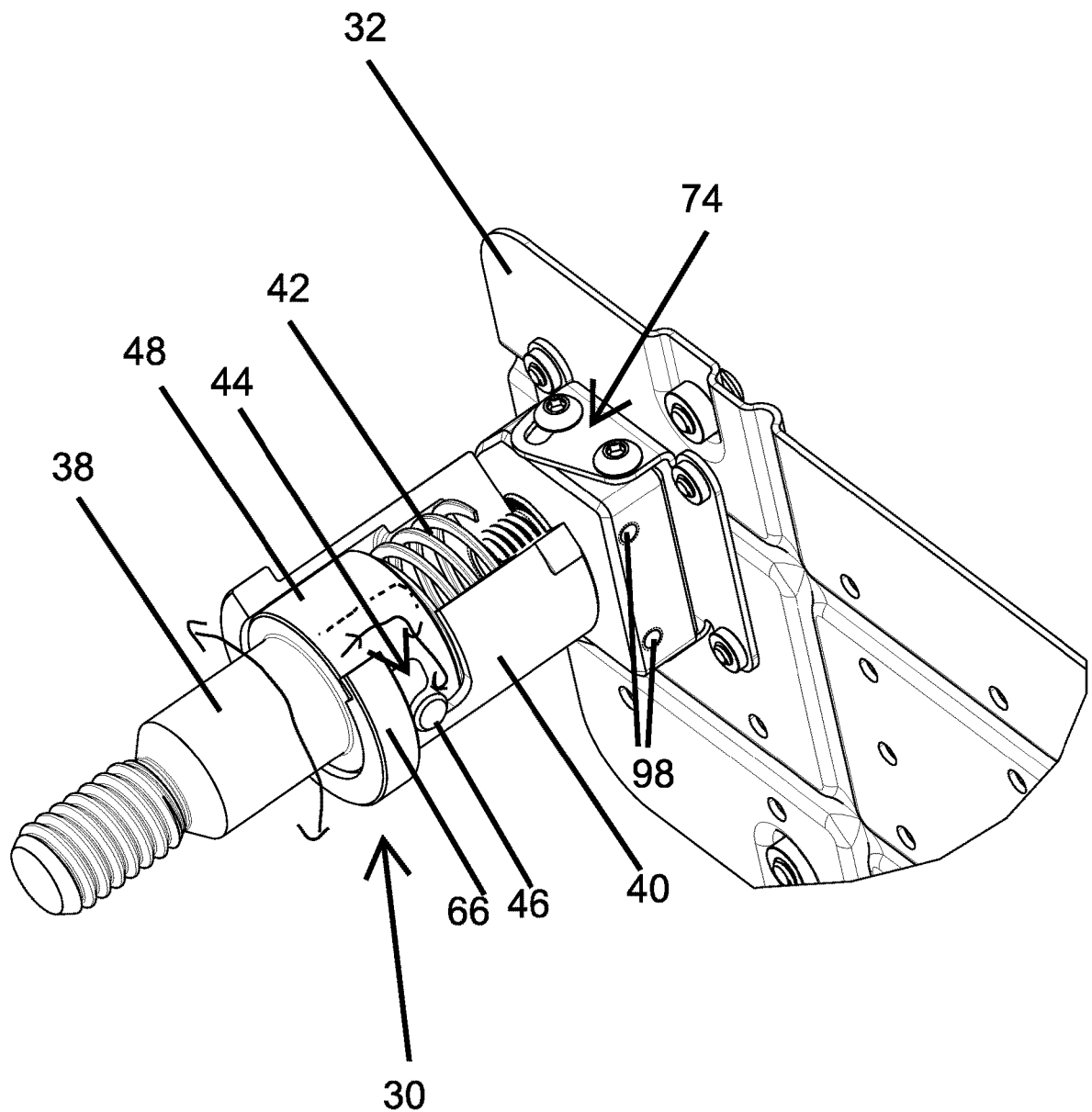
FIG. 16 is an enlarged cut-away perspective view illustrating assembly of the bayonet lug and the bayonet housing of the quick connect vehicle attachment as disclosed herein.
Figure 17:
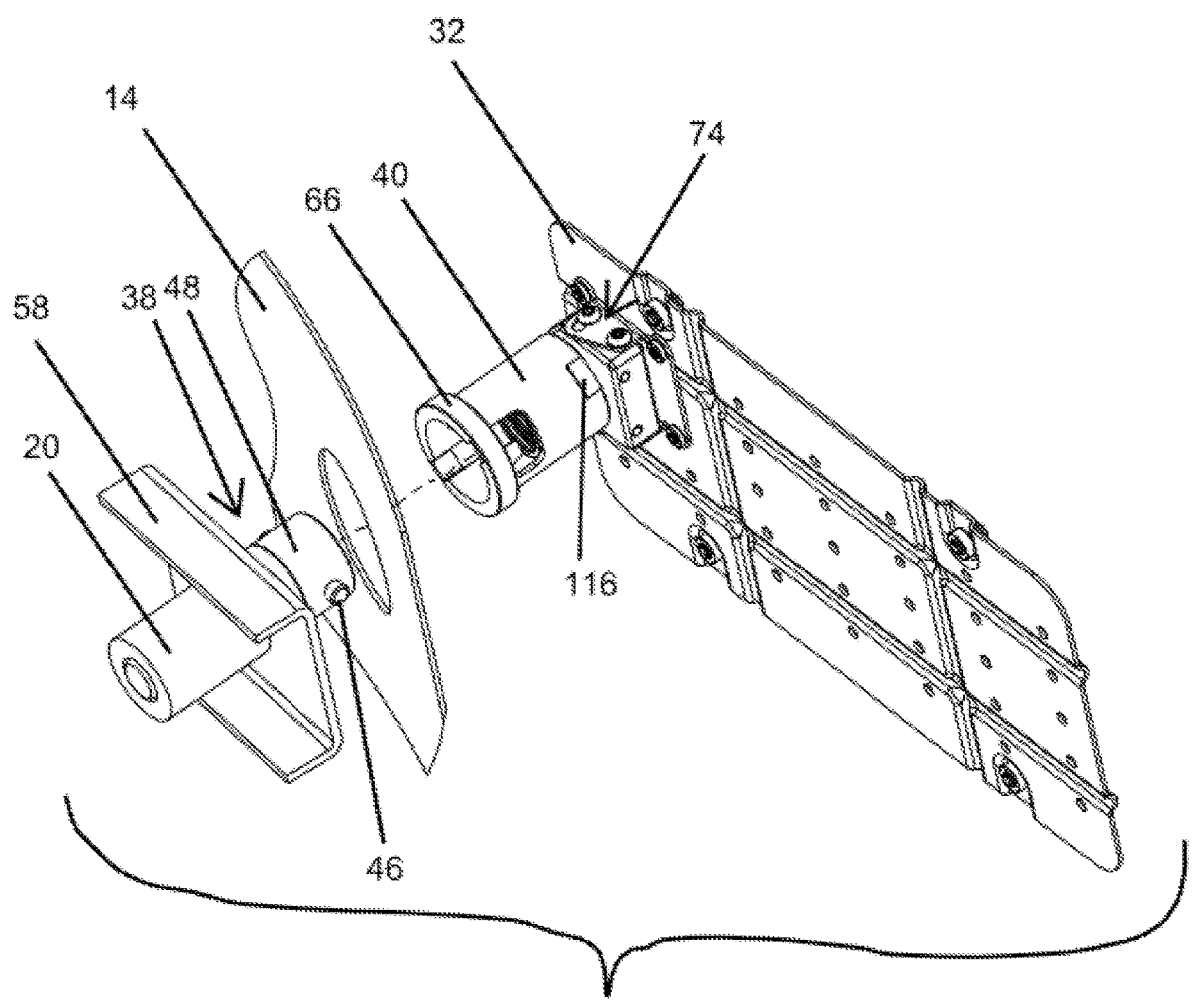
FIG. 17 is an exploded perspective view illustrating the bayonet housing coupled to the quick connect license plate bracket and in general alignment with the bayonet lug threadingly engaged with the tow hook boss.
Figure 18:
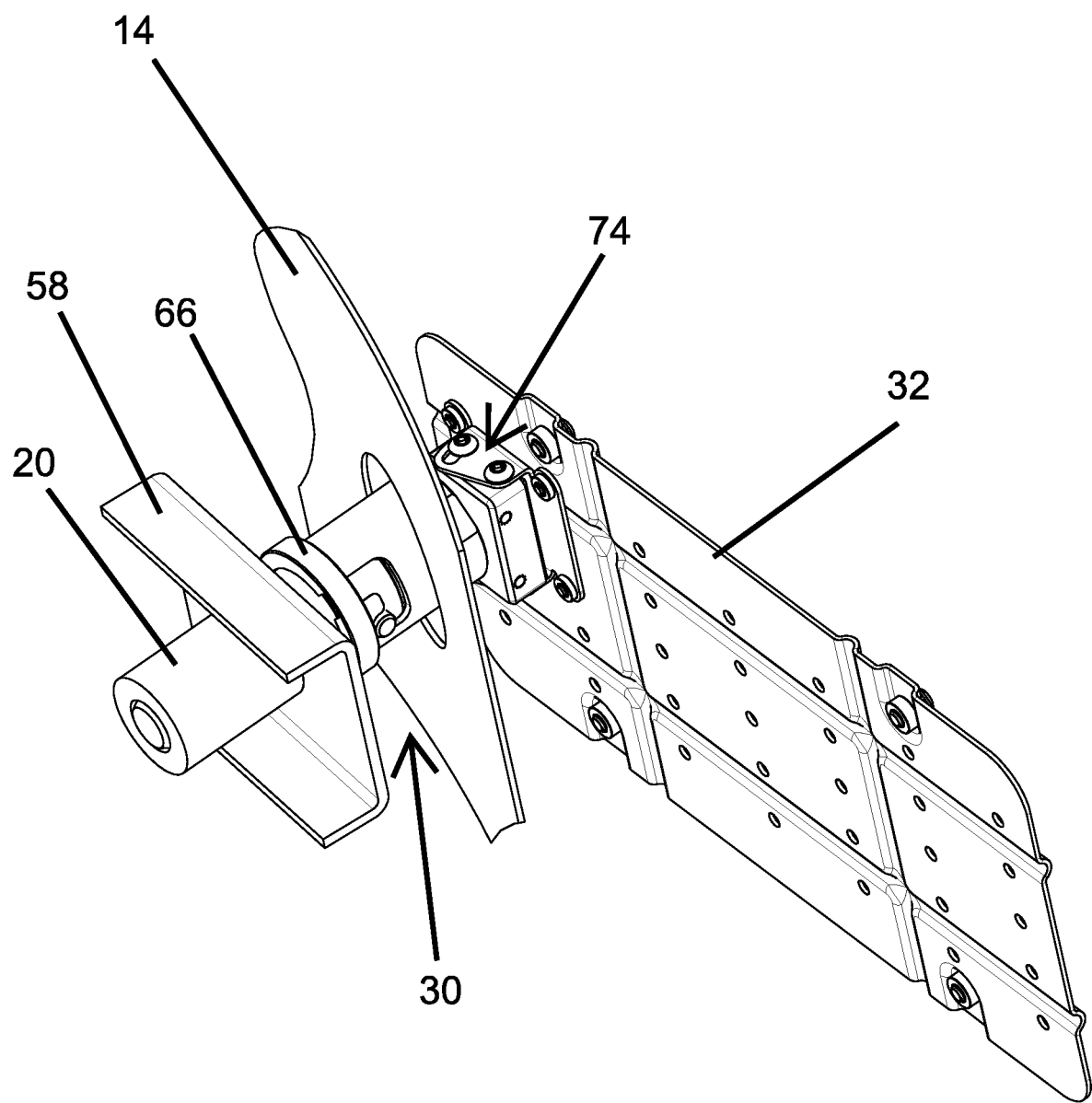
FIG. 18 is a perspective view similar to FIG. 17, further illustrating the bayonet housing coupled with the bayonet lug.

The tilt plate 74 may couple to the quick connect license plate bracket 32 by way of one of a set of bracket apertures 100 using, e.g., a combination of self cinching flush fasteners 102 that receive in threaded reception a set of corresponding threaded fasteners 104. The quick connect license plate bracket 32 may include multiple of the bracket apertures 100 disposed in an array that facilitates flush engagement to the rear surface 78 of the quick connect license plate bracket 32 at a variety of different positions. In the embodiment illustrated in FIG. 15A, the tilt plate 74 is positioned near the middle bottom of the quick connect license plate bracket 32, while FIGS. 16-18 illustrate that the tilt plate 74 may also couple to the quick connect license plate bracket 32 in an upper left-hand corner thereof. Of course, the tilt plate 74 may couple to the quick connect license plate bracket 32 at different locations along the rear surface 78 thereof depending on the layout of the array of bracket apertures 100. In this respect, providing the array of bracket apertures 100 allows the user to select the desired horizontal and/or vertical positioning of the quick connect license plate bracket 32 relative to the tilt plate 74 and/or relative to the front fascia 14 (e.g., to position a license plate flush therewith). This may provide more customized or more optimal positioning of the quick connect license plate bracket 32 (and corresponding license plate) with respect to the vehicle front fascia 14 profile and parking sensor locations (as applicable). Such feature may also accommodate compatibility with multiple vehicles given that there is no standard location across vehicle manufacturers for positioning the access port 18 or the tow hook boss 20 that ultimately couples to the vehicle sub-frame 58. Moreover, such feature may also accommodate differently configured front fascia 14, which also vary from vehicle to vehicle.

Figure 15B:
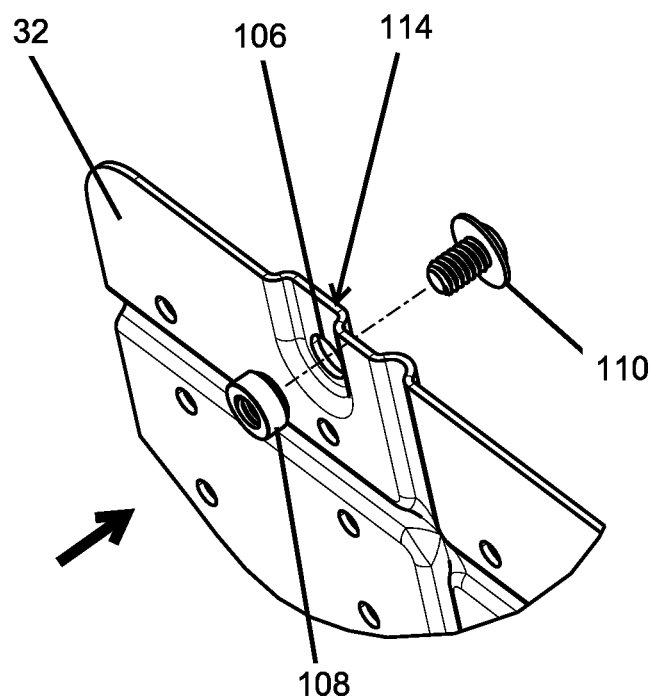
FIG. 15B is an exploded perspective view illustrating a self-cinching fastener aligned with a bracket aperture in an embossment of the quick connect license plate bracket for threaded engagement with a threaded fastener.

The quick connect license plate bracket 32 may also include a plurality of standard apertures 106 having a size and shape for reception of self cinching flush fasteners 108 and corresponding threaded fasteners 110 for securing a standard North American license plate thereto. Moreover, a series of vertical and horizontal embossments 112, 112' (FIGS. 15A and 21) may provide enhanced rigidity to substantially reduce or prevent flexing, bending, twisting, and/or vibration of the quick connect license plate bracket 32 during driving (e.g., from wind). Also, a plurality of side formed embossments 114 provide a pocket for the self-cinching flush fasteners 108 to remain below the surface 78 of the quick connect license plate bracket 32. In this respect, FIG. 15B is an exploded perspective view illustrating one of the self-cinching fasteners 108 aligned with the bracket aperture 100 in one of the embossments 114 of the quick connect license plate bracket 32, and aligned for threaded engagement with the threaded fastener 110. This may help prevent any possible interference of the attachment of tilt plate 74 with the surface 78.

Moreover, the bayonet housing 40 may include a pair of wrenching flats 116 (one side illustrated in FIGS. 17, 20-22, 35, and 39-48) to help torque the fastener 94 and the lock washer 96 into threaded engagement therewith, and for securely positioning the alignment block 86 relative to the bayonet housing 40. Additionally, this allows the alignment block 86 to be clocked to achieve horizontal alignment of the quick connect license plate bracket 32. The fastener 94 is tightened once the alignment block 86 is horizontally aligned and after the bayonet housing 40 is installed to the vehicle 10 to achieve the desired horizontal alignment of the license plate bracket 32. Accordingly, such alignment only needs to be calibrated once when used in connection with the quick connect vehicle attachment 30 as disclosed herein, as opposed to requiring calibration each time, e.g., as disclosed with respect to the prior art attachments capable of coupling to the tow hook boss 20.

Figure 20:
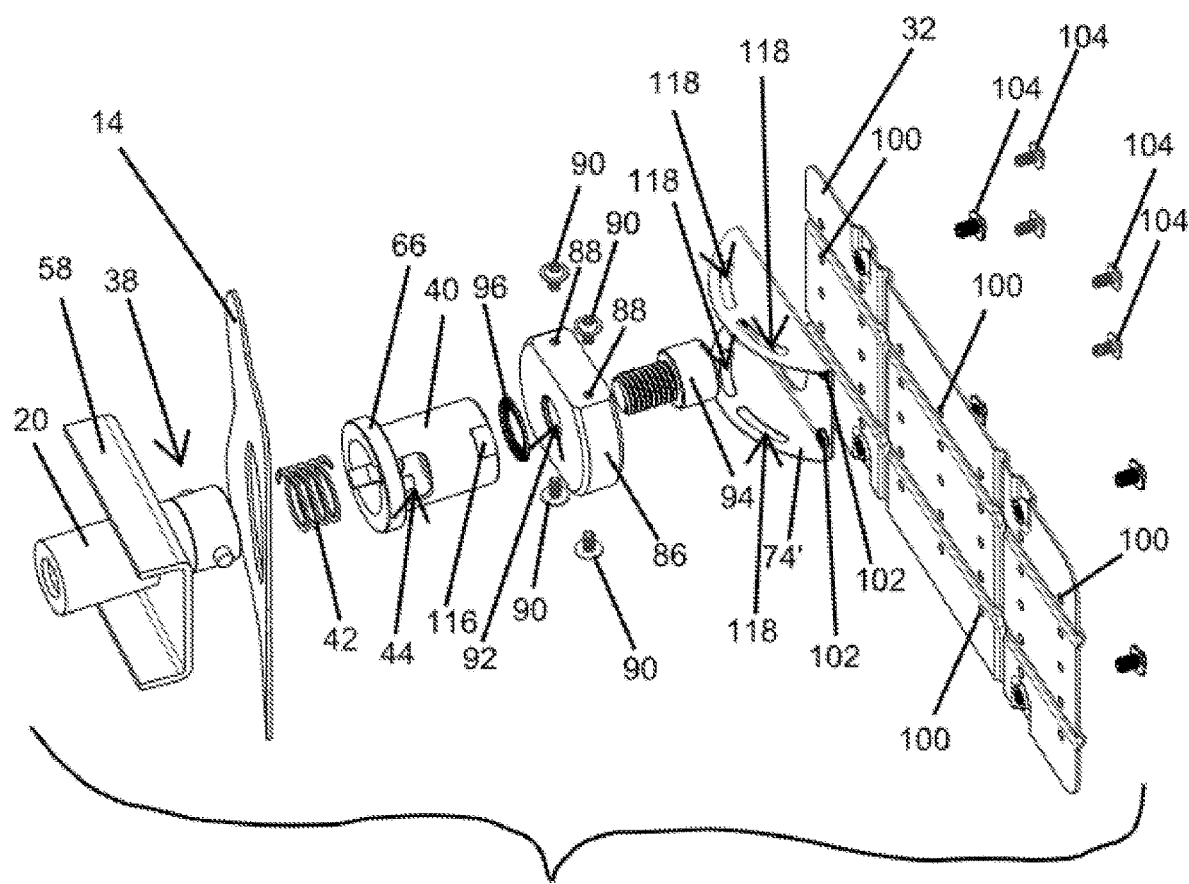
FIG. 20 is an exploded perspective view illustrating an embodiment of an alternative tilt plate compatible with the quick connect vehicle attachment disclosed herein.

FIG. 20 is an exploded perspective view of an alternative embodiment of a tilt plate 74' for use in connection with the quick connect license plate bracket 32. Similar to the embodiments discussed above with respect to FIGS. 15-19, the fastener 94 extends through the bore 92 in the alignment block 86 and through the lock washer 96 for threaded engagement with the bayonet housing 40. Upon tightening, the fastener 94 holds the alignment block 86 against the bayonet housing 40 with the lock washer 96 sandwiched in between. Moreover, the alignment block 86 couples to the alternative tilt plate 74' by way of extending each of the fasteners 90 through a respective set of arcuate channels 118 and into threaded engagement with the mounting apertures 88 of the alignment block 86. Similar to the above, the alternative tilt plate 74' may also attach to the quick connect license plate bracket 32 by way of the self-cinching flush fasteners 102 that selectively threadingly engage with the threaded fasteners 104 that extend through the bracket apertures 100. Again, while FIG. 20 illustrates an array of the bracket apertures 100, the configuration may change depending on the desired mounting.

Figure 21:
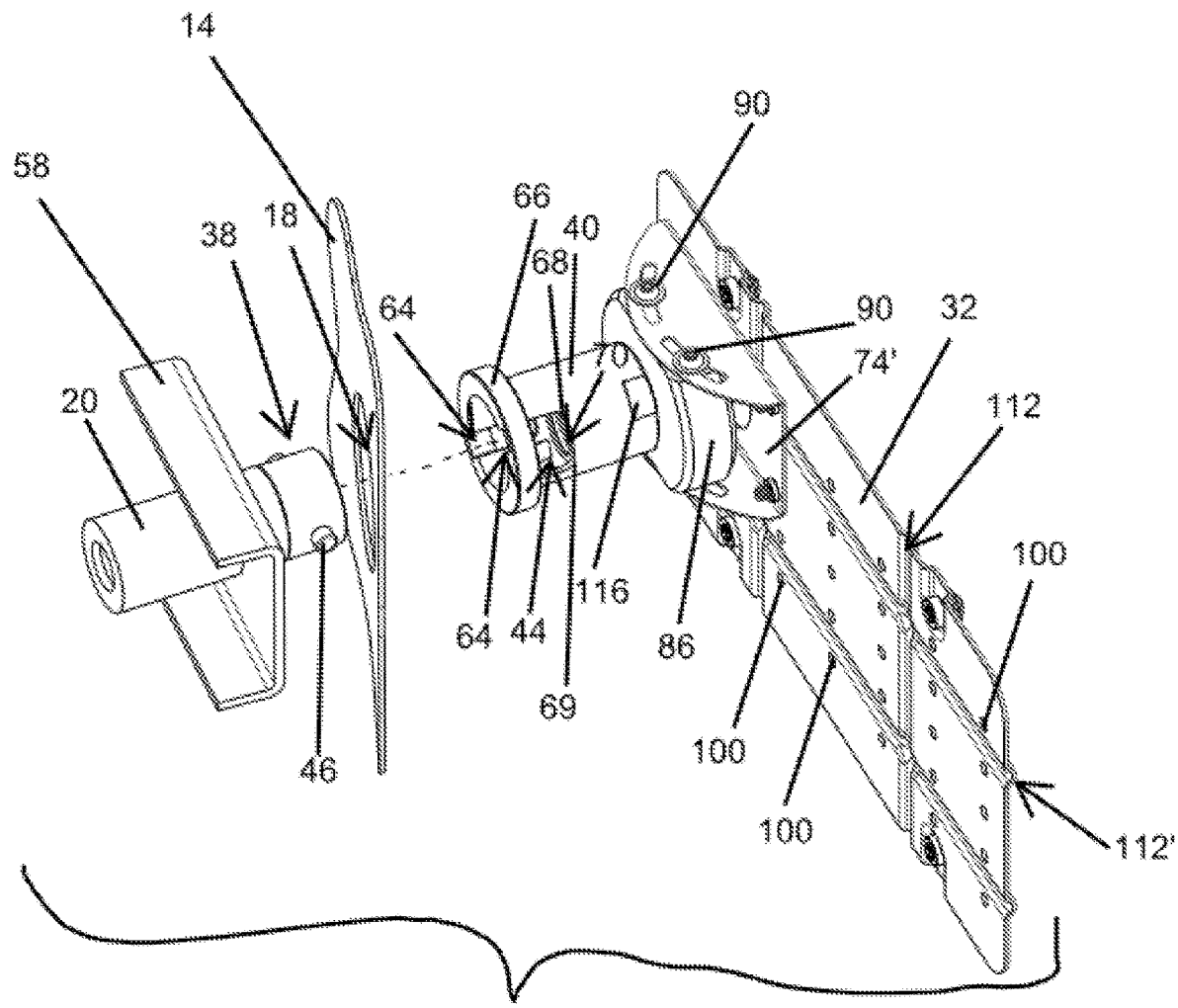
FIG. 21 is an exploded perspective view similar to FIG. 20, illustrating the bayonet housing coupled to the alternative tilt plate and in general alignment with the bayonet lug threadingly engaged with the tow hook boss.

Once assembled, as generally illustrated in FIG. 21, the bayonet housing 40 may simply extend through the access port 18 in the front fascia 14 and into engagement with the bayonet lug 38 through alignment of the locking pin 46 with each of the locking pin channels 64 in the bayonet lip 66. Once the locking pin 46 enters the cam slots 44 to a position adjacent the cam shoulder 68, the bayonet housing 40 may secure to the bayonet lug 38 by rotating the quick connect license plate bracket 32 clockwise such that the locking pin 46 moves within the open channel 70 away from the cam shoulder 68 and into contact with the locking shoulder 69 where the locking pin 46 aligns with the slotted receptacles 72. Releasing the quick connect license plate bracket 32 when in this position allows the spring 42 to force the locking pin 46 into the slotted receptacles 72, thereby applying a constant pre-load thereto to maintain the locking pin 46 therein.

Figure 22:
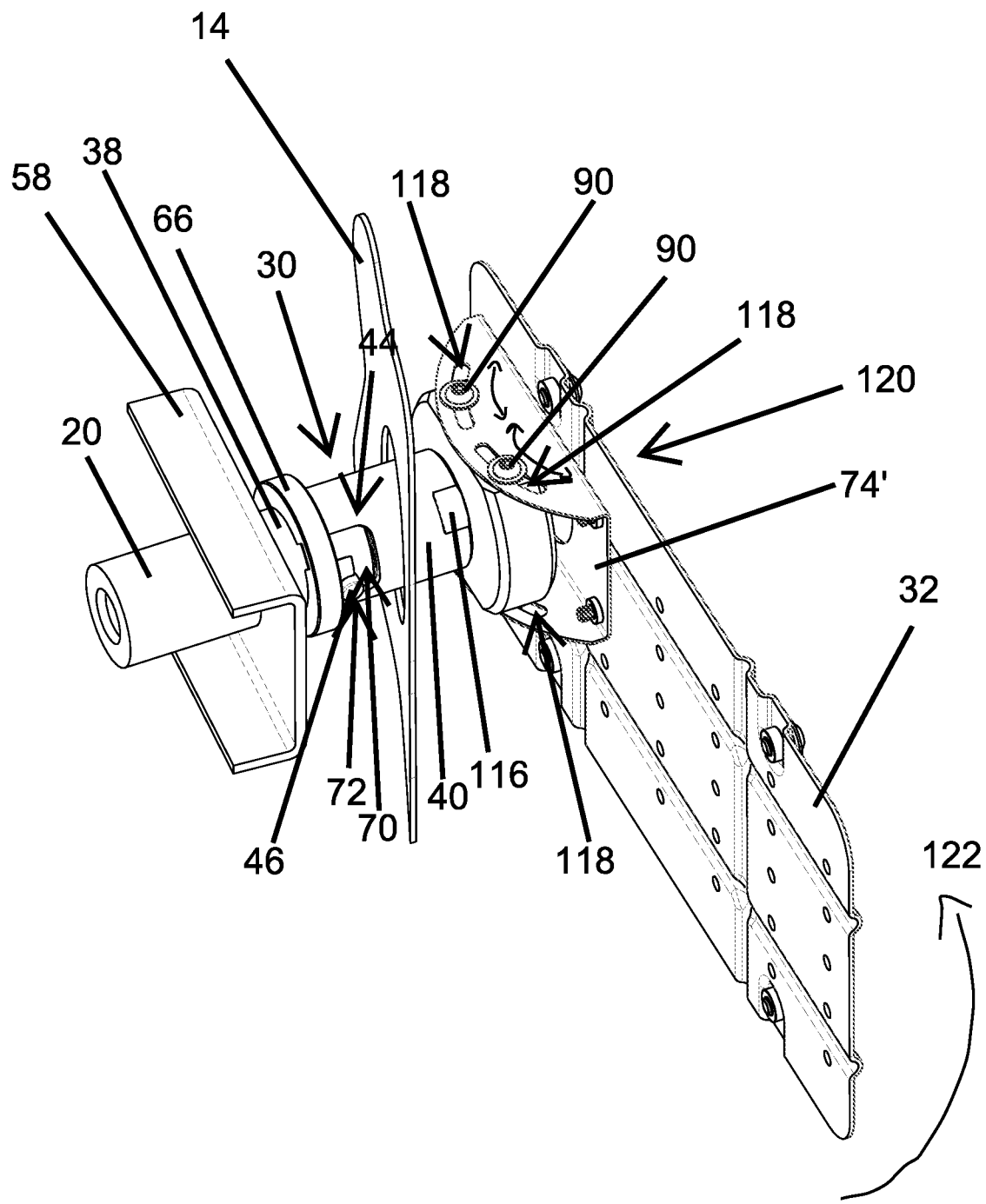
FIG. 22 is a perspective view similar to FIG. 21, further illustrating the bayonet housing coupled with the bayonet lug.
Figure 23:
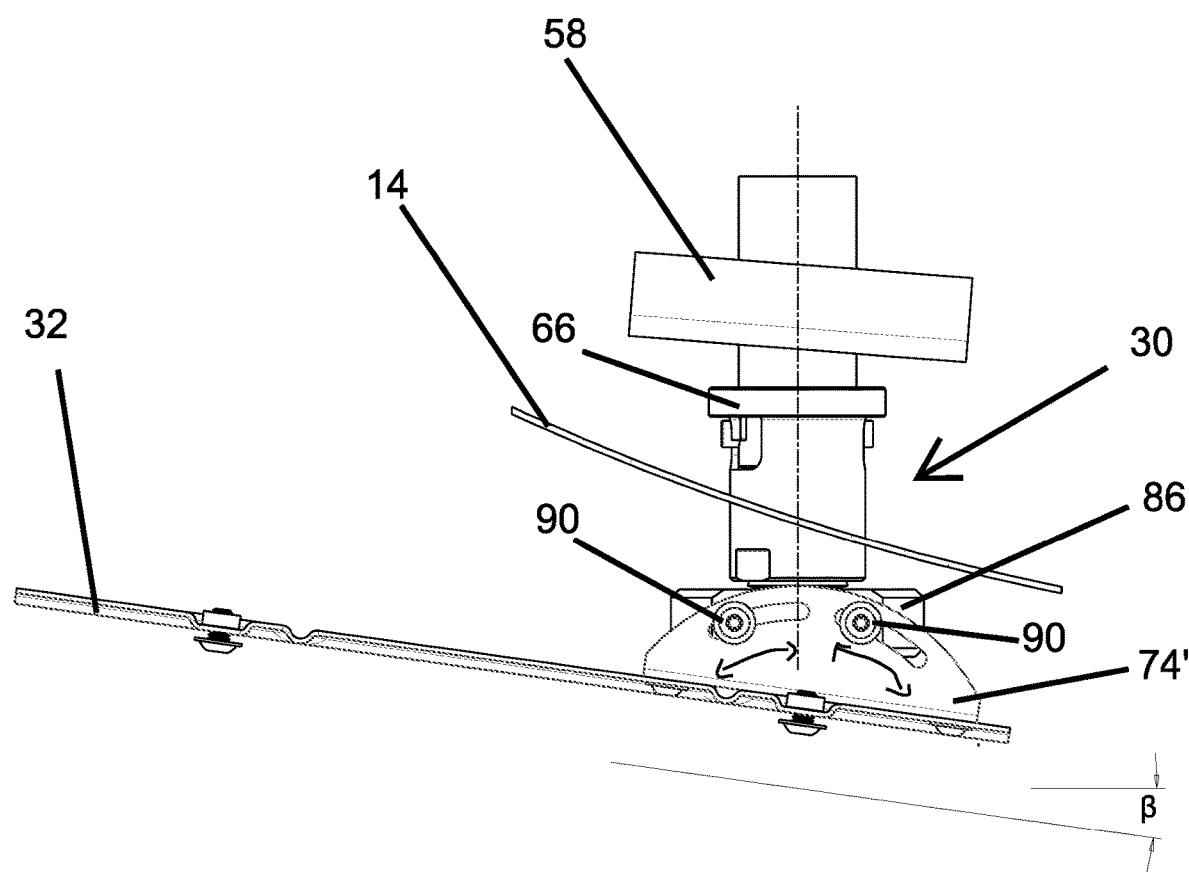
FIG. 23 is a top view of FIG. 22, further illustrating the offset relation and angular adjustability of the quick connect license plate bracket relative to the front fascia by way of the alternative tilt plate.

In this respect, FIG. 22 illustrates the bayonet housing 40 engaged with the bayonet lug 38. The orientation of the quick connect license plate bracket 32 may be manipulated from side to side through movement of the fasteners 90 residing within each of the arcuate channels 118 in the alternative tilt plate 74'. Such potential angular movement is illustrated, e.g., in FIG. 23 with respect to an angle β. In the event that the owner of the vehicle 10 no longer wants to present the quick connect license plate bracket 32 (e.g., having a front license plate coupled thereto) out in front of the fascia 14, the quick connect license plate bracket 32 can be quickly and easily removed by applying pressure along arrow 120 (FIG. 22), which depresses the spring 42 within the interior of the bayonet housing 40 to dislodge the locking pin 46 out from within the slotted receptacles 72. Thereafter, once the locking pin 46 is aligned with the open channel 70 by way of contacting the locking shoulder 69, the quick connect license plate bracket 32 may rotate counterclockwise along arrow 122 such that the locking pin 46 moves within the open channel 70 and into alignment with the locking pin channel 64 when it contacts the cam shoulder 68. Once here, withdrawing the force applied along the arrow 120 permits the spring 42 to expand and push the bayonet housing 40 out from engagement with the bayonet lug 38 to the position, e.g., illustrated in FIG. 21. Once in this position, the cover 22 may be reapplied over the access port 18 to close the front fascia 14 as if the vehicle 10 never had a front license plate attached thereto.

Figure 24:
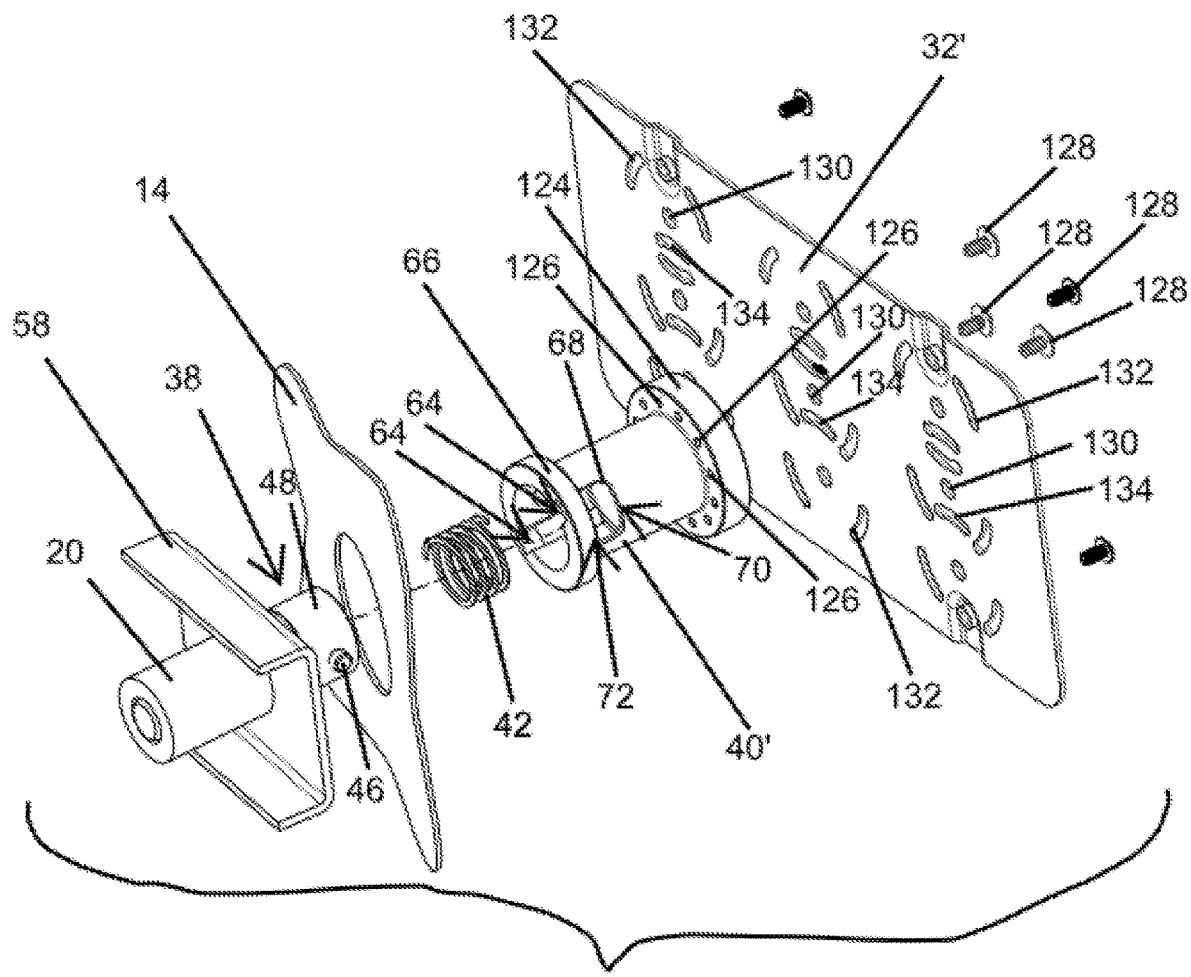
FIG. 24 is an exploded perspective view illustrating an alternative bayonet housing and an alternative quick connect license plate bracket compatible with the bayonet lug disclosed herein.

In another alternative embodiment, FIG. 24 illustrates an alternative bayonet housing 40' for use with an alternative quick connect license plate bracket 32'. Again, in this embodiment, the general operation of the quick connect vehicle attachment 30 is basically the same as the embodiments disclosed above. The bayonet housing 40' includes the spring 42 disposed concentrically therein and the externally accessible locking pin channels 64 that permit slide-in reception of the locking pin 46 protruding from opposite sides of the interface shoulder 48 of the bayonet lug 38. Once engaged into the locking pin channels 64, depressing the spring 42 allows the locking pin 46 to extend into the length of the bayonet housing 40' for eventual engagement against the cam shoulder 68 that turns orthogonally into the open channel 70. Here again, the bayonet housing 40' may rotate relative to the bayonet lug 38 to permit the locking pin 46 to slide within the open channel 70 for alignment with the slotted receptacles 72. Releasing the quick connect license plate bracket 32' then allows the spring 42 to push the locking pin 46 into engagement within the slotted receptacles 72, effectively applying a preload thereto to maintain the locking pin 46 within the slotted receptacles 72 as illustrated, e.g., in FIG. 27.

Figure 25:
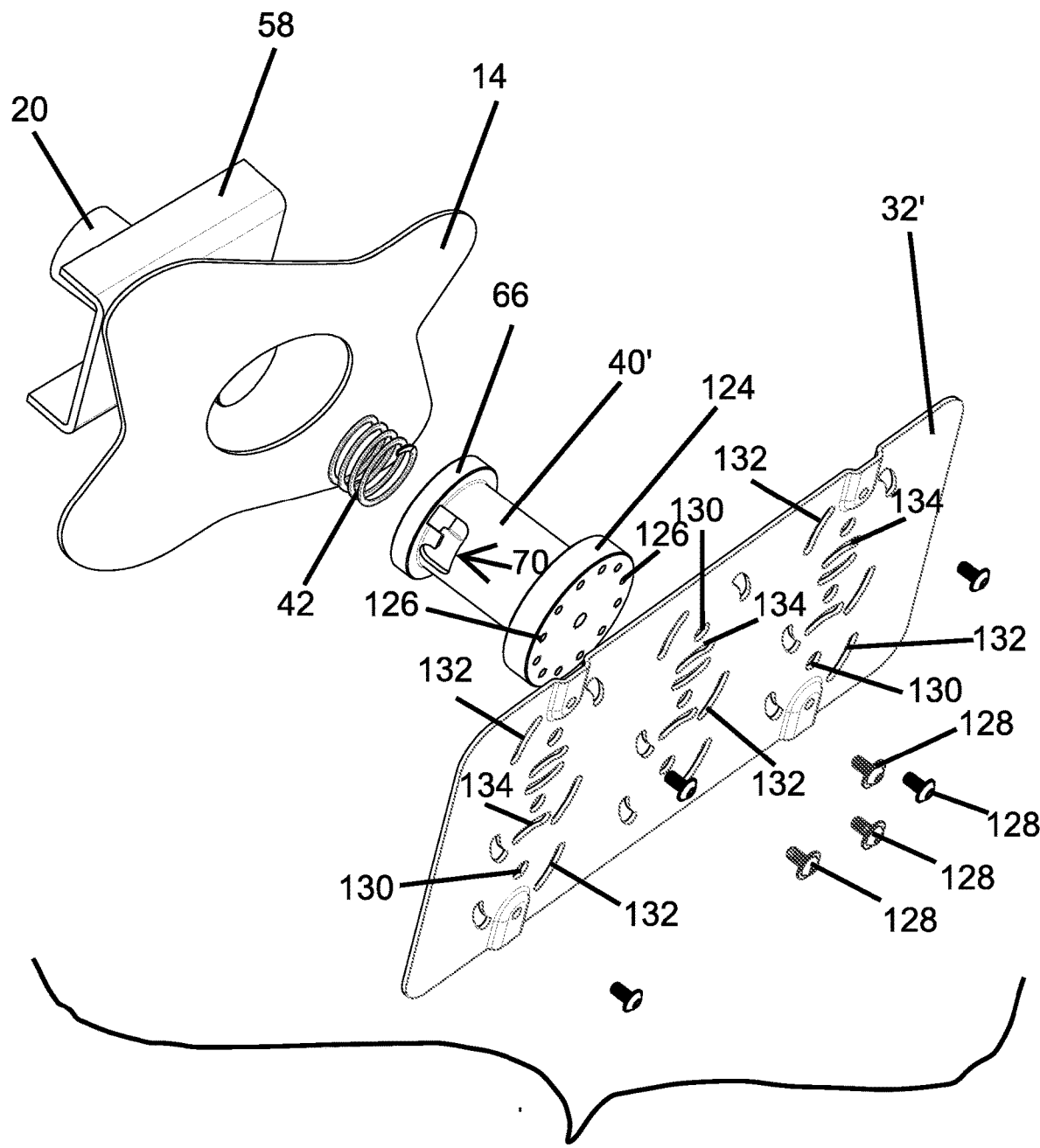
FIG. 25 is an alternative exploded perspective view similar to FIG. 24, further illustrating the alternative bayonet housing in exploded relation relative to the alternative quick connect license plate bracket.
Figure 26:
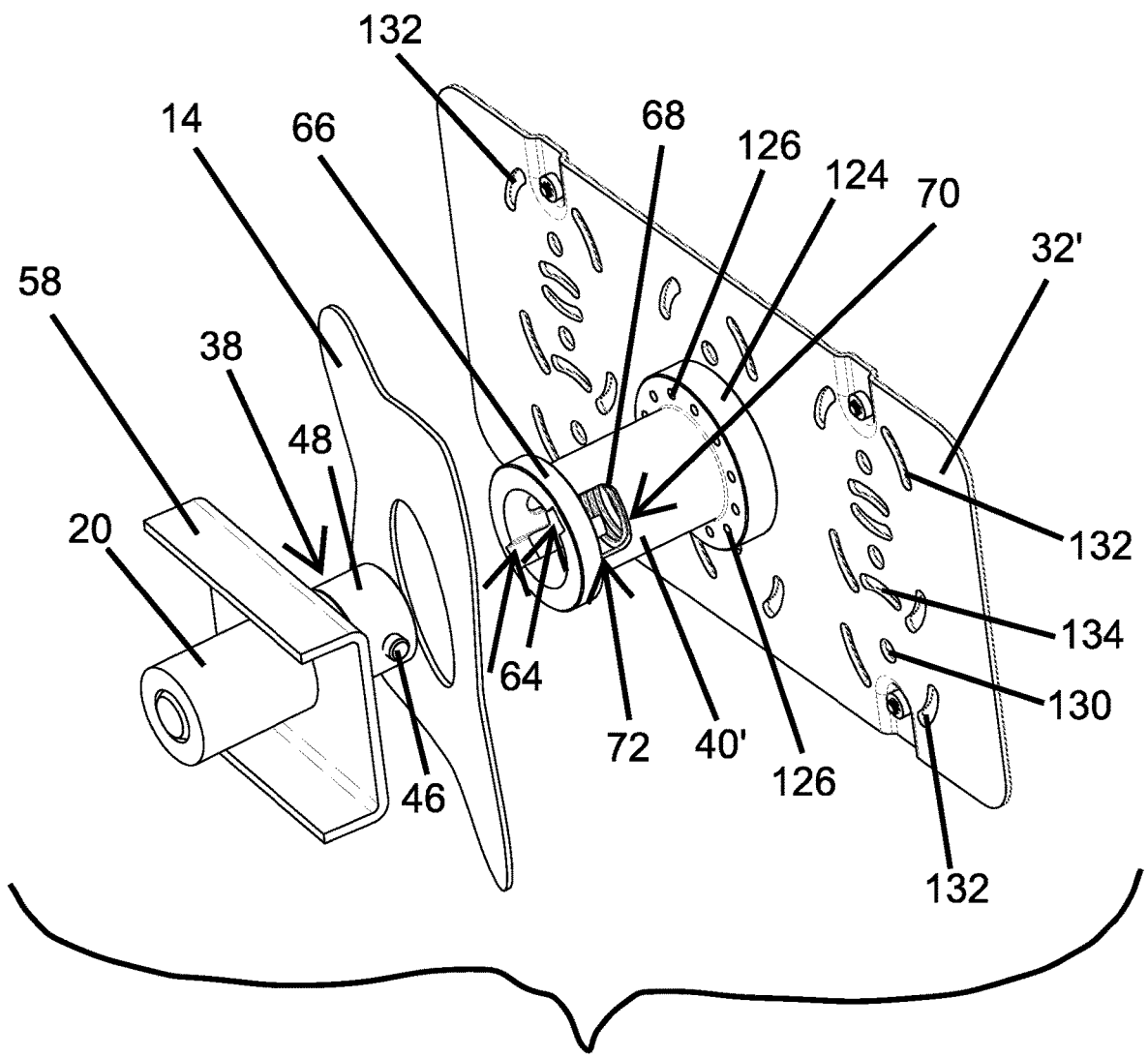
FIG. 26 is an alternative exploded perspective view similar to FIG. 24, further illustrating the alternative bayonet housing coupled with the alternative quick connect license plate bracket about a set of mounting apertures and arcuate channels therein.
Figure 27:
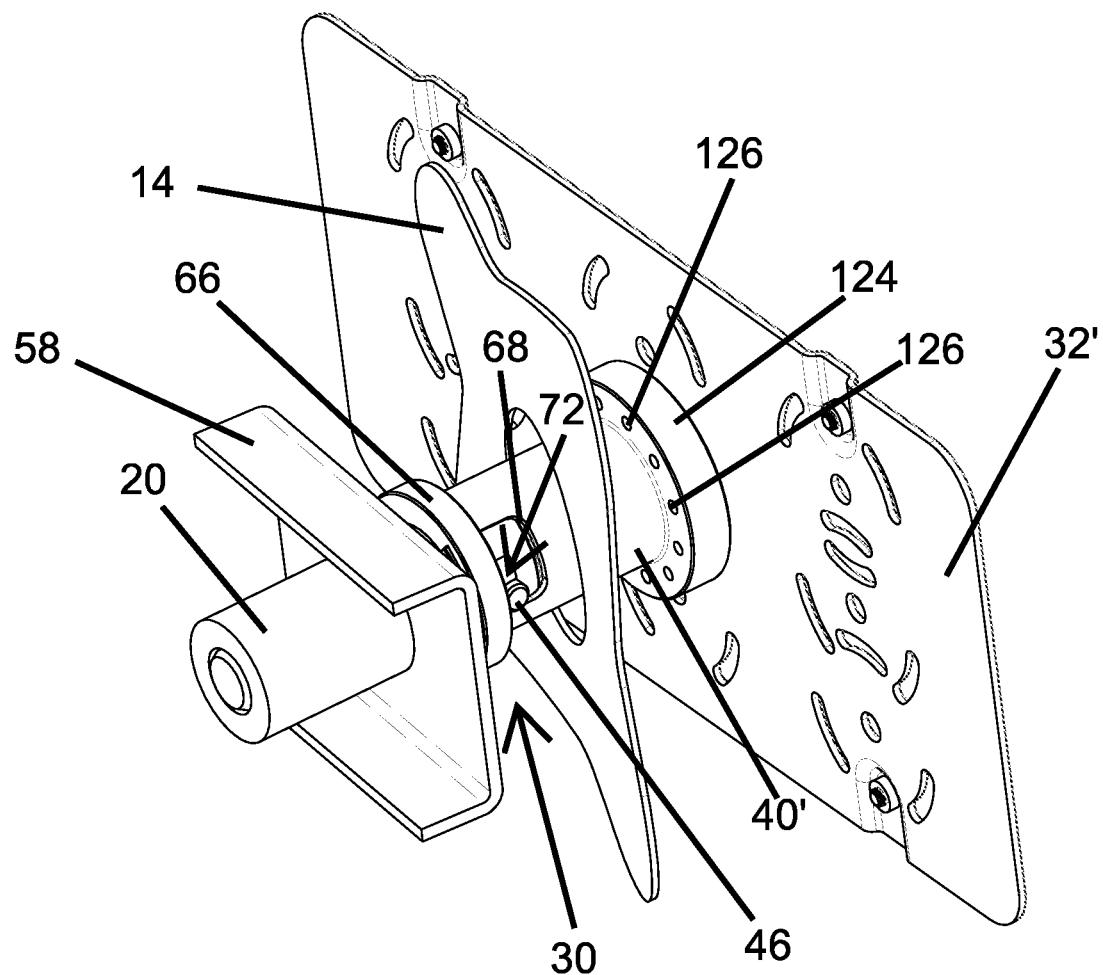
FIG. 27 is a perspective view illustrating the alternative bayonet housing carrying the alternative quick connect license plate bracket coupled to the bayonet lug.

Although, in this embodiment, as best illustrated in FIGS. 24-26, the alternative bayonet housing 40' couples directly to the alternative quick connect license plate bracket 32' by way of an outwardly projecting shoulder 124 having a plurality of mounting apertures 126 therein having a size and shape for receiving one or more fasteners 128 configured for slide-through engagement with one or more of a respective set of mounting apertures 130, a set of arcuate channels 132, or a set of horizontal arcuate channels 134. In this respect, the mounting apertures 126 may engage any of the mounting apertures 130, the arcuate channels 132, and/or the horizontal arcuate channels 134 to orient the alternative quick connect license plate bracket 32' as needed and/or desired. Of course, the embodiment illustrated with respect FIG. 24 is simply an example layout. Each of the apertures 130, the arcuate channels 132, and/or the horizontal arcuate channels 134 may be formed into the alternative quick connect license plate bracket 32' in many different configurations, depending on the desired orientation(s).

In another aspect of the embodiments disclosed herein, FIGS. 28-30 more specifically illustrate the quick connect tow hook attachment 34. As shown, the quick connect tow hook attachment 34 may include a trunnion 136 designed to provide connection to a tow eye 138 as well as provide strength and rigidity to the assembly of the quick connect tow hook attachment 34. In this respect, as shown in FIGS. 28-30, the trunnion 136 may attach to the bayonet housing 40 using a hex fastener 140 configured to slide through a channel 142 in the trunnion 136 and a neoprene ring 144 (used to provide rotational friction between the trunnion 136 and the hex fastener 140) for threaded engagement with a threaded aperture 146 in the bayonet housing 40. A pre-load washer 148 positioned between the trunnion 136 and the bayonet housing 40 allows for a tight connection therebetween. A pair of load bearing connection pins 150 on both sides of the trunnion 136 allow for easy connection of the tow eye 138, namely the pins 150 press-fit into the trunnion 136 through a respective pair of apertures 152 therein. A pair of neoprene rings 154 may be used to provide rotational friction between the pins 150 and the tow eyes 138 to help eliminate free movement of the tow eye 138 during use. Moreover, a lock pin 156 may engage an optional rotational stop 158 (FIG. 29) when fully assembled to help prevent the tow eye 138 from interfering with the front fascia 14 of the vehicle 10. The lock pin 156 may secure therein through an aperture 160 in the trunnion 136 as best illustrated in FIG. 28.

Figure 31:
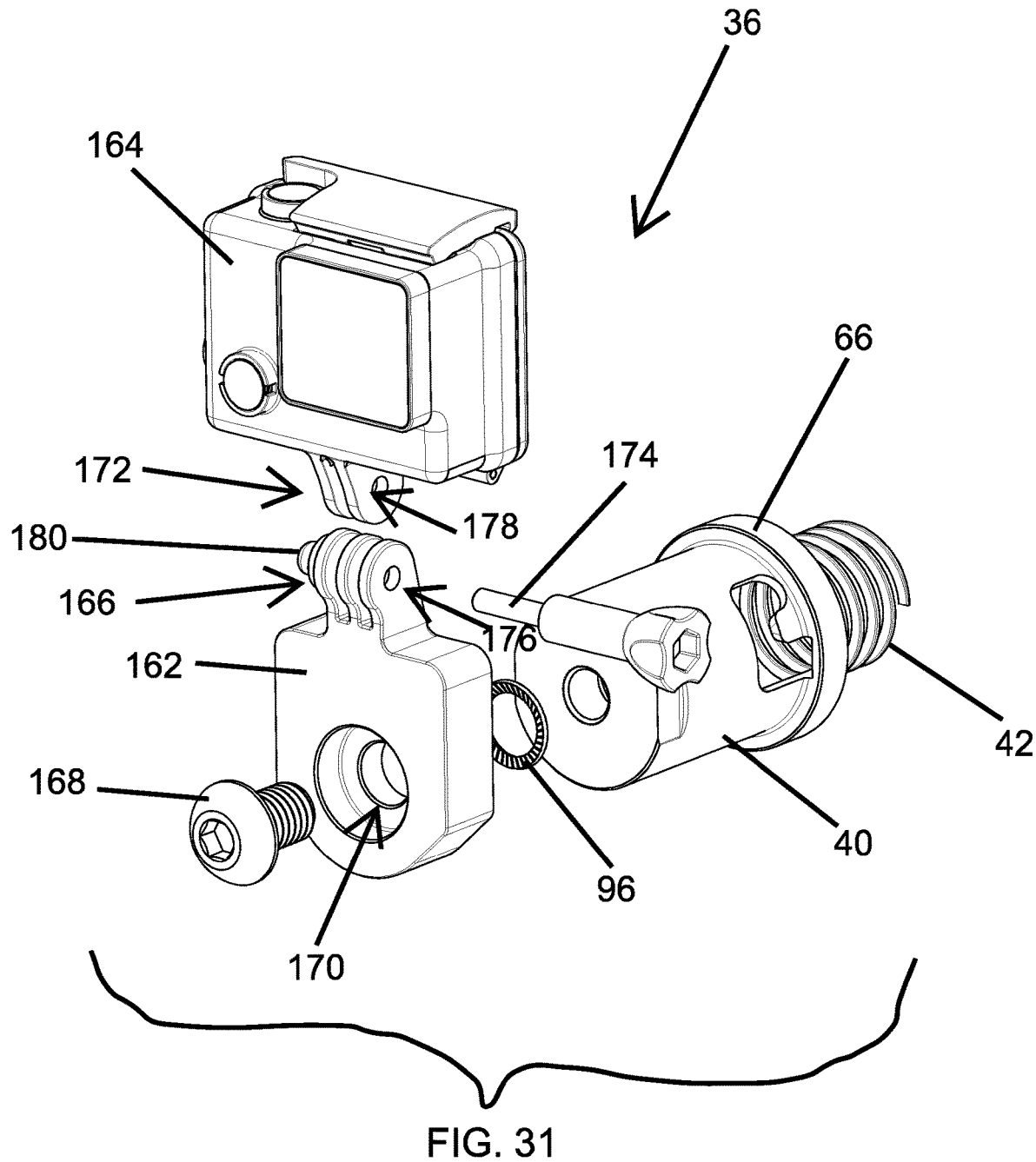
FIG. 31 is an exploded perspective view of a quick connect camera attachment.
Figure 32:
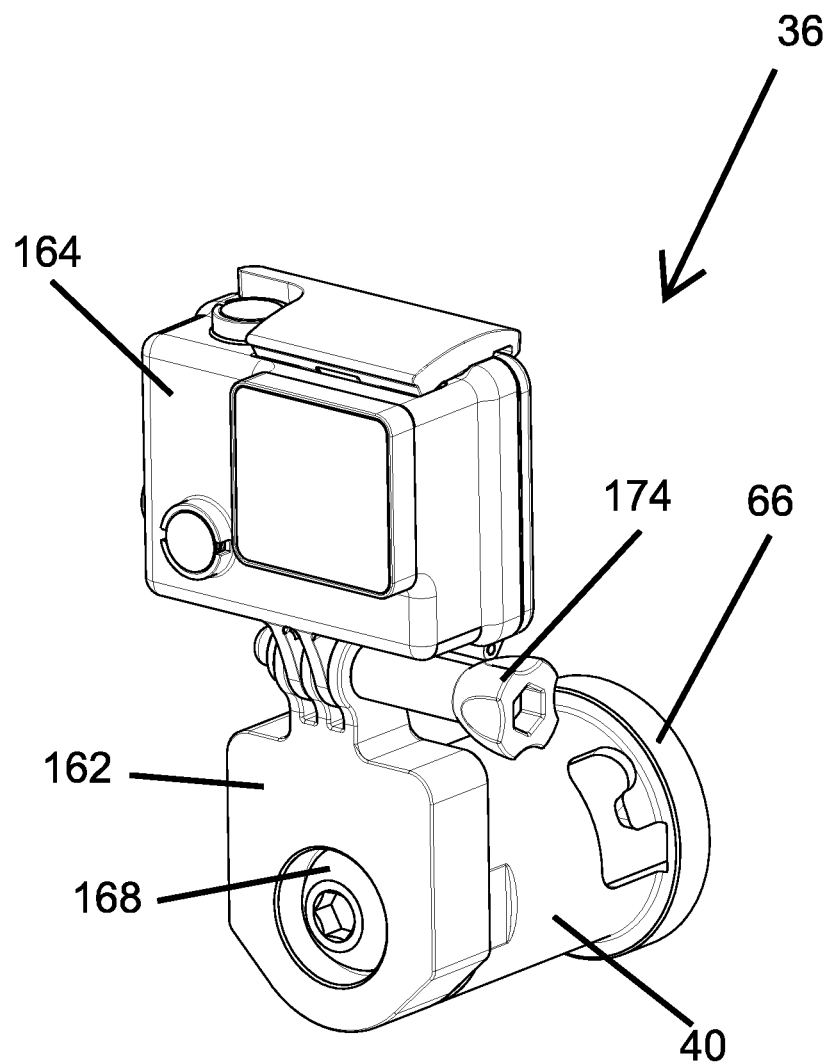
FIG. 32 is a perspective view illustrating the quick connect camera attachment of FIG. 31 fully assembled.

In another embodiment, FIGS. 31-32 more specifically illustrate the quick connect camera attachment 36. Here, the quick connect camera attachment 36 includes a camera block 162 designed to provide a secure connection for a camera 164 with a compatible slotted attachment 166 (i.e., for attachment to a GoPro or the like). The camera block 162 may attach to the bayonet housing 40 via a hex fastener 168 and by using a lock washer 96 in between the camera block 162 and the bayonet housing 40 to secure the connection and prevent the camera 164 from rotating during use. Moreover, a slotted aperture 170 in the camera block 162 may be designed to retain the hex fastener 168 therein, including deep enough to cap, e.g., for aesthetics. The camera 164 may attach to the camera block 162 using a double wing slot 172 that reciprocally engages the slotted attachment 166 with a locking screw 174, which threads through a pair of apertures 176, 178 in the respective slotted attachment 166 and double wing slot 172 for attachment to a self-clinching flush fastener 180.

Figure 34:
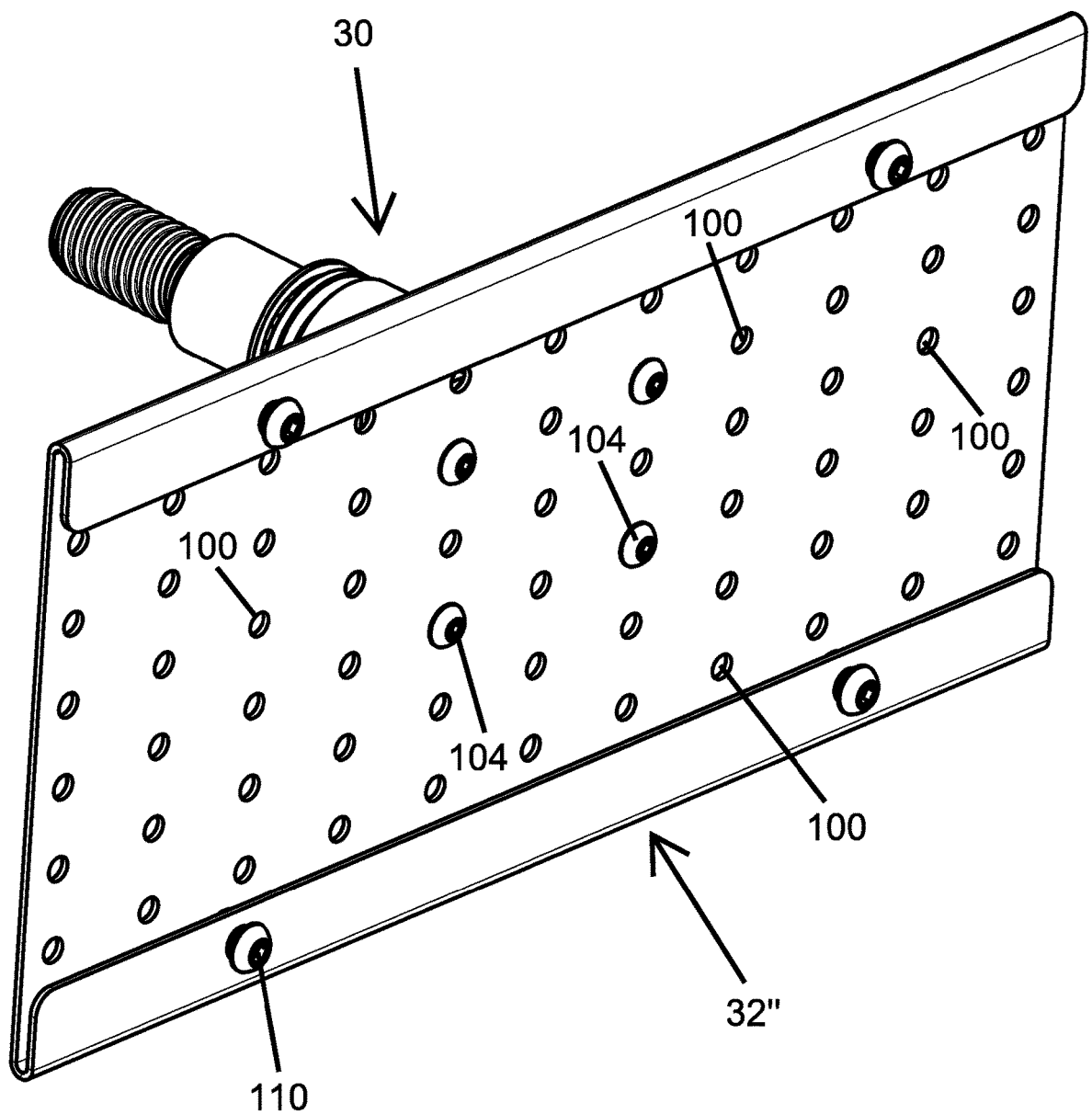
FIG. 34 is a perspective view of another quick connect license plate bracket compatible for use with the quick connect vehicle attachment disclosed herein.
Figure 35:
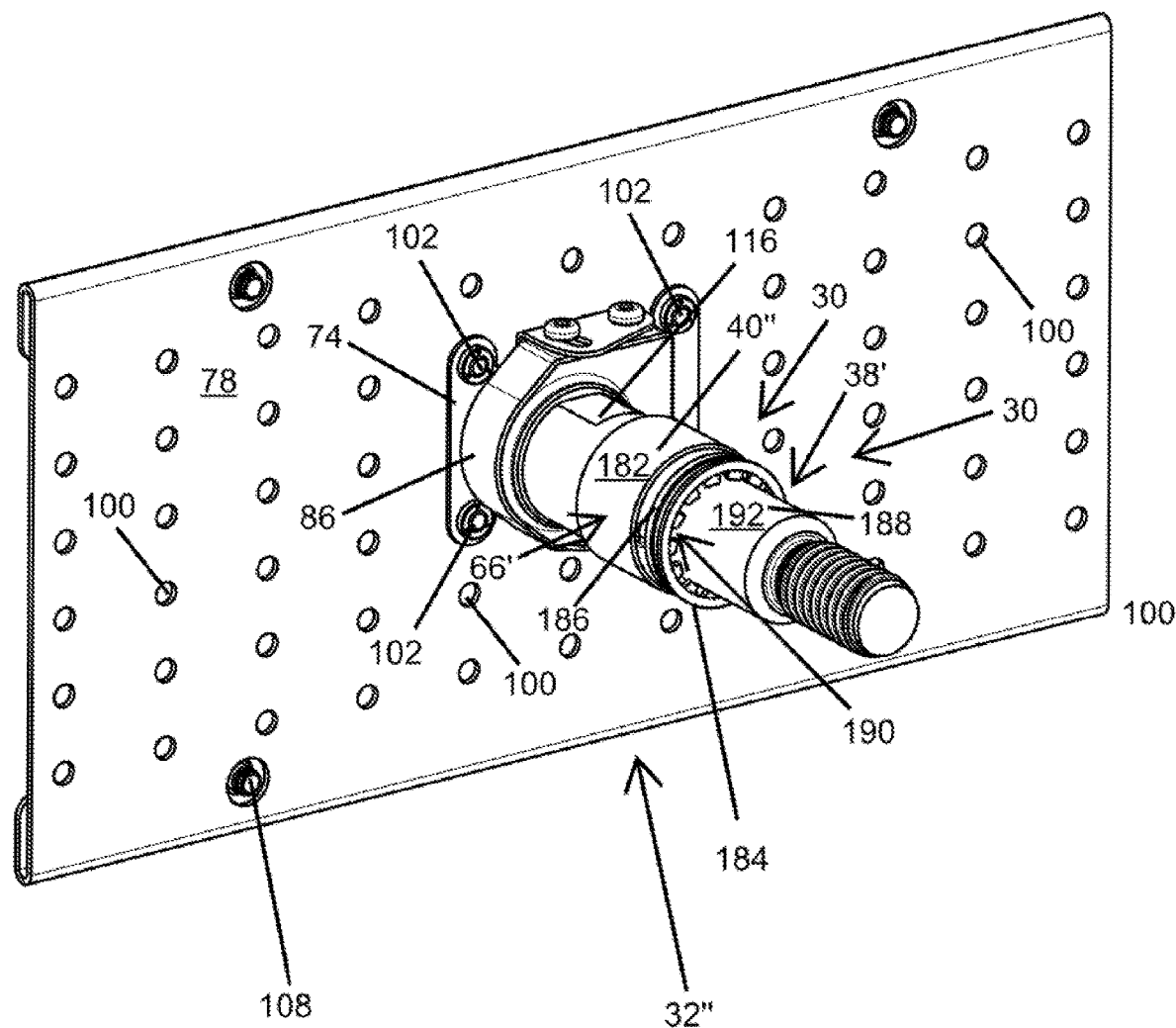
FIG. 35 is another perspective view illustrating the alternative quick connect license plate bracket of FIG. 34 coupled to another alternative bayonet housing having enclosed or hidden cam slots therein and an alternative bayonet lug carrying a compress lock washer.

FIGS. 34 and 35 illustrate another alternative quick connect license plate bracket 32" for use with the quick connect vehicle attachment 30 as disclosed herein. Similar to the embodiments disclosed above, the alternative quick connect license plate bracket 32" illustrated in FIGS. 33 and 34 includes a plurality of the bracket apertures 100 having a size and shape for select reception and retention of a plurality of the threaded fasteners 104 (FIG. 34) therein designed to attach the tilt plate 74 (FIG. 35) thereto, e.g., such as by way of the corresponding self-cinching flush fasteners 102. In the embodiment illustrated with respect to FIGS. 34 and 35, the alternative quick connect license plate bracket 32" includes sixty-six of the bracket apertures 100 arranged in a 6×11 pattern designed to facilitate attachment of the tilt plate 74 thereto in various different configurations. In other embodiments, there may be more or less than 66 of the bracket apertures 100; and the bracket apertures 100 could be distributed in different arrangements, such as a non-linear pattern. Of course, the tilt plate 74' and/or the shoulder 124 of the alternative bayonet housing 40' may also attach to the bracket apertures 100 of the alternative quick connect license plate bracket 32", with appropriate sizing with the bracket apertures 100.

Specifically with respect to the tilt plate 74, e.g., FIG. 35 illustrates that a set of the self-clinching flush fasteners 102 generally couple the tilt plate 74 to the alternative quick connect license plate bracket 32" in about the middle thereof. Although, the tilt plate 74 could connect virtually anywhere within the 6×11 grid of the bracket apertures 100 (e.g., along the upper or lower edges; along the right or left edges; in the upper left-hand corner, upper right-hand corner, lower right-hand corner, lower left-hand corner, etc.), so long as the tilt plate 74 aligns with multiple of the bracket apertures 100 for securement to the alternative quick connect license plate bracket 32" by the self-clinching flush fasteners 102 and the corresponding threaded fasteners 104, as disclosed herein.

Figure 39:
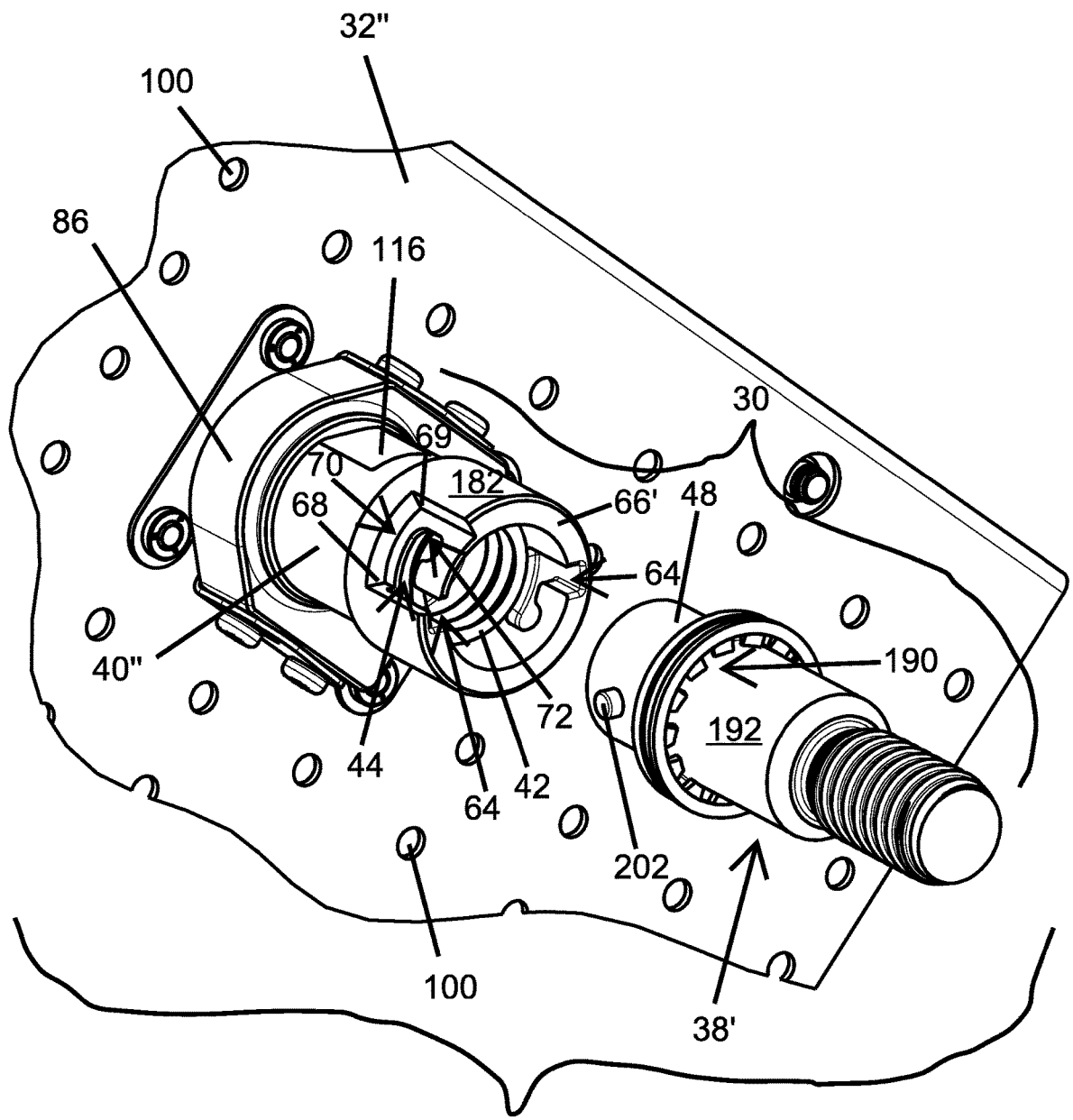
FIG. 39 is an exploded perspective view illustrating the alternative bayonet housing coupled to the alternative quick connect license plate bracket and illustrating a partial cut-away view of the enclosed or hidden cam slots.

FIGS. 35 and 39 also illustrate an embodiment of the quick connect vehicle attachment 30 that includes an alternative bayonet lug 38' and another alternative of a bayonet housing 40" having an elongated bayonet lip 66' extending further down the body of the bayonet housing 40" to enclose or hide the cam slots 44 by an outer cylindrical surface 182 thereof. As shown, the tilt plate 74 couples to the alternative bayonet housing 40" by way of the alignment block 86, as disclosed above. Similarly, the alternative bayonet lug 38' couples to the alternative bayonet housing 40" by way of slide-in reception of the locking pin 46 with the cam slots 44 formed from the alternative bayonet housing 40" and otherwise enclosed or hidden by the outer cylindrical surface 182 of the elongated bayonet lip 66'. Moreover, in this embodiment, the alternative bayonet lug 38' includes a compress lock washer 184 designed to be sandwiched between a flange 186 outwardly extending from a piloting shoulder 188 of the alternative bayonet lug 38' and the landing surface 60 (FIG. 12) of the tow hook boss 20, when the bayonet lug 38' is threateningly engaged therewith. The compress lock washer 184 may include a plurality of internal serrations 190 (best shown in FIGS. 35, 39, and 40) designed to increase frictional resistance by rubbing up against an outer surface 192 of the piloting shoulder 188 of the bayonet lug 38'. This increased frictional resistance generally resists rotational movement of the bayonet lug 38' relative to the tow hook boss 20 when threadingly engaged thereto. As such, the addition of the compress lock washer 184 may better facilitate locking engagement between the bayonet lug 38' and the tow hook boss 20.

Figure 36:
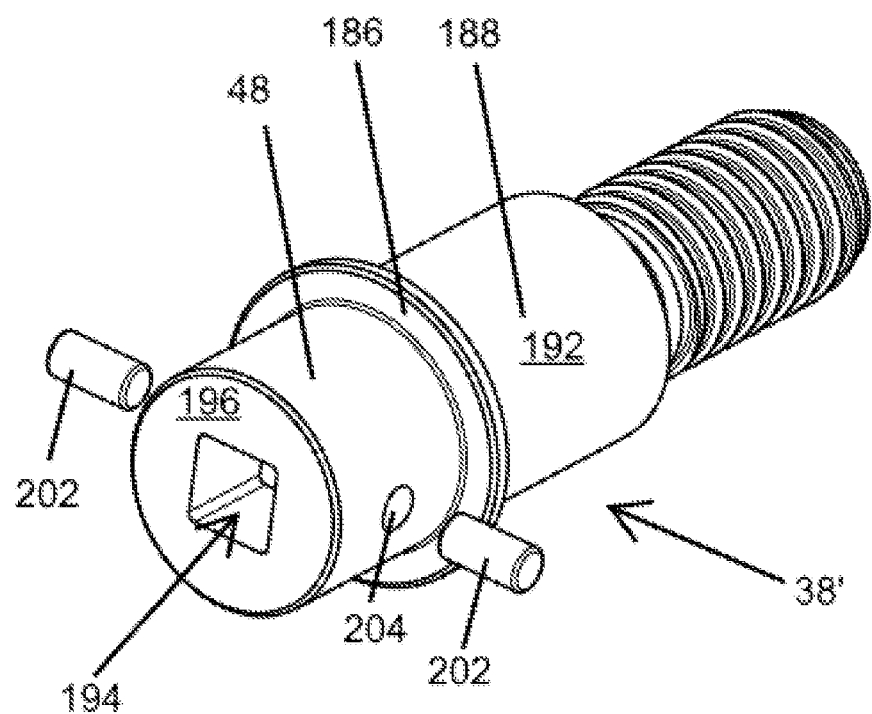
FIG. 36 is a perspective view of the alternative bayonet lug of FIG. 35, further illustrating a socket drive access opening and a pair of shortened locking pins in exploded relation relative to an interface shoulder.
Figure 37:
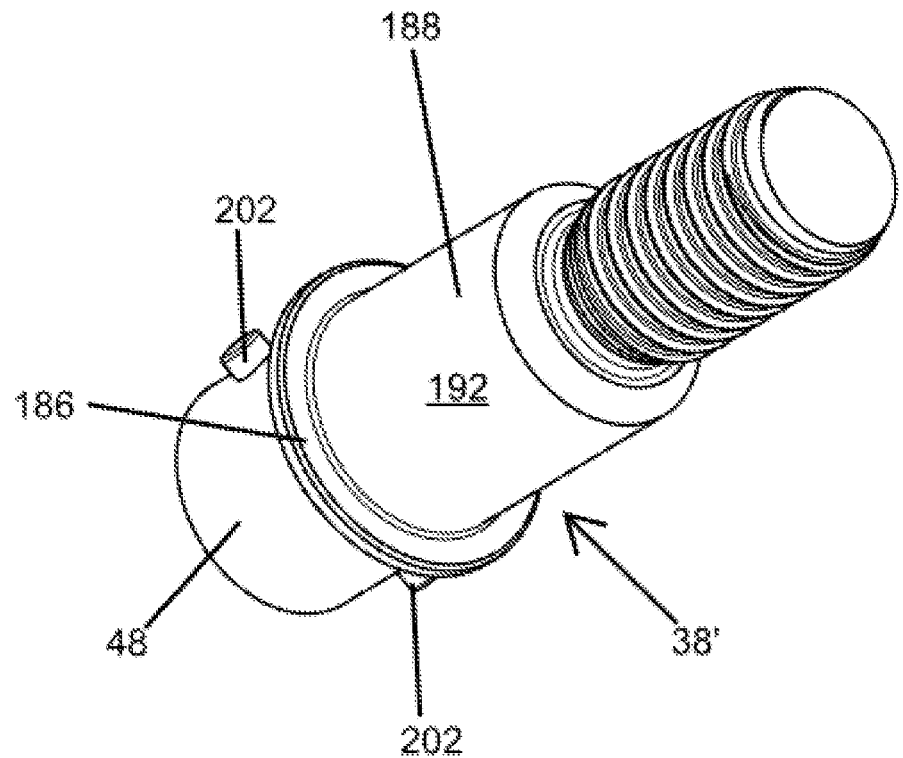
FIG. 37 is a rear perspective view of the alternative bayonet lug illustrated in FIG. 36, further illustrating insertion of the pair of shortened locking pins into the interface shoulder.
Figure 36:
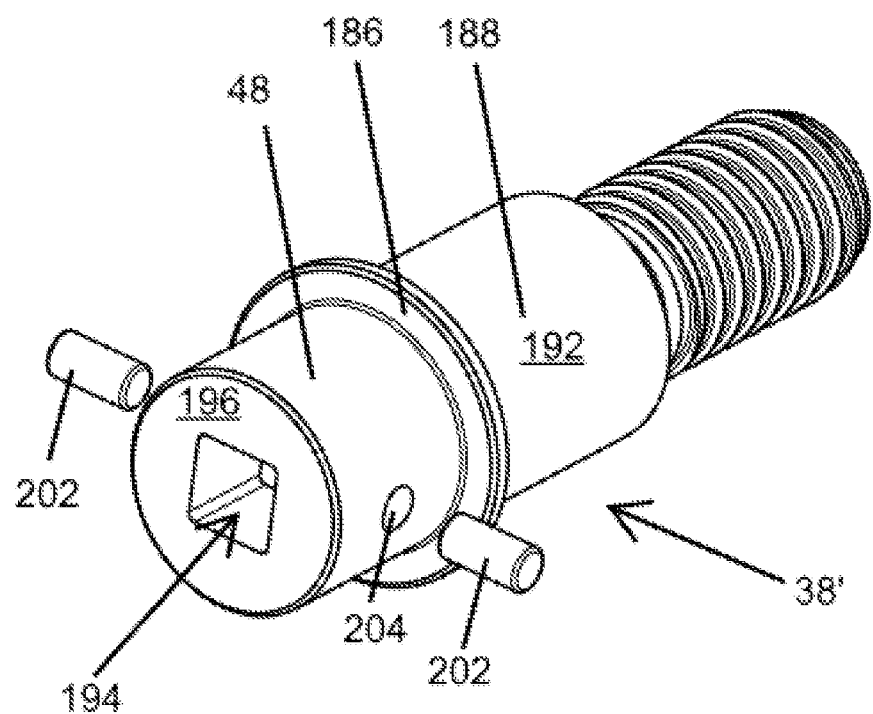
Figure 37:
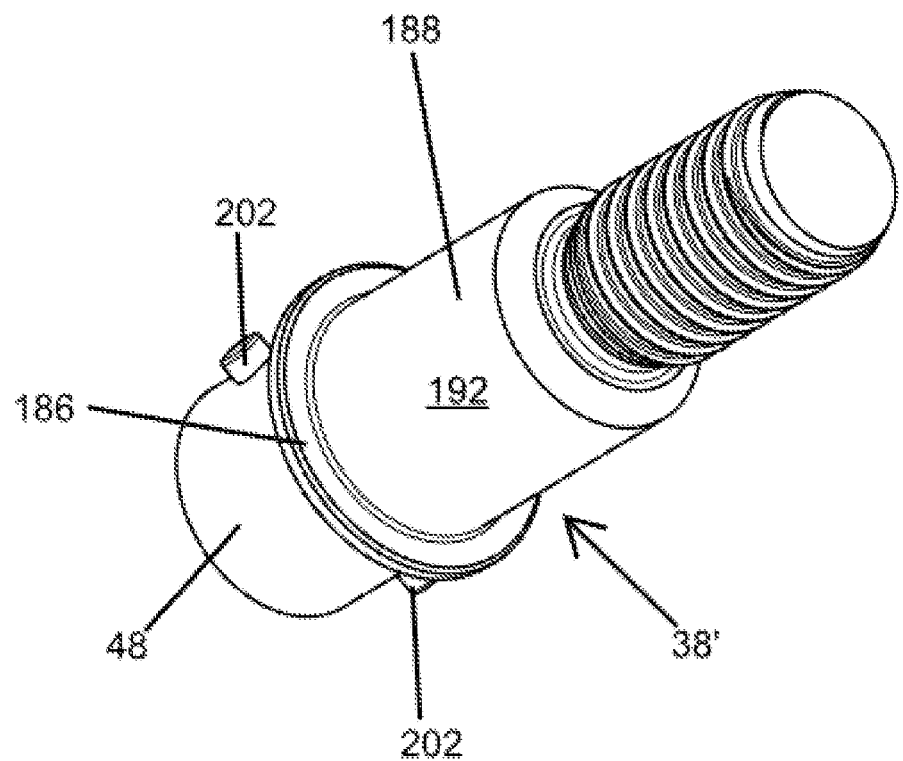
Figure 38:
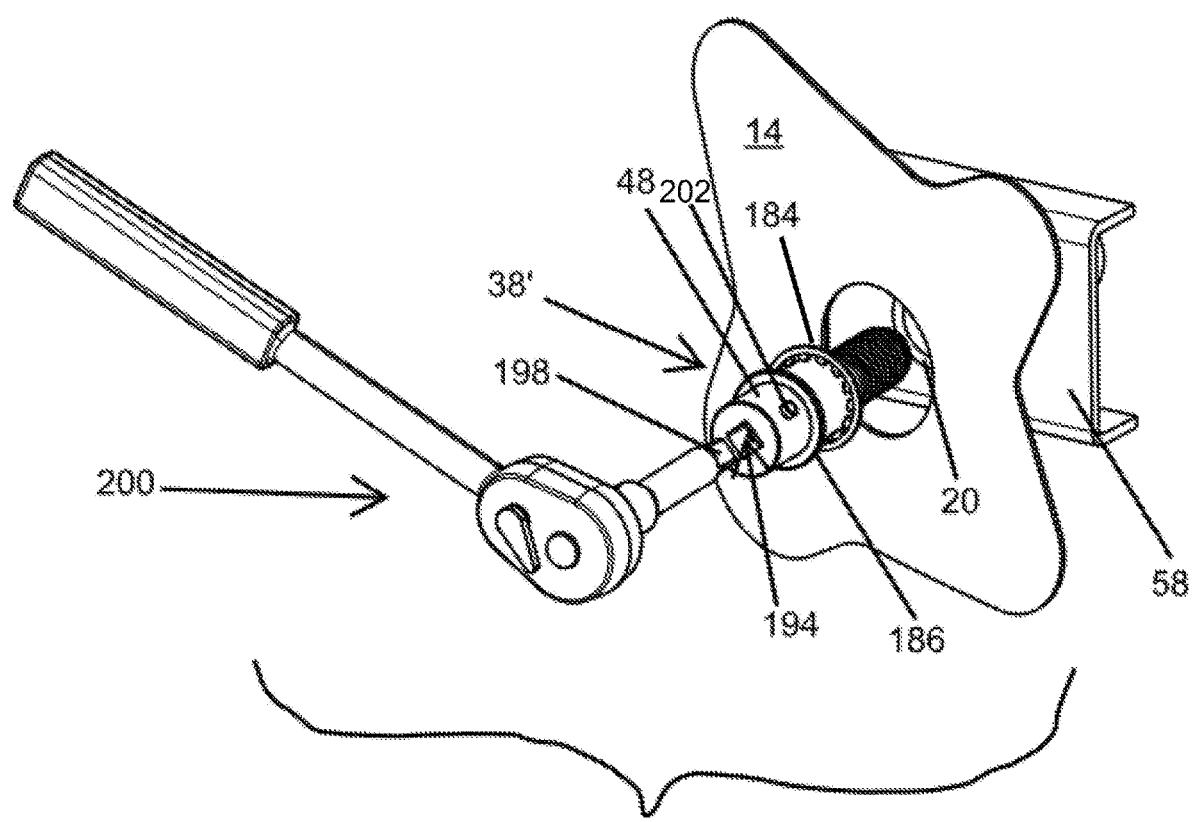
FIG. 38 is an exploded perspective view illustrating a ratchet wrench aligned with the socket drive access opening for tightening the alternative bayonet lug with the tow hook boss.

FIGS. 36 and 37 more specifically illustrate the alternative bayonet lug 38', including the flange 186 extending out from the outer surface 192 of the piloting shoulder 188. Moreover, FIG. 36 illustrates that the alternative bayonet lug 38' also includes a socket drive access opening 194 formed from a front surface 196 of the interface shoulder 48. The socket drive access opening 194 has a size and shape to selectively receive an extension driver 198 of a ratchet wrench 200, such as a ⅜ drive ratchet, as generally illustrated in the exploded perspective view of FIG. 38. The ratchet wrench 200 can be used to safely and quickly tighten the alternative bayonet lug 38' to the tow hook boss 20 of the sub-frame 58, including ensuring that the compress lock washer 184 remains snugly sandwiched between the flange 186 and the landing surface 60 of the tow hook boss 20. Conversely, the ratchet wrench 200 and its extension driver 198 may engage the socket drive access opening 194 to loosen the bayonet lug 38' from the tow hook boss 20 in the event that the quick connect vehicle attachment 30 is to be removed from the vehicle 10 in its entirety. In general, the ratchet wrench 200 interfacing with the socket drive access opening 194 provides enhanced mechanical advantage for purposes of tightening and/or loosening the bayonet lug 38' with the tow hook boss 20.

Additionally, FIG. 36 illustrates that the alternative bayonet lug 38' may include a pair of shortened locking pins 202 that engage a respective pair of partial cross-drilled apertures 204 (one illustrated in FIG. 36) as a replacement for the single locking pin 46 that extends through a width of the interface shoulder 48 through the cross drilled aperture 56 discussed above. Here, shortening the locking pins 202 for placement within the partial apertures 204 ensures that the socket drive access opening 194 remains unobstructed for reception of the extension driver 198 from the ratchet wrench 200 during tightening and/or loosening of the bayonet lug 38' with the tow hook boss 20.

Figure 40:
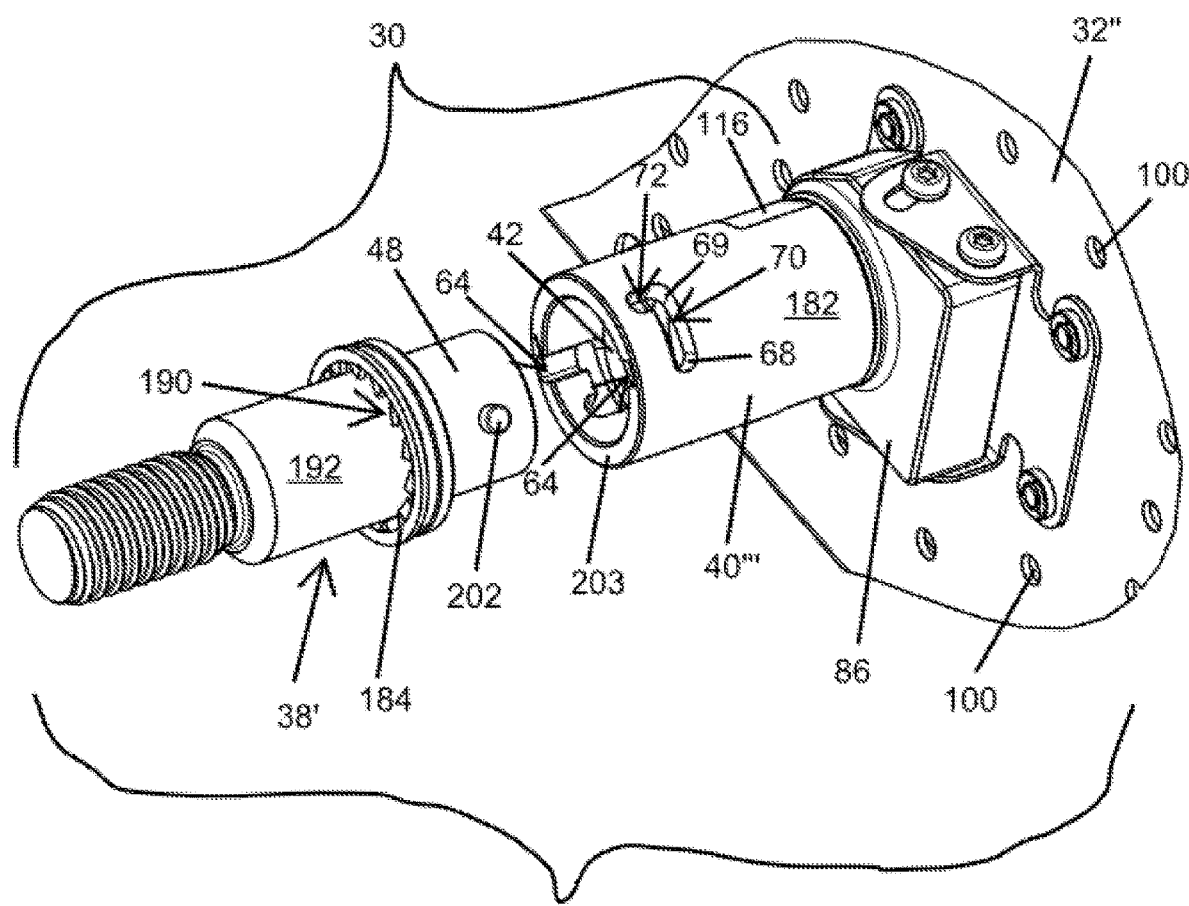
FIG. 40 is an another exploded perspective view similar to FIG. 39, illustrating the alternative bayonet lug in exploded relation relative to the alternative bayonet housing.
Figure 41:
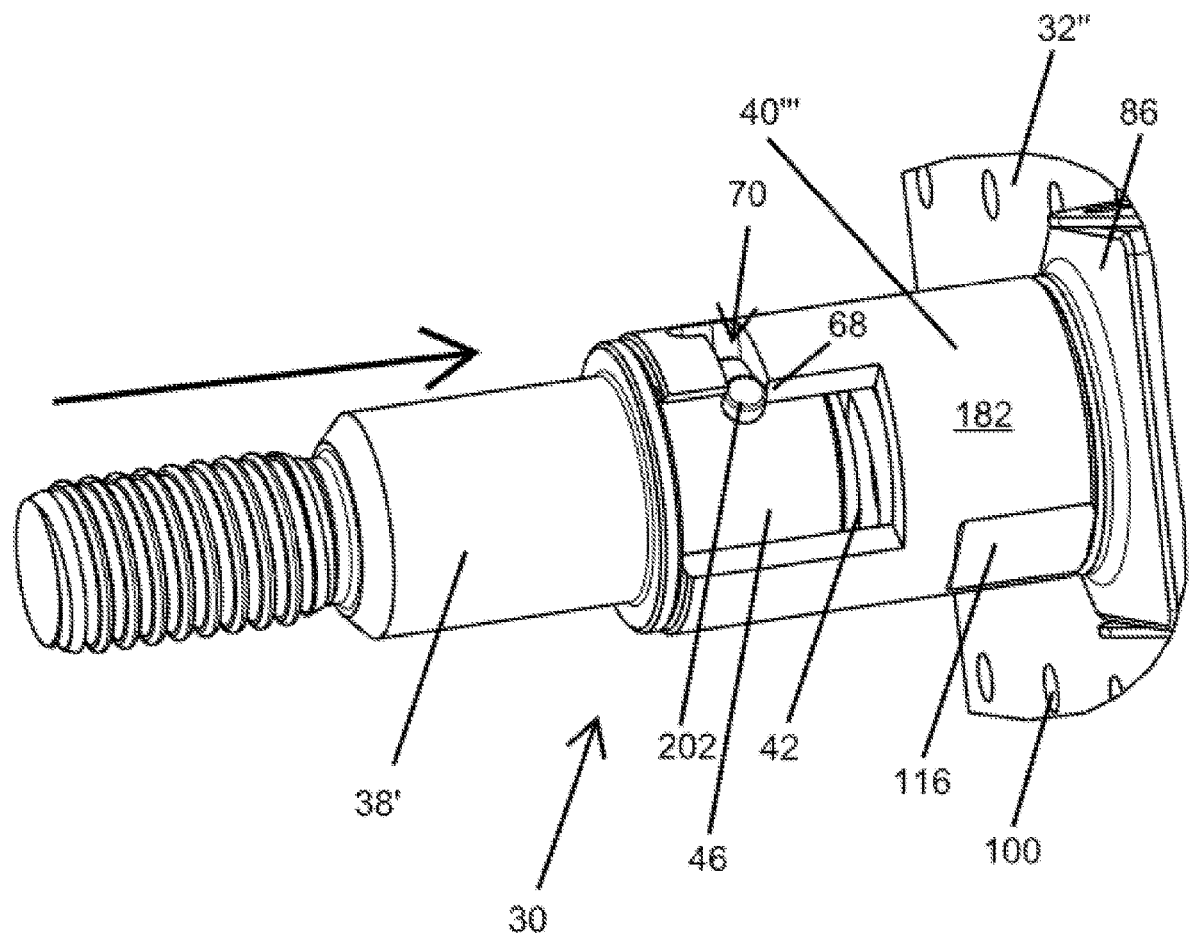
FIG. 41 is a partial cut-away perspective view further illustrating insertion of the shortened locking pins of the alternative bayonet lug within the enclosed or hidden cam slots of the alternative bayonet housing.
Figure 42:
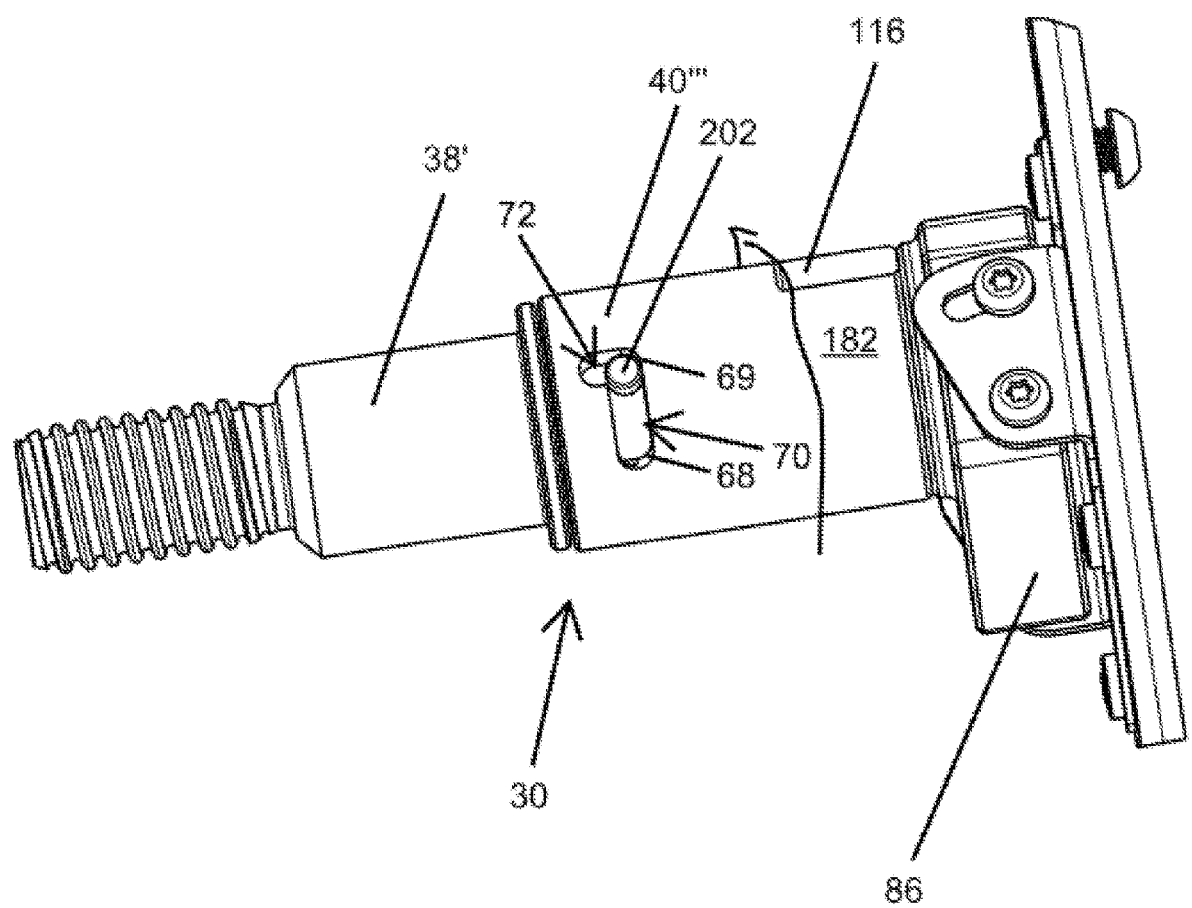
FIG. 42 is a another partial cut-away perspective view of the alternative bayonet lug, further illustrating rotating the bayonet housing to move the shortened locking pins within the enclosed or hidden cam slots therein.
Figure 43:
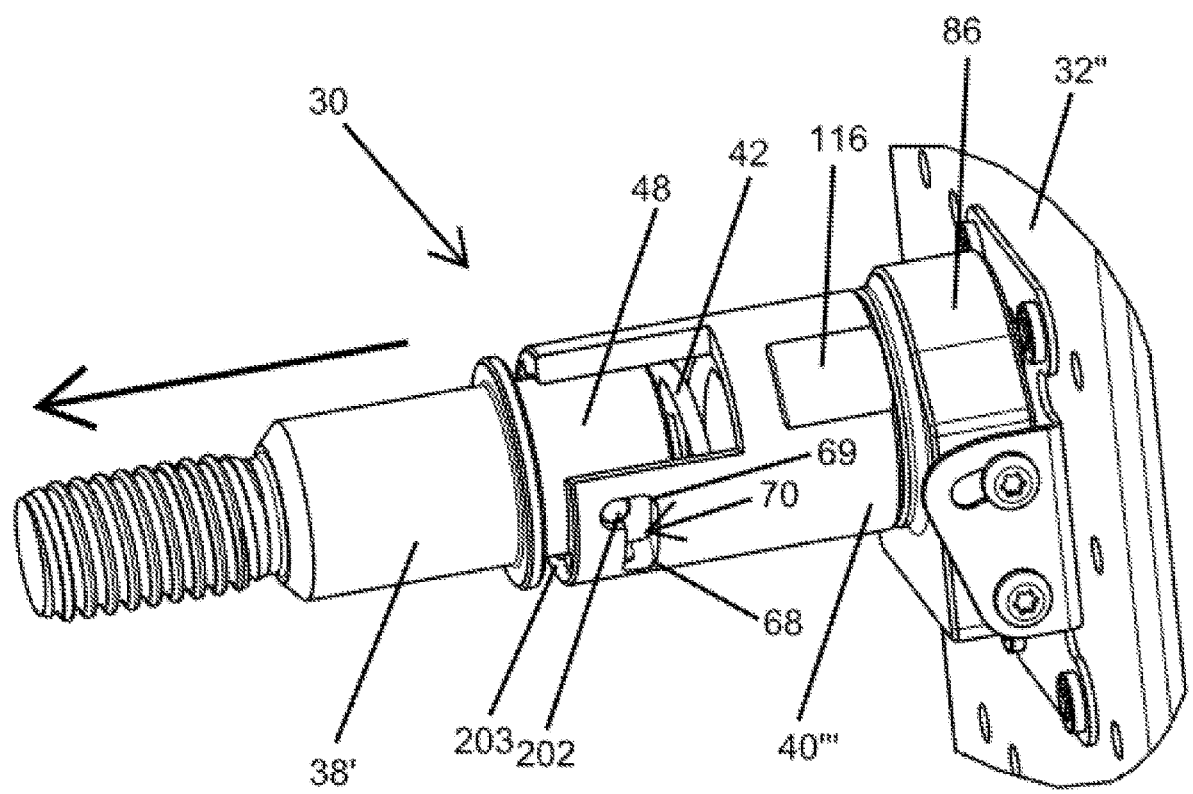
FIG. 43 is a partial cut-away perspective view similar to FIGS. 41-42, further illustrating engaging the shortened locking pins within the slotted receptacles by a preload exerted by the spring.

FIGS. 40-43 illustrate a series of perspective views for engaging the alternative bayonet lug 38' with another alternative embodiment of the bayonet housing 40''' having a constant outside diameter. Specifically, FIG. 40 illustrates the alternative bayonet lug 38' in exploded relation and concentrically aligned with the alternative bayonet housing 40'''. The outer surface 182 of the alternative bayonet housing 40''' is illustrated in a partial cut-away perspective view to expose the otherwise hidden or internally located cam slots 44 therein. Similar to the other embodiments disclosed herein, the cam slots 44 are accessible from an upper lip 203 by way of the pair of locking pin channels 64 therein, albeit from an interior of the alternative bayonet housing 40'''. The pair of locking pin channels 64 are of a size and shape to selectively receive for slide-in reception the outwardly protruding shortened locking pins 202.

Similar to other embodiments disclosed herein, the bayonet housing 40''' includes the spring 42 disposed concentrically therein, which is compressed by the interface shoulder 48 of the alternative bayonet lug 38' when inserting the shortened locking pins 202 into the pair of externally accessible locking pin channels 64—this forms the aforementioned pre-load on the alternative bayonet lug 38'. Once engaged into the locking pin channels 64, depressing the spring 42 allows the locking pin 46 to extend into the length of the alternative bayonet housing 40''' for eventual engagement against the cam shoulder 68 (FIG. 41) that turns orthogonally into the open channel 70. Similarly, the alternative bayonet housing 40''' may rotate relative to the alternative bayonet lug 38' (FIG. 42) to permit the shortened locking pins 202 to slide within the open channel 70 from the cam shoulder 68 to the locking shoulder 69, and in alignment with the slotted receptacles 72. Releasing the quick connect license plate bracket 32" when in this position (FIG. 43) then allows the spring 42 to push the shortened locking pins 202 into engagement within the slotted receptacles 72, effectively applying a preload thereto to maintain the shortened locking pins 202 within the slotted receptacles 72 as illustrated, e.g., in FIG. 43. As such, the alternative bayonet housing 40''' remains coupled to the alternative bayonet lug 38' when in this position.

The process for releasing the alternative bayonet housing 40''' requires applying a force to overcome the pre-load of the spring 42, such that the shortened locking pins 202 can be depressed out from within the slotted receptacles 72, and rotated back through the open channel 70 to the cam shoulder 68, and out through the locking pin channels 64, as disclosed herein.

Figure 44:
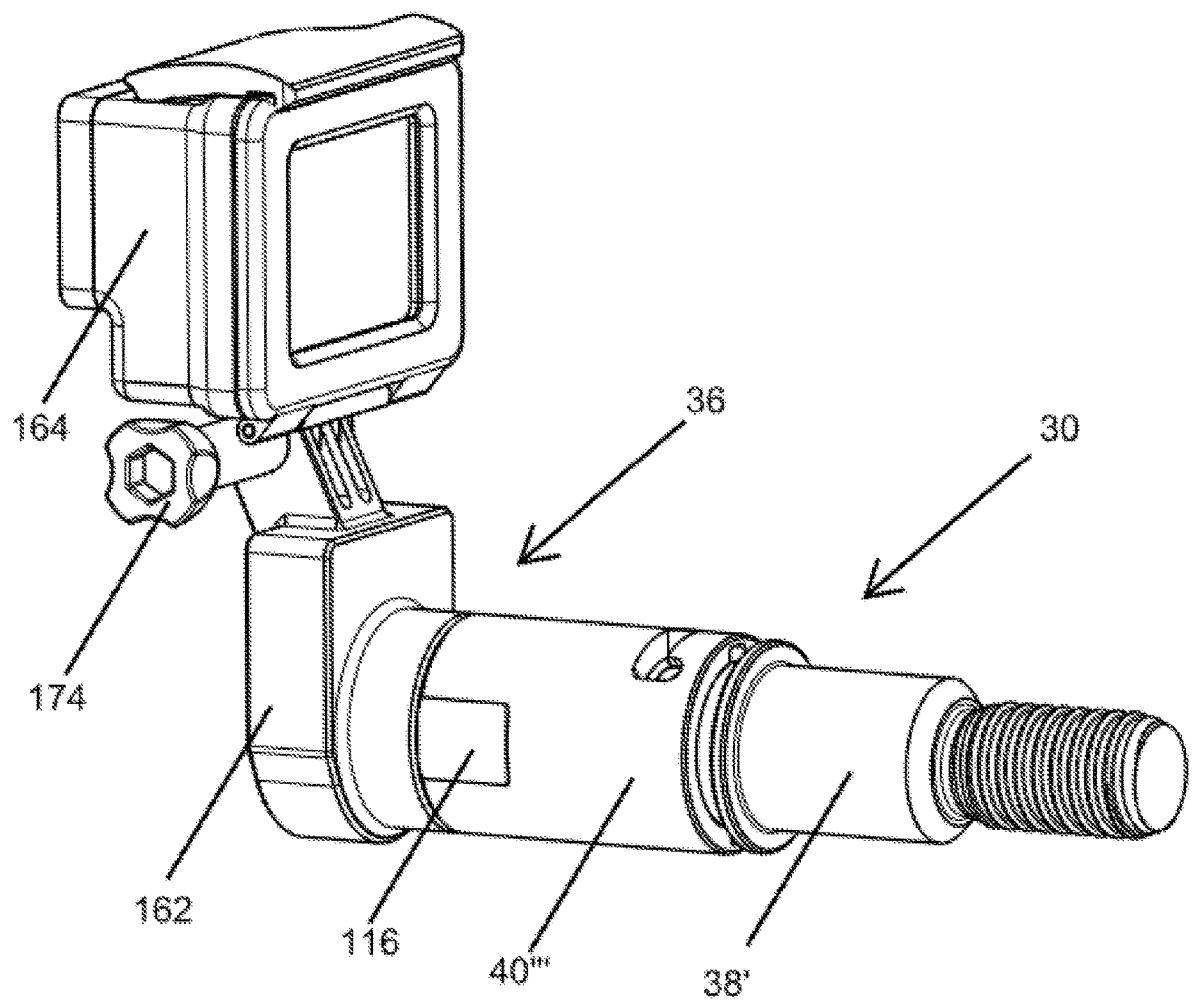
FIG. 44 is a perspective view illustrating the quick connect camera attachment of FIG. 31 coupled with the alternative bayonet housing and alternative bayonet lug of FIGS. 39-43.

In another example, FIG. 44 illustrates the alternative bayonet housing 40''' engaged with the alternative bayonet lug 38' on one end and engaged with the camera block 162 supporting the camera 64 by way of the locking screw 174 on the other end, as discussed above in detail.

Figure 45:
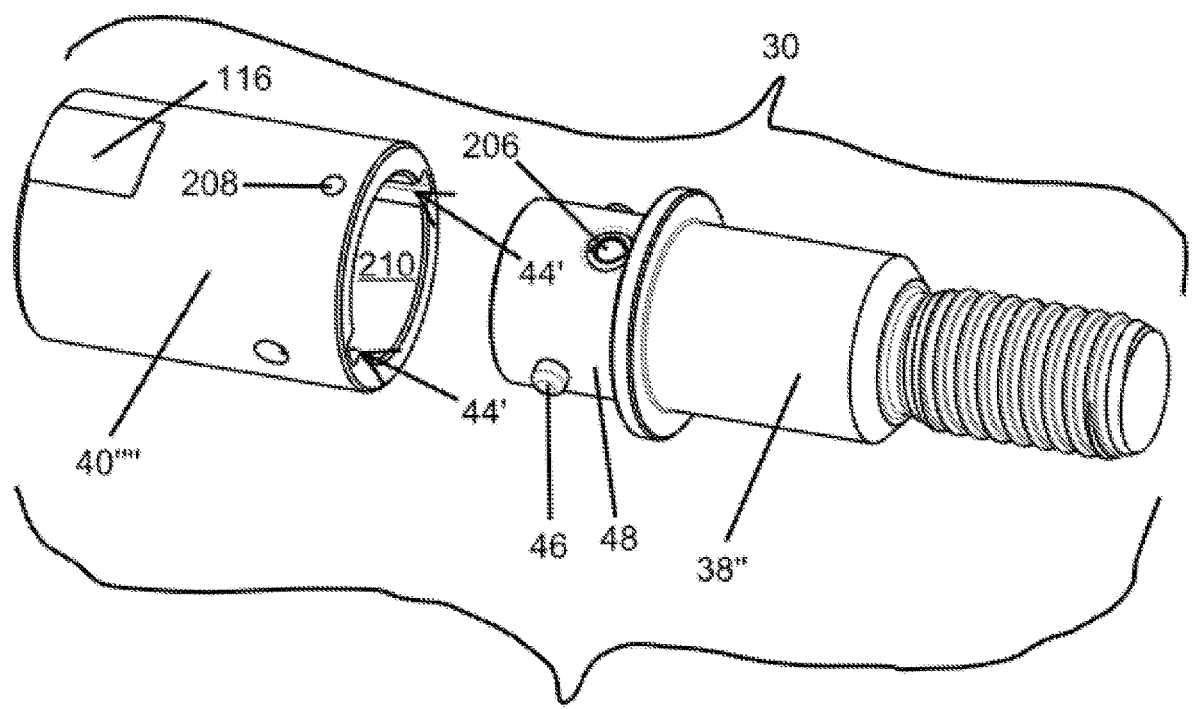
FIG. 45 is a perspective view illustrating another alternative embodiment of a bayonet housing having an internal detent configured for select reception and retainment of a ball detent formed in the interface shoulder of an alternative bayonet lug.

FIG. 45 illustrates another embodiment of an alternative bayonet lug 38" that includes one or more ball detents 206 formed into the interface shoulder 48. Here, another alternative bayonet housing 40"" may include a pair of straight cam slots 44' having a size and shape to selectively receive the respective pair of locking pins 46 of the alternative bayonet lug 38" (or the shortened locking pins 202 if the alternative bayonet lug 38" also includes the above-mentioned socket drive access opening 194). This may ensure that the ball detents 206 integrated into the interface shoulder 48 align with respective receptacles 208 formed from an interior surface 210 of the alternative bayonet housing 40"" when the bayonet lug 38" is engaged with the bayonet housing 40"". As such, in this embodiment, the respective receptacles 208 may simply retain the alternative bayonet housing 40"" relative to the alternative bayonet lug 38" without the need to twist or rotate the bayonet housing 40"" relative to the bayonet lug 38".

Figure 46:
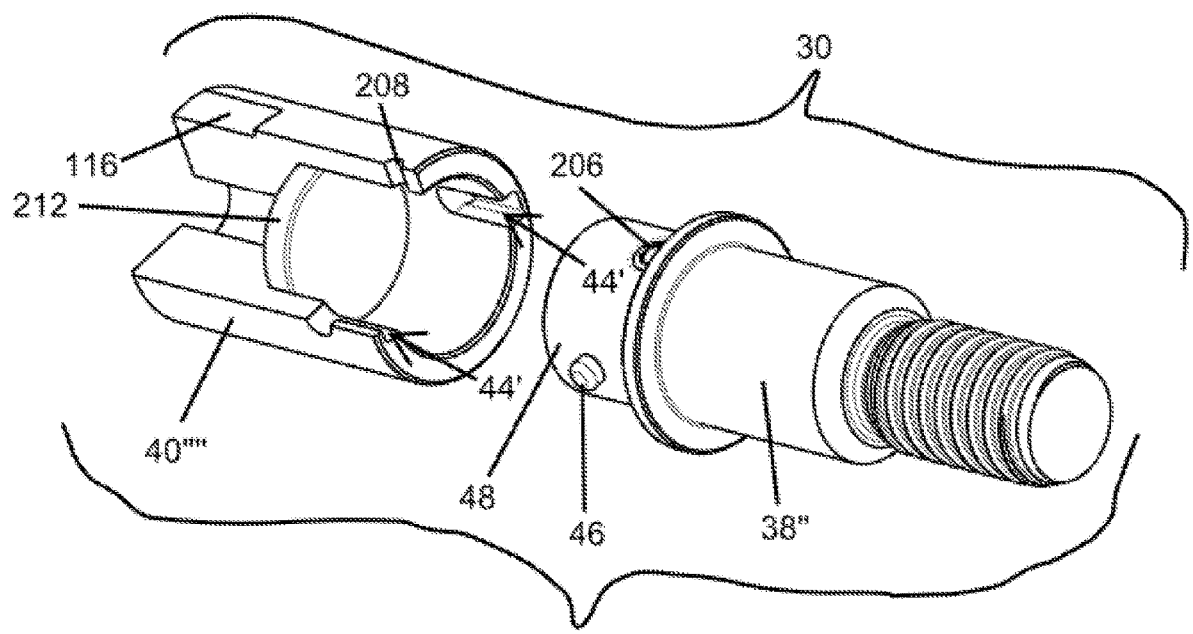
FIG. 46 is a partial cutaway perspective view illustrating that the alternative bayonet housing of FIG. 45 includes an internally located magnet and a pair of straight cam slots for receiving the locking pins and interface shoulder of the alternative bayonet lug of FIG. 45.
Figure 47:
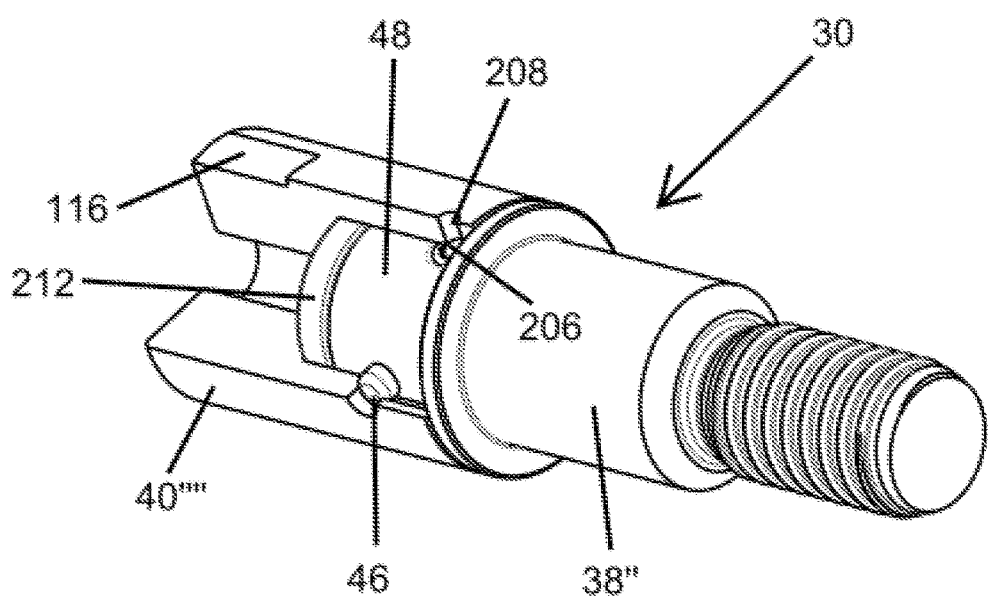
FIG. 47 is a partial cutaway perspective view similar to FIG. 46, further illustrating engagement of the receptacles and magnet of the alternative bayonet housing with the respective ball detent and interface shoulder of the alternative bayonet lug.

FIGS. 46 and 47 illustrate another alternative embodiment wherein the ball detents 206 and the receptacles 208 may be combined with an internally located magnet 212 disposed within the interior of the alternative bayonet housing 40"". Here, the magnet 212 may seat in generally the same location as the spring 42 in other embodiments, and be designed to enhance locking engagement of the alternative bayonet lug 38" with the alternative bayonet housing 40"" when inserted therein. In this respect, of course, the magnet 212 may be used in combination with or instead of the ball detents 206 and/or the receptacles 208. This respect, FIG. 47 illustrates the alternative bayonet lug 38" seated within the interior of the alternative bayonet housing 40"" such that the ball detents 206 engage with the respective receptacles 208 and the interface shoulder 48 magnetically engages with the magnet 212 disposed within the interior of the bayonet housing 40"". Of course, the strength of engagement between the interface shoulder 48 and the magnet 212 may vary depending on the strength of the magnet 212 and the material forming the interface shoulder 48 (e.g., a highly magnetic material will have a stronger attraction to the magnet 212, and vice versa).

Figure 48:
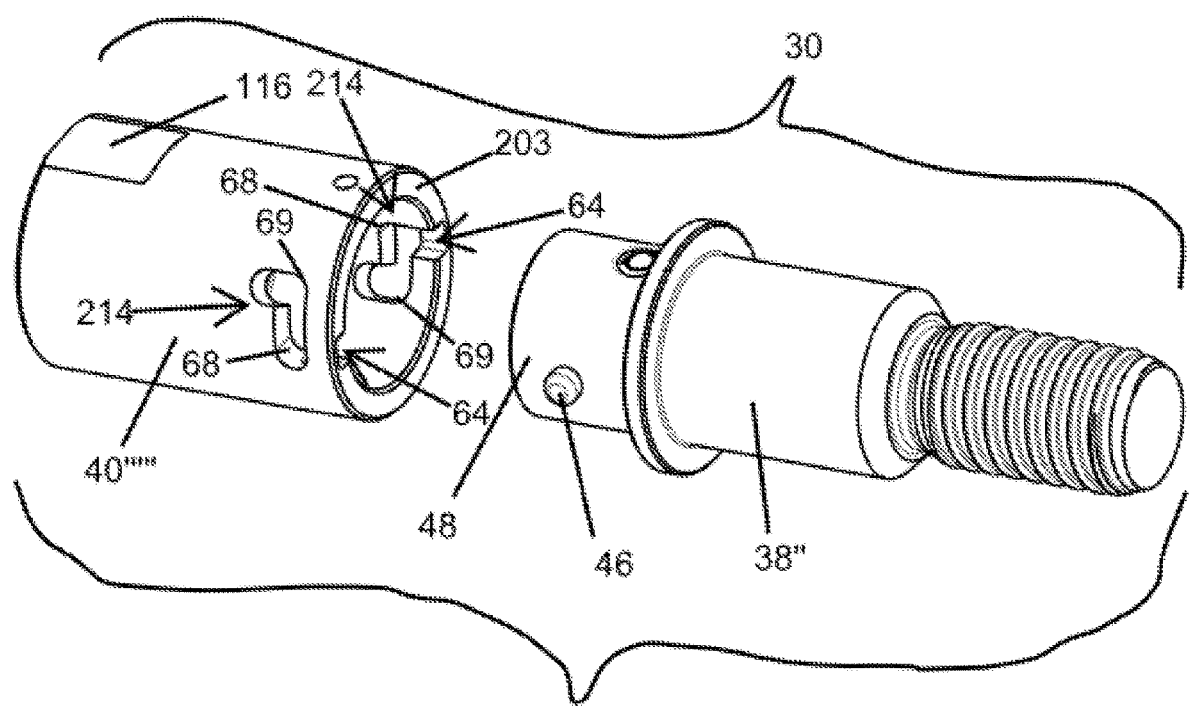
FIG. 48 is an exploded perspective view illustrating another embodiment of a bayonet housing having a pair of downward facing enclosed or hidden cam slots.

In another example embodiment, FIG. 48 illustrates another alternative bayonet housing 40 having a pair of downwardly turned cam slots 214 designed to enhance engagement of the alternative bayonet lug 38" therewith when the alternative bayonet housing 40 includes the internally located magnet 212, as disclosed above with respect to FIGS. 46 and 47. Here, the locking pins 46 (or the shortened locking pins 202) of the alternative bayonet housing 38" initially engage the downwardly turned cam slots 214 by way of the locking pin channels 64 externally accessible from the upper lip 203, similar to that disclosed above. As such, the locking pins 46 extend into the alternative bayonet housing 40 through the locking pin channels 64 until contacting the cam shoulder 68. Here, the alternative bayonet housing 40 may rotate relative to the alternative bayonet lug 38", thereby clocking the locking pins 46 from the shoulders 68 into the locking shoulders 69. When in this position, the cam slots 214 turn downwardly and away from the bayonet lug 38 to permit the interface shoulder 48 to be drawn further down into the alternative bayonet housing 40 for magnetic engagement with the internally located magnet 212. In fact, the magnetic attraction of the interface shoulder 48 with the magnet 212 may effortlessly draw the alternative bayonet lug 38" into engagement with the alternative bayonet housing 40. In this embodiment, external wind forces acting on, e.g., the quick connect license plate brackets 32, 32', 32" may actually enhance engagement of the alternative bayonet housing 40 with the alternative bayonet lug 38" by way of further applying a force that urges the locking pins 46 into the downwardly turned cam slots 214. The fact that the magnet 212 pulls the alternative bayonet lug 38" into engagement with the downwardly turned cam slots 214 of the alternative bayonet housing 40 effectively prevents relative rotation and release thereof.

Removal of the alternative bayonet housing 40 from the alternative bayonet lug 38" in the embodiment illustrated in FIG. 48 involves pulling on the bayonet housing 40 with enough force to overcome the magnetic attraction between the interface shoulder 48 and the magnet 212. Once the force is overcome, the interface shoulder 48 disengages from the magnet 212, thereby allowing the alternative bayonet housing 40 to move concentrically out from engagement with the alternative bayonet lug 38". As such, the locking pins 46 reposition to the locking shoulder 69. When in this position, the alternative bayonet housing 40 may rotate relative to the alternative bayonet lug 38" such that the locking pins 46 move from the locking shoulder 69 to the cam shoulder 68 by way of the open channel 70. When in this position, the bayonet housing 40 may simply be pulled off of the alternative bayonet lug 38" by sliding the locking pins 46 out from the downwardly turned cam slots 214 by way of the locking pin channels 64.

Figure 49:
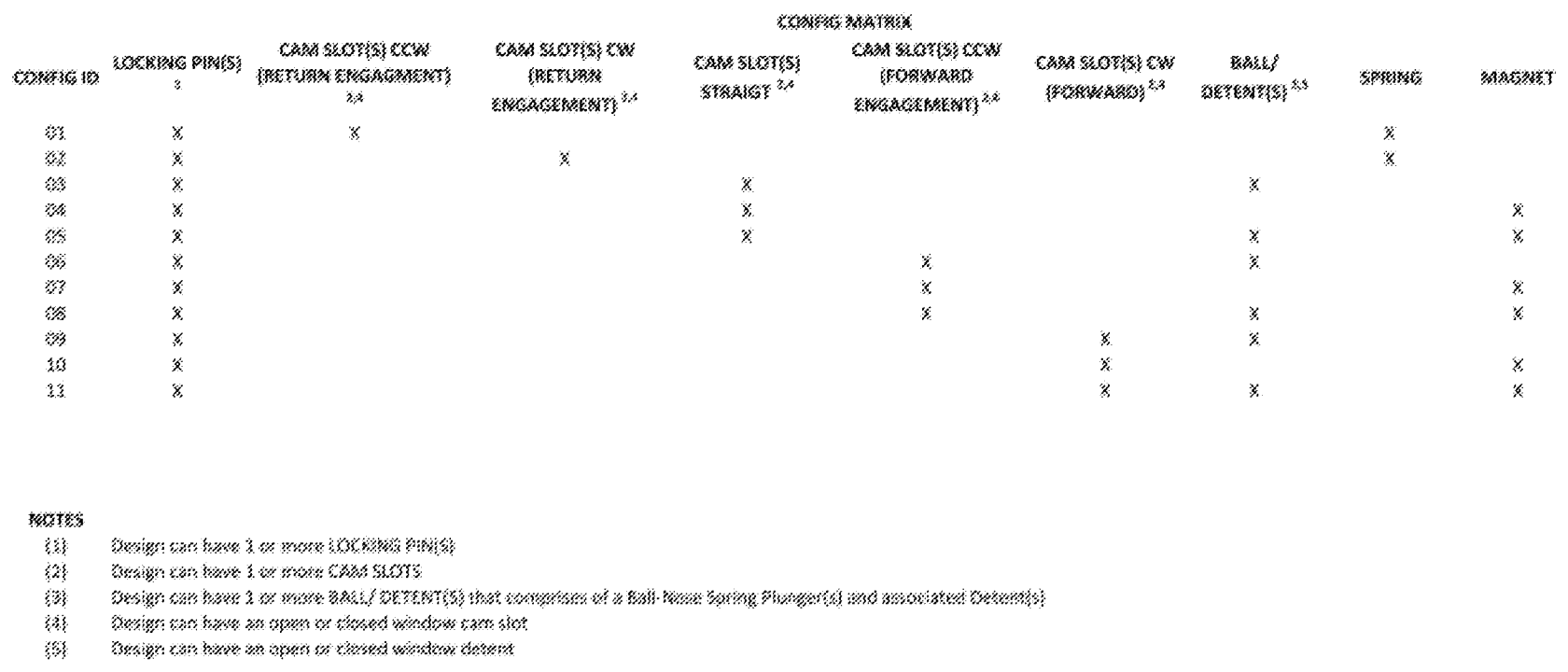

FIG. 49 is a chart illustrating a sample set of configurations for using, alone or in combination with one another, one or more of the locking pins 46 or the shortened locking pins 202, the cam slots 44, 44' or the downwardly turned cam slots 214, the ball detents 206 and/or the receptacles 208, the spring 42, and/or the magnet 212 as disclosed herein.

In general, the quick connect vehicle attachment 30 includes a variety of embodiments wherein the bayonet lug 38, 38', 38" couples to the sub-frame 58 of the vehicle 10 by way of threaded engagement with the tow hook boss 20.

Such engagement positions the bayonet lug 38, 38', 38" behind the front fascia 14 such that the cover 22 may be placed thereover so the front fascia 14 appears unaltered. To the extent a license plate or other equipment is to be attached to the front of the vehicle 10, the bayonet lug 38, 38', 38" may be accessed through the access port 18 for select coupling to the bayonet housing 40, 40', 40", 40''', 40'''', 40 by way of interlocking the locking pin 46 or the shortened locking pins 202 in the interface shoulder 48 of the bayonet lug 38, 38', 38" with the cam slots 44, 44' or the downwardly turned cam slots 214 in the bayonet housing 40, 40', 40", 40''', 40'''', 40. Additionally or instead of, locking engagement may also be accomplished by one or more of the ball detents 206 and the receptacles 208 or by way of magnetic attraction between the interface shoulder 48 and the magnet 212. The bayonet housing 40, 40', 40", 40''', 40'''', 40 is thus in a quick connection relationship with the bayonet lug 38, 38', 38" on one end and can carry a variety of equipment on another end protruding out from within the access port 18 and in front of the fascia 14. Accordingly, this design permits hand manipulated quick engagement and/or quick release of the quick connect license plate bracket 32, 32', 32", the quick connect tow hook attachment 34, the quick connect camera attachment 36, and/or other components, to the sub-frame 58 of the vehicle 10 by way of the bayonet lug 38, 38', 38" residing within the access port 18 and behind the front fascia 14, all without damaging the front fascia 14 (e.g., by way of the screw holes 16 or the like). Of course, any of the above-mentioned embodiments of the bayonet lug 38, 38', 38" and/or the bayonet housing 40, 40', 40", 40''', 40'''', 40 are scalable to accommodate various vehicle interface configurations.

Although several embodiments have been described in detail for purposes of illustration, various modifications may be made without departing from the scope and spirit of the invention. Accordingly, the invention is not to be limited, except as by the appended claims.

What is claimed is:

1. A quick connect vehicle attachment, comprising:
    a bayonet lug having at least one locking pin radially outwardly extending therefrom at a first end and a series of threads for engagement with a commensurately threaded tow hook boss of a vehicle at a second end opposite the first end;
    a bayonet housing having a coaxial central bore of a size and shape for select reception of the first end of the bayonet lug in a first side thereof and including at least one circumferential cam slot therein externally accessible from a lip thereof, the at least one cam slot being circumferentially enclosed by an elongated bayonet lip defined by an outer surface of the bayonet housing and having a size and shape for select slide-in reception of the at least one locking pin of the bayonet lug, and an alignment block coupled to a second side of the bayonet housing;
    a tilt plate including a pair of outwardly projecting and generally parallel flanges each having at least one slot formed therein having a size and shape for slotted reception of a fastener that extends therethrough and couples with the alignment block; and
    a lock disposed within the bayonet housing which prevents rotation of the bayonet lug and retains the bayonet lug relative to the bayonet housing when the at least one locking pin of the bayonet lug is slidably engaged with the at least one cam slot of the bayonet housing and rotated therein to a locked position within the cam slot.

2. The quick connect vehicle attachment of claim 1, wherein the at least one cam slot includes an externally accessible locking pin channel extending away from the lip and turning orthogonally into an open channel permitting rotational movement of the bayonet housing relative to the bayonet lug until termination at a locking shoulder that turns orthogonally back toward the lip and terminates into a slotted receptacle that selectively receives the at least one locking pin therein when the bayonet housing is engaged with the bayonet lug.

3. The quick connect vehicle attachment of claim 2, wherein the lock comprises a spring located within the central bore of the bayonet housing and compressible therein by the first end of the bayonet lug when the at least one locking pin slidably engages the locking pin channel, the spring exerting a pre-load force generally resistant to said insertion and otherwise holding the at least one locking pin within the slotted receptacle when rotated relative thereto for alignment therewith.

4. The quick connect vehicle attachment of claim 3, including a fastener extending within the central bore and retaining the spring substantially concentric therein.

5. The quick connect vehicle attachment of claim 2, wherein the bayonet lug includes a cross drilled aperture within the interface shoulder such that opposite sides of the at least one locking pin extend out therefrom for engagement with a respective pair of cam slots in the bayonet housing.

6. The quick connect vehicle attachment of claim 1, wherein the at least one locking pin extends outwardly from an interface shoulder of the bayonet lug having a width configured to be relatively larger than the tow hook boss and landable thereon when the bayonet lug is fully threadingly engaged therewith.

7. The quick connect vehicle attachment of claim 1, wherein the bayonet lug and the bayonet housing comprise an outer diameter configured to be relatively smaller than a port providing access to the tow hook boss behind a front fascia of the vehicle, the bayonet lug comprising a length that positions the first end behind the front fascia thereby permitting attachment of a cover to close the port even when the bayonet lug is installed therein.

8. The quick connect vehicle attachment of claim 1, wherein the lock comprises a magnet retained within an interior of the bayonet housing and near a bottom of the central bore, the magnet being magnetically attractable to the bayonet lug.

9. The quick connect vehicle attachment of claim 1, wherein the at least one slot comprises a pair of arcuate slots permitting pivoting movement of the alignment block relative thereto.

10. The quick connect vehicle attachment of claim 1, including a fastener extending through the alignment block and into threaded engagement with the bayonet housing, the fastener carrying a lock washer thereon sandwiched between the alignment block and the bayonet housing to generally resist relative rotational movement therebetween.

11. The quick connect vehicle attachment of claim 10, wherein the lock washer comprises a conical shape or a series of serrations.

12. The quick connect vehicle attachment of claim 1, wherein the tilt plate couples to a license plate bracket having a set of bracket apertures arranged in an array and having embossments configured for flush mounting thereto.

13. The quick connect vehicle attachment of claim 1, wherein the bayonet housing includes a pair of wrenching flats and the bayonet lug includes a socket drive access opening.

14. The quick connect vehicle attachment of claim 1, wherein the lock comprises a ball detent formed from an exterior surface of the first end of the bayonet lug and a receptacle formed from an interior surface of the central bore of the bayonet housing, the ball detent extending into the receptacle when the bayonet lug is engaged with the bayonet housing.

15. A quick disconnect vehicle attachment, comprising:
a bayonet housing having a coaxial central bore formed from a first end thereof, the central bore having a size and shape for select sliding engagement with a bayonet lug;
a pair of circumferential cam slots formed from the central bore and externally accessible from a lip thereof, the pair of cam slots being circumferentially enclosed by an elongated bayonet lip defined by an outer surface of the bayonet housing and having a size and shape for select slide-in reception of a commensurate pair of locking pins outwardly extending from the bayonet lug, and an alignment block coupled to a second end of the bayonet housing opposite the first end;
a lock carried by the bayonet housing for releasably securing the bayonet housing relative to the bayonet lug when in a locked position and permitting the bayonet housing to move relative to the bayonet lug when in an unlocked position; and
a tilt plate including a pair of outwardly projecting and generally parallel flanges each having at least one slot formed therein having a size and shape for slotted reception of a fastener that extends therethrough and couples with the alignment block.

16. The bayonet housing of claim 15, wherein the lock comprises a magnet positioned within the central bore immediately below termination of the pair of cam slots to draw the bayonet lug into engagement therewith.

17. The bayonet housing of claim 16, wherein the pair of cam slots comprise a pair of straight cam slots that generally prevent rotational movement of the bayonet housing relative to the bayonet lug after engagement with the pair of locking pins.

18. The bayonet housing of claim 16, wherein the externally accessible pair of cam slots extend inwardly away from the lip, turn orthogonally into an open channel extending to a locking shoulder that turns orthogonally away from the lip into a slotted receptacle terminating adjacent the magnet.

19. The bayonet housing of claim 15, wherein the pair of cam slots comprises a pair of closed cam slots formed from an interior of the central bore.

20. The bayonet housing of claim 15, wherein the pair of cam slots comprises a U-shape having a first end externally accessible and extending inwardly from the lip and a second end terminating in a slotted receptacle.

21. The bayonet housing of claim 15, wherein the bayonet housing comprises a cylindrical shape having a relatively consistent external diameter enclosing the pair of cam slots therein.

22. A quick connect vehicle attachment, comprising:
a bayonet lug having a locking pin radially outwardly extending therefrom at a first end, and a series of threads for engagement with a commensurately threaded tow hook boss of a vehicle at a second end opposite the first end;
a bayonet housing having a coaxial central bore sized and shaped for reception of the first end of the bayonet lug in a front side thereof, the central bore including a circumferential cam slot therein externally accessible from a lip thereof, the cam slot being circumferentially enclosed by an elongated bayonet lip defined by an outer surface of the bayonet housing and having a size and shape for select reception of the locking pin therein, and an alignment block coupled to a backside of the bayonet housing;
a tilt plate having a pair of outwardly projecting and generally parallel flanges each having at least one slot formed therein having a size and shape for slotted reception of a fastener that extends therethrough and couples with the alignment block; and
a lock disposed within the bayonet housing which prevents rotation of the bayonet lug and retains the bayonet lug relative to the bayonet housing when the locking pin of the bayonet lug is slidably engaged with the cam slot of the bayonet housing and rotated therein to a locked position within the cam slot.

* * * * *